US008949151B2

(12) United States Patent
Heine, III

(10) Patent No.: US 8,949,151 B2
(45) Date of Patent: Feb. 3, 2015

(54) SYSTEM AND METHOD FOR TRANSFERRING A TIMESHARE PROPERTY

(71) Applicant: Raymond David Heine, III, Altamonte Springs, FL (US)

(72) Inventor: Raymond David Heine, III, Altamonte Springs, FL (US)

(73) Assignee: TPP Holdings, LLC, Orlando, FL (US)

( * ) Notice: Subject to any disclaimer, the term of this patent is extended or adjusted under 35 U.S.C. 154(b) by 0 days.

(21) Appl. No.: 14/259,708

(22) Filed: Apr. 23, 2014

(65) Prior Publication Data

US 2014/0324678 A1 Oct. 30, 2014

Related U.S. Application Data

(60) Provisional application No. 61/815,389, filed on Apr. 24, 2013, provisional application No. 61/902,462, filed on Nov. 11, 2013.

(51) Int. Cl.
*G06Q 40/00* (2012.01)
*G06Q 50/16* (2012.01)
*G06Q 10/10* (2012.01)

(52) U.S. Cl.
CPC .............. *G06Q 50/167* (2013.01); *G06Q 10/10* (2013.01)
USPC .................................. 705/39; 705/38; 705/40

(58) Field of Classification Search
CPC ....... G06Q 10/00; G06Q 20/00; G06Q 30/00; G06Q 40/00
USPC ....................................................... 705/3–44
See application file for complete search history.

(56) References Cited

U.S. PATENT DOCUMENTS

| | | | |
|---|---|---|---|
| 6,871,140 B1 * | 3/2005 | Florance et al. | 701/516 |
| 7,076,452 B2 * | 7/2006 | Florance et al. | 705/26.43 |
| 7,516,099 B2 * | 4/2009 | Schneider | 705/38 |
| 7,640,204 B2 * | 12/2009 | Florance et al. | 705/37 |
| 2008/0154686 A1 * | 6/2008 | Vicino | 705/8 |
| 2008/0243922 A1 * | 10/2008 | Herm | 707/104.1 |
| 2012/0185375 A1 * | 7/2012 | Tealdi et al. | 705/37 |

\* cited by examiner

*Primary Examiner* — Frantzy Poinvil
(74) *Attorney, Agent, or Firm* — Taft Stettinius & Hollister, LLP; Stephen F. Rost

(57) ABSTRACT

The present disclosure provides a computer-executable method for executing a web-based program for producing a title transfer document. The method includes sending an instruction to an electronic device to request a type of transaction to be executed, wherein the type of transaction includes at least a removal of a current owner from the title or changing ownership to a new party. The method also includes receiving a communication from the electronic device in response to the request and executing a plurality of modules for requesting information about the timeshare property, the fees associated with the timeshare property, and at least one party of the transaction. The method further includes receiving input data in response to the executing step, linking the input data with at least one identifier in a document template, and producing the title transfer document upon completion of the linking step.

17 Claims, 88 Drawing Sheets

Notification Settings 1200

1202
- Transfer fees to be paid by ☉ Seller ☐ Buyer ☐ Split
- Current Year Maintenance Fees If Any To Be Paid By ☉ Seller ☐ Buyer ☐ Split
- Previous Year(s) Maintenance Fees If Any To Be Paid By ☉ Seller ☐ Buyer ☐ Split
- Club Dues If Any To Be Paid By ☉ Seller ☐ Buyer ☐ Split
- Previous Club Dues If Any To Be Paid By ☉ Seller ☐ Buyer ☐ Split 1204
- Broker Company Name
- Broker Contact Name
- Contact Phone Number
- Email Address (Documents)
- Address
- City
- State
- Zip 1206 → ☐ You hereby acknowledge that the information proivded herein is true and correct (including but not limited to buyer, seller, purchase price, etc.).

[Previous]                                    [Next]

Application Status
Application ID: —— 720
Identify Resort Property
Title Type & Units/Weeks
Current Owner Information
* Unknown Name
New Owner Information
* Unknown Name
New Title Details
Documentation
Notification Settings —— 712
Review & Payment Options
Submit Application
Overall Progress  30%
[Save & Quit]

Fig. 12

My Profile

My Applications — 1600

| Application ID | Resort | Units/Points | Status | Options |
|---|---|---|---|---|
| P6NV-JTDMO | | | Submitted | View Status |
| PDHV-7DEMO | | | Submitted | View Status |

Start New Applications — 1602

I am the [Seller ▸]

Copy my info from previous information [-None/Do Not Copy- ▸]

You must agree to the following to continue:

☐ All parties that are going on title are at least 18 years of age.
☐ There are no outstanding loans on the property.
☐ All maintenance fee, taxes, and dues are paid and current.
☐ I have read and understand the Privacy Policy & Terms of Service.

[Start Application]

Fig. 16

Check Transfer Application Status

2400

Enter the following information to check the status of your application:

Owners Last Name:
Order Number:
[Search]

} 2402

- OR -

Email Address:
Password:
[Login]

Hello,

We have the pleasure of handling the transfer of your timeshare unit that you recently ordered. This e-mail is to let you know that we have received your order, intiated the process and will process your payment for the transfer fee into our escrow account. Please understand that this is not a typical real estate closing where the parties all come to the same place at the same time to sign documents, and money is disbursed upon signing. In this case, the parties may be spread among several jurisdictions. Therefore, it is common for transactions of this type to take several months to complete, assuming everyone returns properly executed documents as quickly as possible. We ask that all documents be returned to our office with 45 days of $(eDate).

The attached documents represent the closing documents to be signed by both buyer and seller and returned to our office as soon as possible. Once we have the documents, we will request the estoppel letters from the management company/resort that may be needed. In additions,
reserves the right to request other documents it deems necessary to complete the transaction.

If you are using a Power of Attorney, please forward it to our office along with the attached Power of Attorney Affidavit completed. Many resorts have very specific requirements in order to accept a Power of Attorney. When we receive the Power of Attorney, we can verify the acceptance within those resorts guidelines.

The more complete the submission, the faster the process works for us to receive the information and prepare your transfer documents. However, remember that the transaction will typically take several months to complete.

Please email us at                                if you have any questions. By using our website you can track any changes to the status of your order 24 hours per day, 7 days per week. E-mail will be the fastest route to that information. if you wish to call, our phone number is
Please understand that, due to the sheer volume of calls we receive each day, it may take up to 72 hours before we can return your call.

Sincerely,

PLEASE REMEMBER WE NEED THE ORIGINALS RETURNED TO OUR OFFICE AT THE ADDRESS ABOVE

Fig. 26

FILE COVER PAGE

Please put this form on top of the package you send back so that we may process the file more expeditiously.
Thank you

2700

2602        2702

```
Date: ${eDate}        File #: ${fileNumber}
Seller Name: ${sellerName1}    Seller Name: ${sellerName2}
Seller Address: ${sellerAddress}
Seller City: ${sellerCity}, State: ${sellerState}, Zip: ${sellerZip}
Seller Phone #: ${sellerPhone}  Seller Email Address: ${sellerEmailAddress}
```
2704

```
Buyer Name: ${buyerName1}    Buyer Name: ${buyerName2}
Buyer Address: ${buyerAddress}
Buyer City: ${buyerCity}, State: ${buyerState}, Zip: ${buyerZip}
Buyer Phone #: ${buyerPhone}  Buyer Email Address: ${buyerEmailAddress}
```
2706

```
Resort: ${resortName}
Unit Number(s): ${unitNumbers}   Week Number(s): ${unitWeeks}
```
2708

| Purchase Price: | $ ${salesPrice} |
|---|---|
| Transfer costs paid by: | ${brokerTransferFeePayer} |
| Current Year Maintenance Fees if due to be paid by: | ${brokerMaintenanceFeePayer} |
| Current Year Club Dues if due to be paid by: | ${brokerClubFeePayer} |
| Previous Year Maintenance Fees if due to be paid by: | ${brokerMaintenanceFeePreviousPayer} |
| Previous Year Club Dues if due to be paid by: | ${brokerClubFeePreviousPayer} |

2710

Processor: _____      2712

Date Received

| File Reviewed By | |
|---|---|
| Additional Documents Requested | |
| Additional Documents Received | |
| Estoppel Ordered | |
| Date sent to Resort | |

Fig. 27

FILE CHECKLIST (Seller)

So that you CAN get as complete a file as possible to process from our end, and to minimize delays on your end, we have produced the below check list for you to use. If you send in all the documents requested below, you will reduce the chance of us asking for more information.
Note: not every item may be needed, but it is included on the form.

2800

—— Sellers Authorization complete and signed

—— Charitable Donations?

—— Donor letter stating fair market value assigned

—— 3rd Party Transaction Agreement

—— Purchase and Sales Contract between Seller and Buyer (we need the complete contract, fully executed)

—— Compliance Agreement

—— Resort Transfer Form fully completed

—— LLC Affidavit if an LLC is involved

—— Power of Attorney

—— Less than 12 months old?

—— Lists the Resort Name, Specific Unit and Week (can not be an exhibit to the POA, has to be on face. Unit and week must be listed separately i.e. 123A, 123B, 123C Week 50, 50, 50)

—— <u>Drivers license of the agent is required</u>

—— Power of Attorney Affidavit

—— Completed W-9's with FULL SOCIAL SECURITY NUMBERS

—— Legible copies of Sellers I.D.

Fig. 28

FILE CHECKLIST (Buyer)

So that you CAN get as complete a file as possible to process from our end, and to minimize delays on your end, we have produced the below check list for you to use. If you send in all the documents requested below, you will reduce the chance of us asking for more information.
Note: not every item may be needed, but it is included on the form.

2900

- ____ Business Entity taking title?
    - ____ Articles of Incorporation / Articles of Organization
    - ____ Corporate resolution specific for the transaction and identifying those able to sign
    - ____ Certificate of Good Standing less than 6 months old
- ____ Charitable Donation?
    - ____ Donor letter stating fair market value assigned
- ____ 3rd Party Transaction Agreement
- ____ Purchase and Sales Contract between Seller and Buyer (we need the complete contract, fully executed)
- ____ Compliance Agreement
- ____ Resort Transfer Form fully completed
- ____ LLC Affidavit if an LLC is involved
- ____ Power of Attorney
    - ____ Less than 12 months old?
    - ____ Lists the Resort Name, Specific Unit and Week (can not be an exhibit to the POA, has to be on face. Unit and week must be listed separately i.e. 123A, 123B, 123C Week 50, 50, 50)
    - ____ <u>Drivers license of the agent is required</u>
    - ____ Power of Attorney Affidavit
- ____ Completed W-9's with FULL SOCIAL SECURITY NUMBERS
- ____ Legible copies of Buyers I.D.

Fig. 29

3rd Party Transaction Agreements 3000

You hereby acknowledge that the information provided herein is true and correct (including but not limited to buyer, seller, purchase price, etc.); you further acknowledge and agree that the information provided will be utilized and relied upon by
Management Company and others in order to transfer the property interest indicated above.
_____ reserves the right to require additional information in order to validate the details of the transaction.

_____ and Management Company are not liable for loss or damage caused by fraudulent transfer, omissions or information or other matters outside of their control.

I also understand that the developer or managment company has neither waived or exercised the Right of First Refusual (if one exists).

Further, I understand and agree that the closing documents must be returned to _____ within 45 days of $[eDate] or my file may be cancelled.
— 2602
I also understand and agree to comply with any additional paperwork desired by the closing agent, Agreed to by:

X_____

Name Printed: _____

Title: _____ (Use this line ONLY if you are signing in a Corporate Capacity)

Fig. 30

COMPLIANCE AND CORRECTION AGREEMENT 2702        3100

File No.:       ${fileNumber}
Seller(s):      ${sellerName1}, ${sellerName2}
Purchaser:      ${buyerName1}, ${buyerName2}
Closing Agent:

The Undersigned, in consideration of the closing on the above transaction and the disbursement of funds and delivery of documents related thereto hereby agree, if requested by
             to fully cooperate in executing such other and further documents and taking such further actions as are necessary to complete the transaction and to correct any errors and omissions which are deemed necessary or desirable by the Closing Agent, including (but not limited to) correcting or completing the Legal Description of Property, Units, Weeks, ect. in that requestor's reasonable discretion.

Whereas the Closing Agent has to rely on information provided to it by third parties, and after closing the third party may have provided inaccurate information. Should the nature of the change be a typographical error such as name spelling or address, we authorize the Closing Agent to make the necessary changes.

Dated this ____ day of _____, 20____

X _____    X _____
${sellerName1}                        ${buyerName1}
X _____    X _____
${sellerName2}                        ${buyerName2}
X _____    X _____
${sellerName3}                        ${buyerName3}
X _____    X _____
${sellerName4}                        ${buyerName4}
X _____    X _____
${sellerName5}                        ${buyerName5}
X _____    X _____
${sellerName6}                        ${buyerName6}

Fig. 31

Resort Transfer Form

3200

Many resorts are now requiring the following information to be provided to them in order to complete the transfer of your purchase and/or sale of your timeshare. This is based on a new Federal guideline they have to adhere to. Your cooperation in completing this form, will facilitate your resort in completing their internal transfer without having to ask for additional information. PLEASE INCLUDE <u>LEGIBLE</u> COPIES OF YOUR DRIVERS LICENSE OR OTHER GOVERNMENT ISSUED PHOTO I.D.

| Transferors/Sellers Name: | ${sellerName1}, ${sellerName2} |
|---|---|
| Address: | ${sellerAddress}, ${sellerCity}, ${sellerState}, ${sellerZip} |
| Sellers Home Phone Number: | ${sellerPhone} |
| Sellers Email Address: | ${sellerEmailAddress} |

| Primary Transferee/Buyer Name: | ${buyerName1} |
|---|---|
| Address: | ${buyerAddress}, ${buyerCity}, ${buyerState}, ${buyerZip} |
| Buyers Home Phone Number: | ${buyerPhone} |
| Buyers Email Address: | ${buyerEmailAddress} |
| Primary Buyer Date of Birth | |
| Primary Buyer SSN: | |

| Sellers Owner Number: | |
|---|---|
| Buyers Owner Number: | |
| First Year of Usage: | |
| Resort/Week/Unit Number: | ${resortName} / ${unitWeeks}/ ${unitNumbers} |
| Relationship Between Buyer and Seller: | |

| CLOSING AGENT INFORMATION: |
|---|
| Closing Agents Name: |
| Closing Agents Email: |

NOTE: Please enclose <u>LEGIBLE</u> copies of either your Drivers License, State Identification Card or Passport with this document. The resort will not make the transfer without the information.

If there is more than one buyer, additional buyer's information is on Page 2.

Sellers:                                        Buyers:

X_____    X_____
${sellerName1}                              ${buyerName1}
X_____    X_____
${sellerName2}                              ${buyerName2}

Fig. 32

Additional Purchasers                                              3300

| Buyer Name:                    | ${buyerName2} |
| Address:                       |               |
| Buyers Home Phone Number       |               |
| Buyers Email Address:          |               |
| Primary Buyer Date of Birth:   |               |
| Primary Buyer SSN:             |               |

| Buyer Name:                    | ${buyerName3} |
| Address:                       |               |
| Buyers Home Phone Number       |               |
| Buyers Email Address:          |               |
| Primary Buyer Date of Birth:   |               |
| Primary Buyer SSN:             |               |

| Buyer Name:                    | ${buyerName4} |
| Address:                       |               |
| Buyers Home Phone Number       |               |
| Buyers Email Address:          |               |
| Primary Buyer Date of Birth:   |               |
| Primary Buyer SSN:             |               |

NOTE: Please enclose LEGIBLE copies of either your Drivers License, State Identification Card or Passport with this document. The resort will not make the transfer without the information.

Additional Buyer Signatures

_____           _____
${buyerName2}                        ${buyerName3}

_____
${buyerName4}

Fig. 33

CONTRACT        3400

2602　　　　　2702

Date: ${eDate}     File #: ${fileNumber}

| Seller Name: ${sellerName1}   Seller Name: ${sellerName2}                    |
| Seller Address: ${sellerAddress}                                              |
| Seller City: ${sellerCity}, State: ${sellerState}, Zip: ${sellerZip}          |
| Seller Phone #: ${sellerPhone} Seller Email Address: ${sellerEmailAddress}    |

2704

| Buyer Name: ${buyerName1}   Buyer Name: ${buyerName2}                         |
| Buyer Address: ${buyerAddress}                                                |
| Buyer City: ${buyerCity}, State: ${buyerState}, Zip: ${buyerZip}              |
| Buyer Phone #: ${buyerPhone} Buyer Email Address: ${buyerEmailAddress}        |

2706

| Resort: ${resortName}                                                         |
| Unit Number(s): ${unitNumbers}  Week Number(s): ${unitWeeks}                  |

2708

| Purchase Price: $ ${salesPrice}                                               |
| Sales Commission: $_____ / $_____                   |
| Real Estate Broker (if any) for:                                              |
| Seller: _____  Buyer: _____                     |

2710

| Transfer costs paid by: | ${brokerTransferFeePayer} |
|---|---|
| Current Year Maintenance Fees if due to be paid by: | ${brokerMaintenanceFeePayer} |
| Current Year Club Dues if due to be paid by: | ${brokerClubFeePayer} |
| Previous Year Maintenance Fees if due to be paid by: | ${brokerMaintenanceFeePreviousPayer} |
| Previous Year Club Dues if due to be paid by: | ${brokerClubFeePreviousPayer} |

*** IF MORE THAN ONE PERSON ON TITLE, CHOOSE ONE OF THE FOLLOWING FOR TITLE
TO BE VESTED: (NOTE: If nothing is selected Tenants in Common will be assumed)

____ ${vestedJoint} ____     JOINT TENANTS (Upon death property goes to the surviving owner)
____ ${vestedCommon} ____   TENANTS IN COMMON (Upon death property goes to decendent's heirs)

AUTHORIZATION TO RELEASE INFORMATION TO TITLE COMPANY

Fax to:  
Requested By:

File #: ${fileNumber}  
Date: ${eDate}

Buyers Name : ${buyerName1}  
Sales Price: ${salesPrice}

| | |
|---|---|
| Seller Name Primary (Last, First) | ${sellerName1} |
| Seller Primary SSN# (last 4 digits) | |
| Seller Name Secondary (Last, First) | ${sellerName2} |
| Seller Secondary SSN# (last 4 digits) | |
| Seller Address | ${sellerAddress}, ${sellerCity}, ${sellerState} ${sellerZip} |
| Seller Home Phone | ${sellerPhone} |
| Seller Email Address | ${sellerEmailAddress} |

Resort Property

| | |
|---|---|
| ${resortName} | Unit / Weeks: ${unitNumbers1}/${unitWeeks} |

Authorization to Release Information

I, (we) ${sellerNames}  
hereby authorize the Resort or Resort Management Company to release nonpublic personal information about me (us) to _____ who is acting on my (our) behalf. I (we) indemnify and hold harmless, the Resort or Resort Management Company from any and all claims, which may arise from the release of this information.

X_____  X_____  
Seller Signature             Seller Signature  
X_____  X_____  
Seller Signature             Seller Signature

Fig. 35

Prepared by:

2702

3600

File Number: $(fileNumber)

CERTIFICATE OF TRUST

Before me, the undersigned authority, personally appeared _____
("Affiant"), who deposes and says:

1. Affiant is the trustee of the _____ Trust, dated _____ (the "Trust").

2. Affiant resides at _____.

Co-Trustee is: _____

3. Affiant certifies that this Certification of Trust pertains to the trust property located at:

Resort Name:                 $(resortName)

Unit Number(s):             $(unitNumbers)

Week Number(s):            $(unitWeeks)

4. Title to the Property is currently vested as: _____.

5. The Trust is: _____ Irrevocable. XXX Revocable. The following individual(s) has/have power to revoke the Trust: _____

6. Affiant certifies that the Trust is currently in existence and has not been revoked, modified, or amended in any manner that would cause the representations contained in this Certification of Trust to be incorrect.

7. The Trust provides that as trustee, Affiant has full power and authority to mortgage and/or convey the Property without obtaining consent from any Trust beneficary.

Fig. 36A

8. The Settlor of the Trust is _____

9. The Property is:_____ Homestead.  XXX  Non-homestead.

Affiant further states that Affiant is familiar with the nature of an oath, and with the penalties as provided by the laws of the State aforesaid for falsely swearing to statements made in an instrument of this nature

_____        _____

STATE OF _____

COUNTY OF _____

Sworn to and subscribed before me this ____ day of _____, _____,
by _____, who is personally known to me
or has produced a _____ as identification.

_____
_____, Notary Public

My Commission Expires:_____

Fig. 36B

PREPARED BY AND AFTER
RECORDING, RETURN TO:

File No: $(fileNumber)

ATTORNEY IN FACT AFFIDAVIT
FOR POWER OF ATTORNEY

THIS IS AN AFFIDAVIT MADE UNDER OATH. THE MAKING OF A FALSE STATEMENT WILL SUBJECT THE AFFIANT TO SEVERE CRIMINAL PENALTIES.

BEFORE ME, the undersigned authority, personally appeared (Affiant), $(aifName), whose post office address is:_____ who being by me first duly sworn on oath, deposes and says:

1. On the ___ day of _____, 20 ___,
   ("Principal") executed a Power of Attorney appointing me attorney in fact to sell the following described real property:

Resort Name:             $(resortName)
   Unit Number(s):          $(unitNumbers)
   Unit Week(s):            $(unitWeeks)

2. The Principal was of sound mind and of legal age at the time the power of attorney was executed.

3. The Principal has not revoked the power of attorney.

4. The Principal has not been adjudged mentally incapacitated; nor has a petition to determine the competency of the Principal been filed.

5. I have not received actual knowledge or actual notice of the death of the Principal. Nor have I recieved notice of any facts indicating the Principal's death.

6. The Principal has not filed for Bankruptcy in any Federal Court.

7. Principal is still the owner of the inventory being transferred and to the agent's knowledge, the Principal has not executed any sales contract, deed or other documents that would cause them NOT to be the legal or beneficial owner of the inventory subject to the Power of Attorney.

8. Affiant states that he/she is familiar with the nature of an oath, and with the penalties as provided by the laws of the State aforesaid for falsely swearing to statement made in an instrument of this nature.

Fig. 37

Prepared by/Return to:

2702  Name Affidavit  3800

File No: ${fileNumber}

STATE OF _____

COUNTY OF _____

ON THIS DAY, before me the undersigned, personally appeared ${sellerNames}

Who, being first duly sworn, deposes and says that

_____    _____
_____    _____
_____    _____
_____    _____

Is one and the same person as ${sellerNames}

X _____    X _____
${sellerName1}                ${sellerName2}

Sworn to and subscribed before me on this ___ day of _____, 20 ___

_____
Notary Public
Notary Printed Name _____

My Commission Expires: _____

(Seal)

Fig. 38

Prepared by:
2702

3900

File Number: ${fileNumber}

Limited Liability Company Affidavit

STATE OF _____

COUNTY OF _____

Before me, the undersigned authority, personally appeared _____
(Affiant) who being by me first duly sworn, on oath deposes and says that:

1. Affiant is a member/manager of _____, a _____ limited liability company.

2. Said limited liability company is currently in existence under valid articles of organization and regulations or operating agreement and has not been terminated or dissolved.

3. The following parties are all of the members/managers of said limited liability company:
   _____
   _____
   _____

4. Affiant is authorized by the articles of organization or regulations to execute deeds and mortgages on behalf of the limited liability company, and all necessary consents have been obtained.

5. Neither the limited liability company nor any of the members are currently debtors in any bankruptcy proceeding, and this conveyance or mortgage is in the ordinary course of buisness.

6. This affidavit is being given to _____ to induce them to finalize the transfer of the timeshare.

Fig. 39A

7. Affiant further states that he is familiar with the nature of an oath and with the penalties as provided by the laws of the State of Florida for falsely swearing to to the statements made in an instrument of this nature. Affiant further certifies that he has fully read this affidavit and understands its content.

X _____
Printed Name: _____

STATE OF_____ ss

COUNTY OF_____

The foregoing instrument was acknowledged before me on this \_\_\_ day of _____, 20\_\_\_ by _____, who is personally known to me or who has produced a Drivers Liscense as identification.

_____
_____ Notary Public

My Commission Expires:_____

Fig. 39B

PREPARED BY: Dave Heine
RECORD & RETURN TO:

2702

4000

File Number: ${fileNumber}

CONTINUOUS MARRIAGE AFFIDAVIT

BEFORE ME, the undersigned authority, this day personally appeared _____
who after first being duly sworn, deposes and says:

1. That Affiant is the owner of the following described property:

| Resort Name:    | ${resortName}  |
   | Week Number(s): | ${unitNumbers} |
   | Unit Number(s): | ${unitWeeks}   |

2. That Affiant and _____ were married on _____, and were continuously married without interruption to the date of death on _____, as evidence by a copy of the death certificate which has been examined and will be retained in the closing file referenced herein.

3. Affiant states that he/she is/are familiar with the nature of an oath, and with the penalties as provided by the laws of the State aforesaid for falsely swearing to statements made in an instrument of this nature 4. Affiant further certifies that they have read the full facts contained in this Affidavit and understands its context.

5. That Affiant is executing this Affidavit to induce: _____, to transfer ownership, based on facts contained herein.

Fig. 40A

Further AFFIANT SAYETH NAUGHT.

_____

STATE OF_____
COUNTY OF_____

The foregoing instrument was sworn to, subscribed and acknowledged before me this ___ day of _____, 20 ___ , by _____
who is personally known to me or who has produced a Drivers License as identification and who did take an oath.

_____
NOTARY PUBLIC
Notary Print Name_____

My Commission expires:_____
Notary Seal

Fig. 40B

FEES DUE NOTICE

4100

The estoppel that has been provided by ${resortName} indicates the following fees are currently due. I/We understand that the transfer can not proceed if there are unpaid fees.

| Current Year Maintenance Fees: | ${brokerMaintenanceFee} |
|---|---|
| Current Year Club Dues (if any): | ${brokerClubFee} |
| Previous Year Maintenance Fees: | ${brokerMaintenanceFeePrevious} |
| Previous Year Club Dues (if any): | ${brokerClubFeePrevious} |

2602

I also understand that documents must be completed and returned with 45 days of ${eDate}. If documents are not returned within that time, I understand that my file will be cancelled and I will need to re-start the transfer process and pay a new fee.

Dated this ___ day of _____ , 20 ___

X _____  X _____
${sellerName1}              ${buyerName1}
X _____  X _____
${sellerName2}              ${buyerName2}
X _____  X _____
${sellerName3}              ${buyerName3}
X _____  X _____
${sellerName4}              ${buyerName4}
X _____  X _____
${sellerName5}              ${buyerName5}
X _____  X _____
${sellerName6}              ${buyerName6}

Fig. 41

Prepared by and return to:

2702

4200

File Number: ${fileNumber}

OWNER/SELLER AFFIDAVIT

State of _____

County of _____

The undersigned, being first duly sworn, deposes and says that:

1. I/We am/are citizens of the United States of America, and not a nonresident alien, of legal age and have never been known by any other name than that as appears below.

2. That our U.S Taxpayer Identification Number (Social Security Number) is/are:

_____  _____ respectivley, if applicable.

3. That our Mailing Address is ${sellerAddress}, ${sellerCity}, ${sellerState}, ${sellerZip}

4. I/We own the property described as follows:

Week(s): ${unitWeeks}, in Unit(s): ${unitNumbers} at ${resortName}

And its possession thereof has been peaceable and undisturbed and the title to said property has never been disputed or questioned to our knowledge, nor do we know of any facts by reason of which the title to, or possession of said property might be disputed or questioned, or by reason of which any claim to any said property might be asserted adversely to me.

5. There are no tenancies, leases or occupants.

6. No proceedings in any bankruptcy or receivership have ever been instituted by or against us, and we have never made an assignment for the benefit of creditors.

7. I/We know of no action or proceedings relating to said property which is now pending in any State or Federal Court in the United States, nor do we know of any State or Federal Judgment or any Federal Lien of any kind or nature whatsoever, which now constitutes or could constitute a lien or charge upon the subject property.

Fig. 42A

8. There are no judgements against us unpaid or unsatisfied of record, IRS liens and/or State Revenue Liens in any court of this State or of the United States and said property, as far as we know is free from all leases, mortgages and other liens and encumbrances except as discolsed 9. There are no loans of any kind on said property except the following:

_____ if none, insert none

10. There are no unpaid bills or claims for labor or services performed or material furnished or delivered during the last twelve months for alterations, repair work, or new construction on said property which have not been paid for in full except those as shown on the closing statement of this transaction.

Fig. 42B

Notification Settings

Contact Name

Company Name

Email

Phone (___)___-____

Fax (___)___-____

Website http://

Country [United States ▾]

Address

Postal Code

Address Verification
[LOOKUP CITY/STATE]

[Previous]   [Next]

Application Status
Application ID:
- Transaction Information ⓪
- Estimated Fee & Units/Weeks ⓪
- Current Owner Information ⓪
- *Unknown Name ⓪
- New Owner Information ⓪
- *Unknown Name ⓪
- Documentation ⓪
- Fee Information ⓪
- Notification Settings ⓪
- Review & Payment Options ⓪
- Submit Application ⓪

Overall Progress  6%
[Save & Quit]

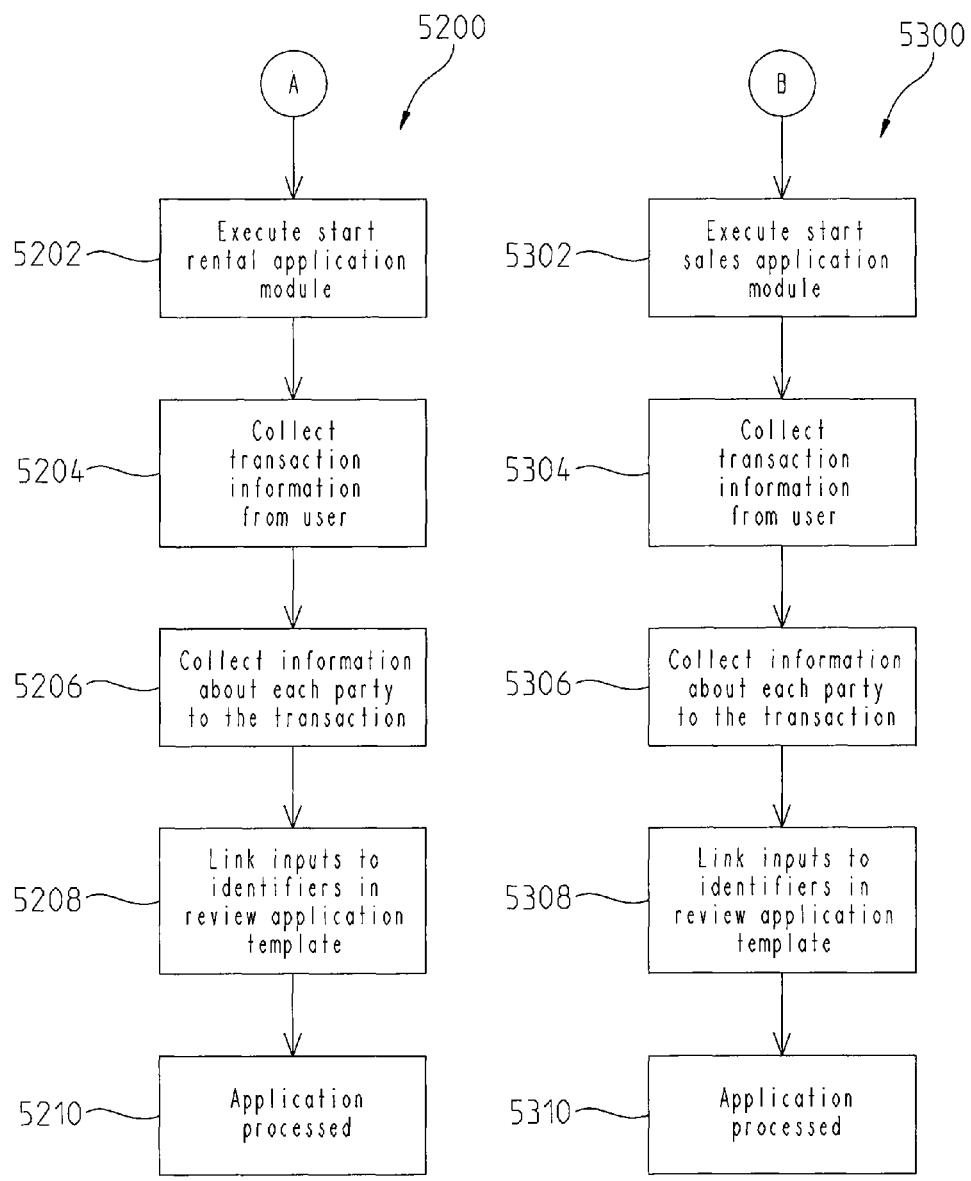

My Account

My Applications
[Show Pending Only ▼] ← 6204

6200

| Application ID | Status | Type | Order Number | Last Name | Date Submitted | Options |
|---|---|---|---|---|---|---|
| MLVP-F7ESC | Pending | BROKER | | | | Complete Now |
| HVDN-DTESC | Pending | SALE | | | | Complete Now |
| 44L4-NRESC | Pending | SALE | | | 6202 | Complete Now |
| 49H6-NNESC | Pending | RENTAL | | | | Complete Now |
| DHF6-PTESC | Pending | BROKER | | | | Complete Now |
| 3WRV-JVESC | Pending | BROKER | | | | Complete Now |
| JWR6-P3ESC | Pending | RENTAL | | | | Complete Now |
| 74P7-RWESC | Pending | BROKER | | | | Complete Now |

Fig. 62A

Resort Info

6900

- Resort Name
- Resort State
- Building Number(s)
- Unit Number(s)
- Lockout? YES
- Unit Weeks
- Week Type FIXED WEEK
- Sleeps 2
- Unit Season PLATINUM
- Unit Occupancy ANNUAL
- Unit View
- Star Options
- Resort Transfer Fee $
- Exchange Company

Fig. 69

Application Status
Application ID:
- Sale Info
- Co-Broker Information
- Resort Info
- Transaction Info
- Reservation Details
- Seller Information
- Buyer Information
- Review Information
- Submit Application Overall Progress 0%

[ Save & Quit ]

Step #7 - Buyer Information

Copy Information From -SELECT ONE- ▷ COPY

INDIVIDUAL ▷

First Name [ ] MI [ ] Last Name [ ]

Email [ ]

Home Phone (___)___-____

Work Phone (___)___-____

Cell Phone (___)___-____

Country [United States ▷]

Address [ ]

Postal Code [ ]

Address Verification
[LOOKUP CITY/STATE]

Add Another BUYER
- OR -
[Next]

7300

7302

Application Status
Application ID:
- Sale Info ○
- Co-Broker Information ○
- Resort Info ○
- Transaction Info ○
- Reservation Details ○
- Seller Information ○
- *Unknown Name ○
- *Unknown Name ○
- Buyer Information ○
- *Unknown Name ○
- Review Information ○
- Submit Application ○

Overall Progress [ ] 0%

[Save & Quit]

Fig. 73

Application Submitted - Process Started

1) Write down your Order Number (TSK14-00003)
Include this number on any/all future correspondence about this transfer 2) Your documents are being prepared and will be sent shortly If you have not received this email within 3 business days, contact us at What do I do now?

PRINT THIS PAGE

We suggest after printing this page (or writing down this information) you close this browser window Or if you'd like to start another application, you may do so now Start New Application

Fig. 75 or before Jan 1st. This assessment (X includes/ does not include) yearly add valorem real estate taxes, which ( are/_X or not) billed and collected seperately. If ad valorem real property taxes are not included in the current year's assessment for common expenses, the following statement must be included: The most recent annual assessment for ad valorem real estate taxes for the timeshare period you are purchasing is $N/A (approximate). The managing entity will be considered the tax payer as your agent pursuant to Section 192.037, Florida statutes. Each owner is personally liable for the payments of his/her assessment for common expenses, and failure to timely pay these assessments may result in restrictions or loss of your and/or ownership rights. In making the disclosures required by this paragraph, the broker may rely upon information provided in writing by the managing entity of the timeshare plan.
8. There is no mandatory exchange program included in this timeshare plan.
9. There are many important documents relating to the timeshare plan which you should review prior to purchasing a timeshare period, including the Declaration of Condominium or Convenants and Restrictions: The Association Articles and Bylaws: The Current Year's Operating and Reserve Budgets: and Any Rules and Regulations Affecting the Use of the Timeshare Plan Accommodations and Facilities.
10. YOU MAY CANCEL THE CONTRACT WITHOUT ANY PENALTY OR OBLIGATION WITHIN 10 DAYS AFTER THE DATE YOU SIGN THIS CONTRACT. IF YOU DECIDE TO CANCEL THIS CONTRACT, YOU MUST NOTIFY THE SELLER IN WRITING OF YOUR INTENT TO CANCEL. YOUR NOTICE OF CANCELLATION SHALL BE EFFECTIVE UPON THE DATE SENT AND SHALL BE SENT TO THE SELLER AT                              , ANY ATTEMPT TO OBTAIN A WAIVER OF YOUR CANCELLATION RIGHT IS VOID AND OF NO EFFECT. WHILE YOU MAY EXECUTE ALL CLOSING DOCUMENTS IN ADVANCE, THE CLOSING, AS EVIDENCED BY DELIVERY OF THE DEED OR OTHER DOCUMENT, BEFORE EXPIRATION OF YOUR 10-DAY CANCELLATION PERIOD, IS PROHIBITED.
11. THIS IS A LEGALLY BINDING CONTRACT, IF NOT FULLY UNDERSTOOD, SEEK COMPETENT ADVICE.
12. Buyers first year usage is 2014, and every ANNUAL year thereafter.

Any other notice under this Agreement may be sent by electronic means now known or hereafter discovered (i.e. electronic mail or telefacsimile), and the same is deemed delivered upon receipt of confirmation of such transmission.
Except as herein otherwise specifically provided, this Agreement shall be binding upon and inure to the benefit of the parties and their legal representatives, heirs, administrators, executors, successors, and assigns.
This Agreement may be executed in several counterparts, each of which shall be deemed an original but all of which shall constitute one and the same instrument. This Agreement may contain more than one counterpart of the signature page and may be executed by the affixing of the signatures of each of the parties to one of these counterpart signature pages. All the counterpart signature pages shall be read as though one, and they shall have the same force and effect as though all of the signers.

The above contract is entered in to by the buyer and seller on    ─── 7614

Seller(s):                              Buyer(s)

Assessment Certificate and Estoppel Letter

7702 — Closing Company  
7704 — Seller

| Name: | <<brokerCompanyName>> | | <<sellerNames>> |
|---|---|---|---|
| Address: | <<brokerAddressStreet>> | | <<sellerAddress>> |
| City, State, Zip | <<brokerAddressCity>>,<<brokerAddressState>> <<brokerAddressZip>> | | <<sellerCity>>,<<sellerStates>> <<sellerZip>> |
| Phone Number: | <<brokerPhoneNumber>> | | <<sellerPhone>> |
| Fax Number: | <<brokerPhoneNumberFax>> | | |
| Website: | <<brokerURL>> | | |
| Email: | <<brokerEmailAddressSeller>> | | <<sellerEmailAddress>> |

In regards to the proposed sale to the following buyer(s) at the following purchase price  
Seller:      <<sellerNames>> ← 7706  
Buyer:      <<buyerNames>> ← 7708  
Purchase Price:     $ <<salesPrice>> ← 7710

This is to certify the information regarding assessments and fees due to for the above-referenced property:    7712

| | | | |
|---|---|---|---|
| Resort Name: | <<resortName>> | # of Bedrooms: | <<resortBedrooms>> |
| Unit Number: | <<unitNumbers>> | # of Bathrooms: | <<resortBathrooms>> |
| Building Number: | <<UnitBuildings>> | Lockout: | <<resortLockoutYN>> |
| Week Number: | <<unitWeeks>> | View Type: | <<resortViewType>> |
| Use Period: | <<usePeriod>> | | |

Fig. 77A

Current Fees Due:

| | 7714 |
|---|---|
| Current Year Assessment Fees: | $ <<brokerMaintenanceFee>> |
| Current Year Property Taxes: | $ <<propertyTaxesCurrent>> |
| Late/Other Fees: | $ <<otherFeesCurrent>> |
| Total Amount Due for Current Year: | $ <<feesCurrentTotal>> |

Past Due Fees Due:

| | 7716 |
|---|---|
| Prior Year(s) Assessment Fees: | $ <<brokerMaintenanceFeePrevious>> |
| Prior Year(s) Property Taxes: | $ <<propertyTaxesPrevious>> |
| Prior Year(s) Late/Other Fees: | $ <<otherFeesPrevious>> |
| Total Amount Due for Prior Year(s): | $ <<feesPreviousTotal>> |

Resort Transfer Fees:

| | 7718 | |
|---|---|---|
| Resort Transfer Fee | $ <<resortTransferFee>> | |
| Outstanding Mortgage | $ <<mortgageBalanceYN>> | $ <<mortgageBalance>> |
| Right of First Refusal | $ <<rightOfFirstRefusal>> | |
| Pre-Approve New Purchaser | $ <<preapproveNewPurchaser>> | |

Please send any funds to be collected at closing, along with a copy of the Warranty Deed to:

<<mailingAddress>> ← 7720

Signed: /s/ <<signingAgent>> ← 7722
Date: <<eDate>>

Resale Transfer Agreement

Escrow #: <<fileNumber>>  —— 7802

7800

This agreement is made between

Person Providing timeshare resale transfer services

Name: <<brokerCompanyName>>
Address: <<brokerAddressStreet>>, <<brokerAddressCity>>, <<brokerAddressState>>, <<brokerAddressZip>>
Phone Number: <<brokerPhoneNumber>>
Fax Number: <<brokerPhoneNumberFax>>
E-mail address: <<brokerEmailAddressSeller>> —— 7804
Website: <<brokerURL>> and

Consumer Timeshare Reseller

Names: <<sellerNames>>
Address(es): <<sellerAddressFull>>
Phone Numbers: <<sellerPhoneNumber>> —— 7806
Fax Number:
E-mail addresses: <<sellerEmailAddress>>

Escrow Agent

—— 7808

Amount to be paid by or on behalf of Consumer Timeshare Reseller to Person Providing Timeshare Resale Transfer Services for the Timeshare Resale Transfer: $<<salesPrice>>.00
—— 7810

1. No fee, cost, or other compensation may be paid to the person providing the timeshare resale transfer services before the delivery to the consumer timeshare reseller of written evidence that all promised timeshare interest transfer services have been performed, including, but not limited to, delivery to both the consumer timeshare reseller and the timeshare plan managing entity of a copy of the recorded instrument or other legal document evidencing the transfer of ownership of or legal title to the consumer resale timeshare interest to the transferee, accompanied by the full name, address, and other known contact information for the transferee.

All funds or other property that are received from or on behalf of a consumer timeshare reseller pursuant to this resale transfer agreement shall be deposited into an escrow account pursuant to this paragraph. A fee, cost, or other compensation that is due or that will be paid to the person providing the timeshare resale transfer services must be held in such escrow account until the person providing the timeshare resale transfer.

THIS ESCROW AGREEMENT, entered into this _____ day of _____, _____ by and between <<sellerName1>> and <<sellerName2>>, hereinafter referred to collectively as "Seller" or "Owner" as the case may be, and <<buyerName1>> and <<buyerName2>>, hereinafter referred to collectively as "Buyer" or "Renter" and _____ _____, hereinafter referred to alternatively as "PCS" or "Escrow Agent." Buyer/Renter and Seller/Owner are sometimes referred to herein collectively as the "Parties."

| Buyer/Renter Information:<br>Physical Mailing Address:   7906<br><<buyerAddress>><br><<buyerCity>>, <<buyerState>> <<buyerZip>><br>Phone: <<buyerPhone>><br>Phone 2: <<buyerPhoneCell>><br>Fax: _____<br>E-mail: <<buyerEmailAddress>> | Seller/Owner Information:<br>Physical Mailing Address:   7908<br><<sellerAddress>><br><<sellerCity>>, <<sellerState>> <<sellerZip>><br>Phone: <<sellerPhone>><br>Phone 2: <<sellerPhoneCell>><br>Fax: _____<br>E-mail: <<sellerEmailAddress>> |
|---|---|

Fig. 79

SYSTEM AND METHOD FOR TRANSFERRING A TIMESHARE PROPERTY

RELATED DISCLOSURES

The present application claims priority to U.S. Provisional Patent Application Ser. No. 61/815,389, filed on Apr. 24, 2013, and U.S. Provisional Patent Application Ser. No. 61/902,462, filed on Nov. 11, 2013, both of which are hereby incorporated by reference in their entirety.

FIELD OF THE DISCLOSURE

The present disclosure relates to a system and method for transferring property, and in particular to a system and method for producing a transfer document for transferring timeshare property.

BACKGROUND

A timeshare is a property with a particular form of ownership or usage rights. In particular, the rights to this type of property can be held by multiple parties with designated periods of time in which each party has priority to use their rights to occupy the property. This can often be in the form of days, weeks, etc. and may take place at the same time each year. In other words, an owner of a timeshare property may have rights to the property for the same week in April each year. The property rights, however, do not grant ownership to the property but rather only rights to use for the allotted period of time.

When a seller desires to sell his or her right to the timeshare, the sale is generally treated as real property and can be sold to another party. Many of the processes for transferring rights to a timeshare require significant time and money to complete.

SUMMARY

In a first embodiment of this disclosure, a computer-executable method is provided for producing a title transfer document for transferring a timeshare property. The method includes providing a program that includes a set of instructions executable by an electronic computing device; executing a resort property module of the program, the resort property module being executable to request information including the type of transaction being executed, resort name associated with the timeshare property, owner number associated with the timeshare property, a unit number associated with the timeshare property, and a designated week associated with the timeshare property; executing a party information module stored in the program, the party information module being executable to request information about a current owner, a new owner, and how title will vest upon completion of the transfer; executing a documentation module stored in the program, the documentation module being executable to receive any document from the current owner or new owner related to the transfer; executing a payment module stored in the program, the payment module requesting information about purchase price and any fees due associated with maintenance fees; receiving input data from each of the modules; locating a document template including at least one identifier; linking the input data with the at least one identifier in the document template; and producing a title transfer document from the at least one document template for transferring the title of the timeshare property.

In one example of this embodiment, the execution of each module includes electronically downloading a predefined screen layout to the electronic computing device for requesting the input data. In a second example, the method includes storing the input data as a transaction file on a server or in a database. In a third example, the method includes displaying an application status bar on a screen of the electronic computing device during the execution of each module. In a fourth example, the method includes requesting user identification and acknowledgement of a set of conditions for starting an application process before the executing a resort property module. In a fifth example, the method includes receiving a user identification from the electronic computing device; communicating with a server or database for a file associated with the user identification; and displaying contents of the file on a screen of the electronic computing device, wherein the contents include at least one unfinished or finished application.

In a sixth example, the executing a resort property module includes requesting whether a power of attorney document will be used by at least one party of the transaction. In a seventh example, the executing a party information module includes requesting if the current owner and new owner includes more than one person or company. In an eighth example, the method includes executing an address verification module during or after the execution of the party information module, the address verification module being executable to verify an address of at least one of the current owner and new owner with a third party address system. In a ninth example, the locating step comprises locating a review application template from a template library stored on a server or in a database, the review application template including a plurality of identifiers positioned within the template, linking each of the plurality of identifiers in the review application template with the input data, producing a review application file from the review application template, and displaying the review application file on a screen of the electronic computing device.

In another embodiment, a computer-executable method is provided for executing an electronic program stored on a server for producing a title transfer document in a timeshare property. The method includes requesting a user identification to enable the program for executing a set of instructions stored on the server, where the set of instructions form part of the program; receiving the user identification and requesting a file stored on the server or database that is in electronic communication with the program, the file being associated with the user identification; sending an instruction to an electronic device to request a type of transaction to be executed, wherein the type of transaction includes at least a removal of a current owner from the title or changing ownership to a new party; receiving a communication from the electronic device in response to the request; executing a plurality of modules for requesting information about the timeshare property, fees associated with the timeshare property, and at least one party of the transaction; receiving input data in response to the executing step; merging the input data with at least one identifier in a document template; and producing the title transfer document upon completion of the merging step.

In one example of this embodiment, the executing step includes executing a start application module to request information about a developer of the timeshare property; executing a resort property information collection module, the resort property information collection module being executable to request information about a resort where the timeshare property is located and an owner number; executing a title type module, the title type module being executable to request information about transfer options, title insurance, unit number, and week number; executing an owner information module, the owner information module being executable to request information about a name of an owner, marital status, address, and contact information of the owner; executing a documentation module stored in the web application, the documentation module being executable to request any document corresponding to the transfer; and executing a payment module stored in the web application, the payment module requesting information about purchase price and any fees due associated with maintenance fees.

In a second example, the method includes executing an address verification module during or after the execution of the owner information module, the address verification module being executable to verify an address of at least one of a current owner and a new owner. In a third example, the method includes storing the input data in a transaction file in the web application, on the server, or in the database. In a fourth example, the method includes displaying an application status bar on a screen of the electronic device during the execution of each module.

In a different embodiment, a web-based program is stored on a server and executable over a network by an electronic computing device to produce title transfer documents for closing a transfer of timeshare property. The web-based program includes a set of instructions for executing a plurality of modules for requesting information about the timeshare property and each party involved in the transfer of the timeshare property; receiving input data from each of the plurality of modules; assigning the input data to predefined identifiers; determining which title transfer documents are necessary for closing the transfer based on the input data; locating document templates in a template library stored on the server in response to the determining step; and executing a document generation module, the document generation module being executable to identify the predefined identifiers in each document template, assign input data to each predefined identifier in each document template, and produce the title transfer documents from the completed document templates.

In one example of this embodiment, the title transfer documents include at least one of a resort transfer form, sale contract, buyer checklist, seller checklist, file cover page, third party transaction agreement, compliance and correction agreement, authorization to release information to a title company form, certificate of trust document, attorney in fact affidavit, name affidavit, fees due notice, continuous marriage affidavit, and limited liability company affidavit. In a second example, the set of instructions includes requesting a user identification to enter a web portal for executing the web-based program; receiving the user identification; and sending an instruction to the server or database to locate a file associated with the user identification stored on the server. In a third example, the set of instructions includes storing the input data as a transaction file on the server or in the database, the transaction file being associated with the user identification. In a fourth example, the process includes executing an order estoppel module to request an estoppel.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 12 is a schematic of a screen for requesting notification settings information;

FIG. 16 is a schematic of a screen providing details of existing applications for a given user or login credentials;

FIG. 24 is a schematic of a screen for providing details of a transfer application status;

FIG. 26 is a schematic of an introductory or welcome letter as part of a closing document package;

FIG. 27 is a schematic of a file cover page as part of a closing document package;

FIG. 28 is a schematic of a file checklist for a seller as part of a closing document package;

FIG. 29 is a schematic of a file checklist for a buyer as part of a closing document package;

FIG. 30 is a schematic of a third party transaction agreement as part of a closing document package;

FIG. 31 is a schematic of a compliance and correction agreement as part of a closing document package;

FIG. 32 is a schematic of a resort transfer form as part of a closing document package;

FIG. 33 is a schematic of an additional purchaser form as part of a closing document package;

FIG. 34 is a schematic of a contract document as part of a closing document package;

FIG. 35 is a schematic of an authorization to release information to a title company as part of a closing document package;

FIG. 36A is a first portion of a schematic of a certificate of trust document as part of a closing document package;

FIG. 36B is a second portion of the schematic of FIG. 36A;

FIG. 37 is a schematic of an attorney in fact affidavit document as part of a closing document package;

FIG. 38 is a schematic of a name affidavit document as part of a closing document package;

FIG. 39A is a first portion of a schematic of a limited liability company affidavit document as part of a closing document package;

FIG. 39B is a second portion of the schematic of FIG. 39A;

FIG. 40A is a first portion of a schematic of a continuous marriage affidavit document as part of a closing document package;

FIG. 40B is a second portion of the schematic of FIG. 40A;

FIG. 41 is a schematic of a fees due notice document as part of a closing document package;

FIG. 42A is a first portion of a schematic of an owner/seller affidavit document as part of a closing document package;

FIG. 42B is a second portion of the schematic of FIG. 42A;

FIG. 49 is a schematic of one block in the process of FIG. 44 for executing a notification settings module;

FIG. 52 is a flow diagram of executing a process for a rental application as part of the process of FIG. 51;

FIG. 53 is a flow diagram of executing a process for a sale application as part of the process of FIG. 51;

FIG. 62A is a partial schematic of one block of the process of FIG. 51 for providing application information for a given registered account;

FIG. 69 is a schematic of one screen of the process of FIG. 65 for executing a resort information module;

FIG. 72 is a schematic of one screen of the process of FIG. 65 for executing a party information module;

FIG. 73 is a schematic of another screen of the process of FIG. 65 for executing a party information module;

FIG. 75 is a schematic of one screen of the process of FIG. 65 for executing an application processing module;

FIG. 76B is a second portion of the schematic of FIG. 76A;

FIG. 77A is a first portion of a schematic of an assessment certificate and estoppel letter template;

FIG. 77B is a second portion of the schematic of FIG. 77A;

FIG. 78 is a schematic of a resale transfer agreement template; and

FIG. 79 is a schematic of an escrow agreement template.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
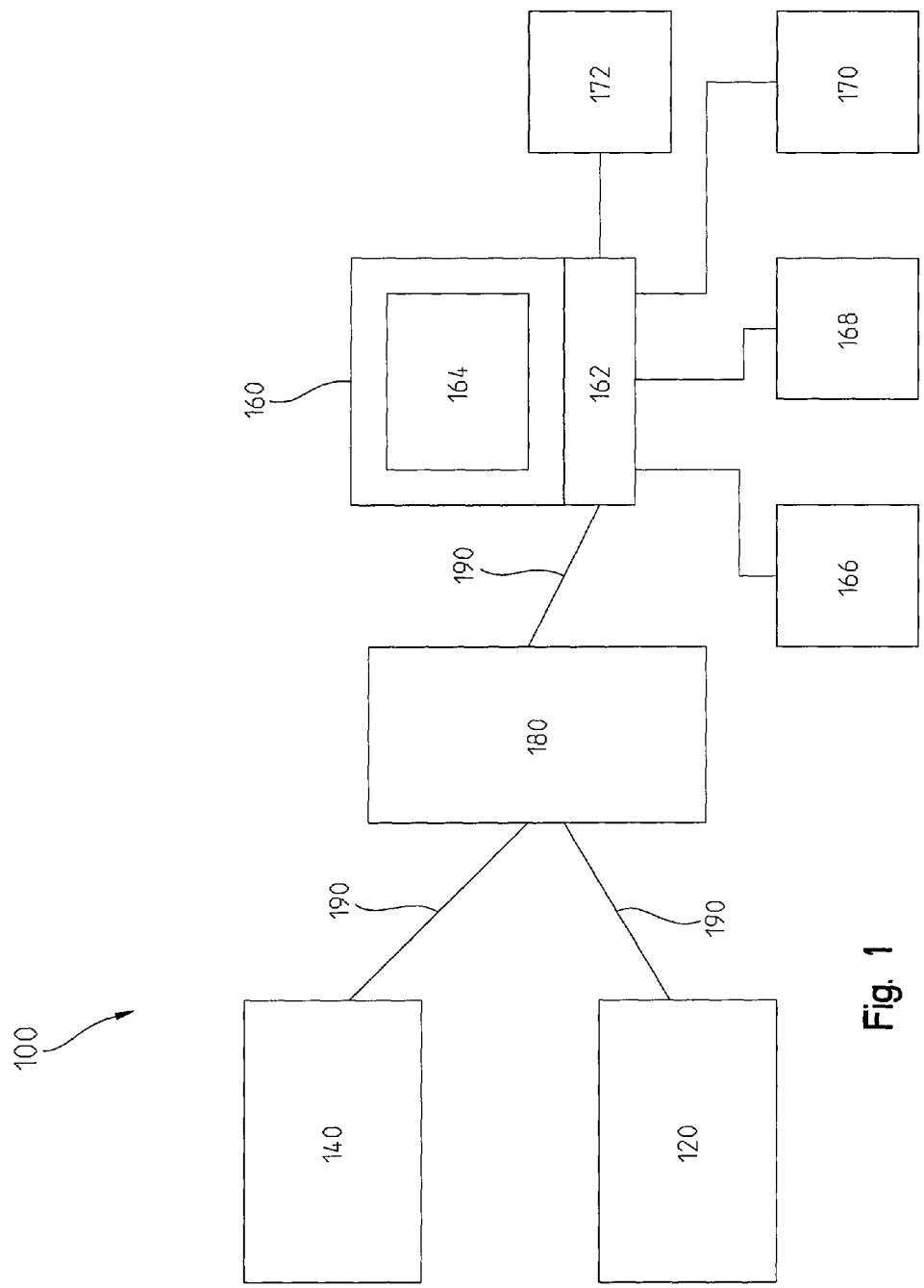
FIG. 1 is a system diagram of one embodiment of the present disclosure.

Referring to FIG. 1, a conventional computer system 100 is provided for implementing, accessing, and using various embodiments of the present disclosure. The computer system 100 is illustrated as part of a networked computer system including one or more individual user computers 120, 140 and 160 (e.g., desktop or PC-based computers, workstations, etc.) coupled to a server 180 (e.g., a PC-based server, a minicomputer, a midrange computer, a mainframe computer, etc.) through a network 190. Network 190 represents a networked interconnection, including, but not limited to local-area, wide-area, wireless, and public networks (e.g., the Internet). Moreover, any number of computers and other devices may be networked through network 190, e.g., multiple servers. Each individual computer therefore can access the Internet through the network 190.

User computer 160, which may be similar to computers 120, 140, may include a central processing unit (CPU) 162, a number of peripheral components such as a computer display 164, a storage device 166, a printer 168, and various input devices (e.g., a mouse 170, keyboard 172, microphone, camera, etc.) and output devices such as speakers (not shown). The computer server 180 may be similarly configured, albeit with greater processing performance and storage capacity, as is well known in the art.

Figure 2:
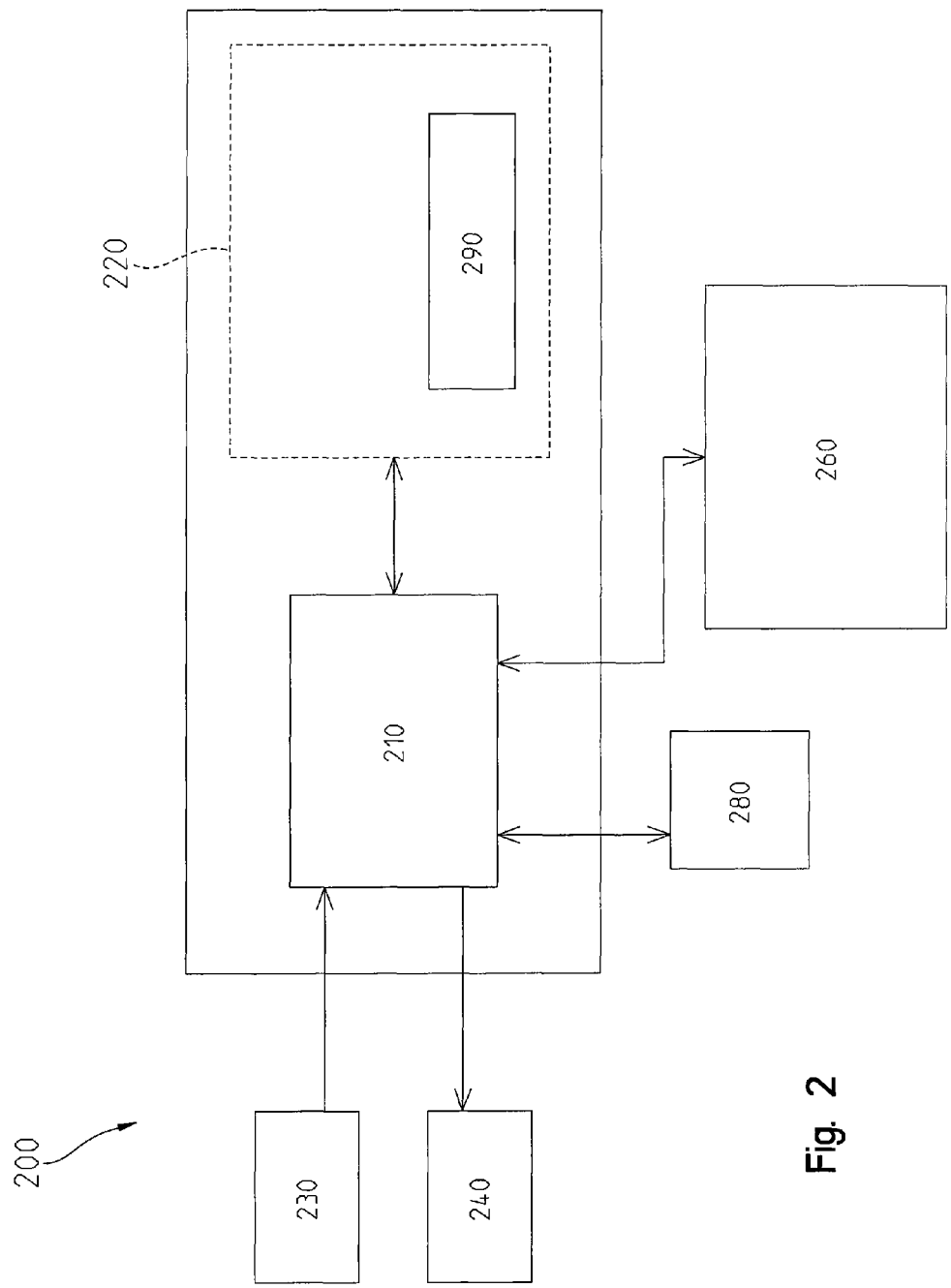
FIG. 2 is another system diagram of a hardware and software arrangement for implementing, accessing, or executing a process as disclosed herein.

FIG. 2 further illustrates a conventional hardware and software environment for an apparatus 200 suitable for implementing, accessing, or using one or more of the embodiments of the present disclosure. For the purposes of the disclosure, apparatus 200 may represent a computer, computer system or other programmable electronic device (e.g., mobile phone, PDA, laptop, etc.), including: a client or user computer (e.g., similar to computers 120, 140 and 160 of FIG. 1), a server computer (e.g., similar to server 180 of FIG. 1), a portable computer, an embedded controller, etc. Apparatus 200 will hereinafter also be referred to as a "computer," although it should be appreciated the term "apparatus" may also include any other suitable programmable electronic device consistent with the disclosure.

Computer 200 can include at least one processor 210 coupled to a memory 220. Processor 210 may represent one or more processors (e.g., microprocessors), and memory 220 may represent the random access memory (RAM) devices comprising the main storage of computer 200, as well as any supplemental levels of memory, e.g., cache memories, non-volatile or backup memories (e.g., programmable or flash memories), read-only memories, etc. In addition, memory 220 may be considered to include memory storage physically located elsewhere in computer 200, e.g., any cache memory in a processor 210, as well as any storage capacity used as a virtual memory, e.g., as stored within an information database 260 or on another computer coupled to computer 200 via network 280.

Computer 200 also may receive a number of inputs and outputs for communicating information externally. For interface with a user, the computer 200 may include one or more input devices 230 (e.g., a keyboard, a mouse, a trackball, a joystick, a touchpad, camera, and/or a microphone, among others) and a display 240 (e.g., a CRT monitor, an LCD display panel, and/or a speaker, among others). It should be appreciated, however, that with some implementations of computer 200, e.g., some server implementations, direct user input and output may not be supported by the computer, and interface with the computer may be implemented through client computer or workstation networked with computer 200.

For additional storage, computer 200 may also include one or more mass storage devices 260 configured to store an application or software-based instructions for performing a task. Exemplary devices 260 can include: a floppy or other removable disk drive, a hard disk drive, a direct access storage device (DASD), an optical drive (e.g., a CD drive, a DVD drive, etc.), and/or a tape drive, among others. Furthermore, computer 200 may include an interface with one or more networks 280 (e.g., a LAN, a WAN, a wireless network, and/or the Internet, among others) to permit the communication of information with other computers coupled to the network. It should be appreciated that computer 200 typically includes suitable analog and/or digital interfaces between processor 210 and each of components 220, 230, 240, 260 and 280.

Computer 200 can be operated under the control of an operating system 290, and executes various computer software applications, components, programs, objects, modules, etc. Moreover, various applications, components, programs, objects, modules, etc. may also execute on one or more processors in another computer coupled to computer 200 via a network 280, e.g., in a distributed or client-server computing environment, whereby the processing required to implement the functions of a computer program may be allocated to multiple computers over a network.

In general, the routines executed to implement one or more of the embodiments of the disclosure, whether implemented as part of an operating system or a specific application, component, program, object, module or sequence of instructions will be referred to herein as "computer programs," or simply "programs." The computer programs typically comprise one or more instructions that are resident at various times in various computer memory and storage devices. When a program is read and executed by a processor, the program causes the computer to execute a module, a step, an instruction, or an element embodying the various aspects of the disclosure. In this disclosure, a "module" can be one or more instructions or steps that is executable to achieve a result or a desired task. A "program" can include one or more "modules", and each "module" can be executed to request certain information, receive certain information, or otherwise perform a certain operation.

Moreover, while the disclosure has and hereinafter will be described in the context of fully functioning computers and computer systems, those skilled in the art will appreciate that the various embodiments of the disclosure are capable of being distributed as a program product in a variety of forms, and that the disclosure applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various programs described hereinafter may be identified based upon the application for which they are implemented in a specific embodiment of the disclosure. However, it should be appreciated that any particular program nomenclature that follows is used merely for convenience, and thus the disclosure should not be limited to use solely in any specific application identified and/or implied by such nomenclature. As described above, in this disclosure one or more embodiments may refer to a process, method, program, module, logic, algorithm or set of instructions to describe one or more actions being executed. In each case, the process, method, program, module, logic, algorithm or set of instructions may execute one or more blocks, steps, or set of conditions, depending upon the process or program being executed. This may include making calculations, executing a program or process within a larger program or process, or otherwise making determinations to advance or return to previous blocks or steps. A control system that includes a computing device such as a user computer, network, server, database, web-based program, etc. can execute each process, method, program, module, logic, algorithm or set of instructions as necessary to complete a desired task. In other instances, the program, process, module, method, algorithm, etc. can be stored on a removable drive, including a CD, DVD, memory card, memory disk, memory stick, or any other removable device capable to storing a program.

Figure 3:
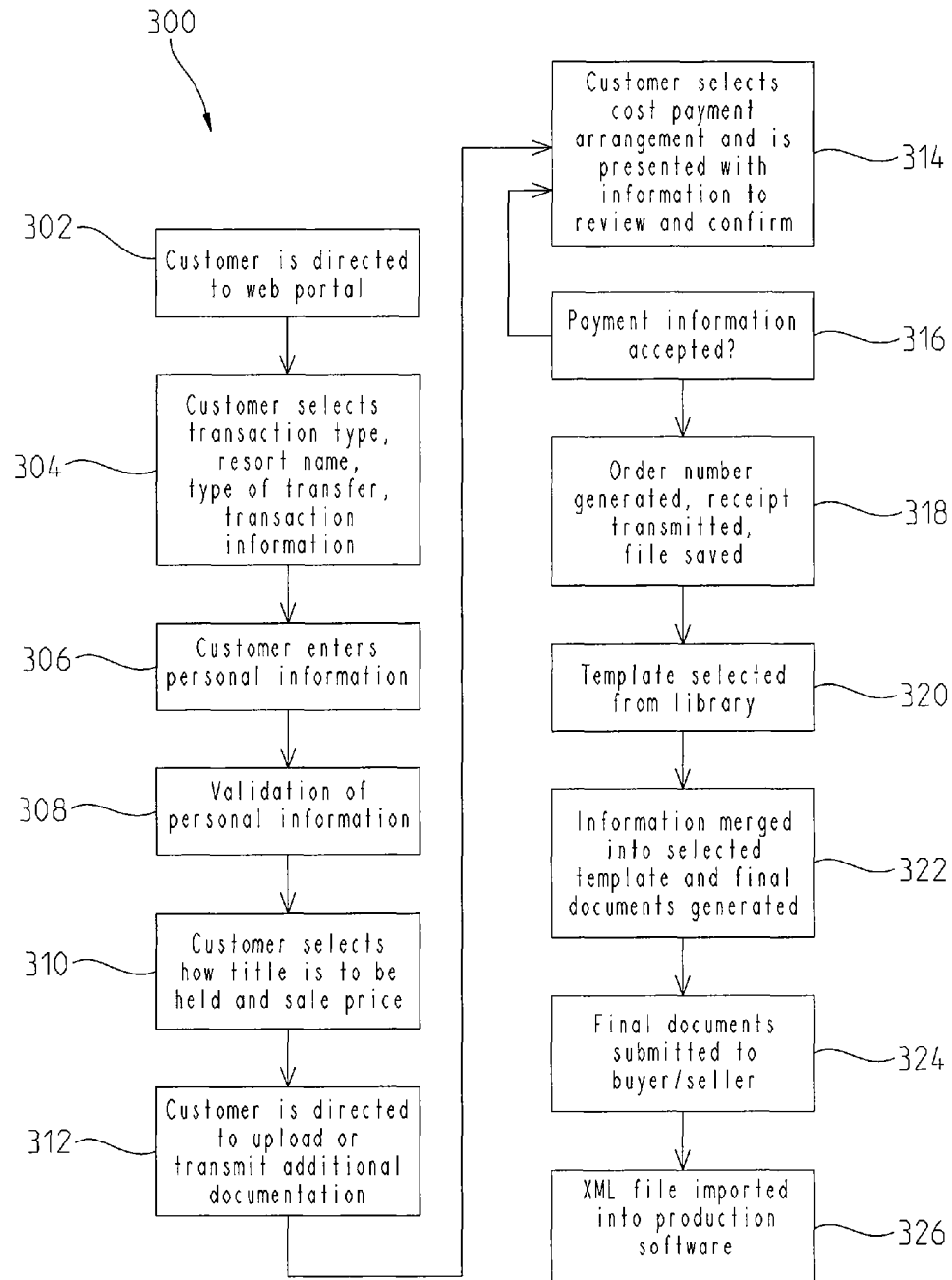
FIG. 3 is a flow diagram of one embodiment of the disclosure.

Referring to FIG. 3, for example, an embodiment of a method 300 for processing the transfer of a timeshare is provided. In this process or method 300, an owner of timeshare rights can access a computing device such as a computer 160, mobile device, or the like and access an electronic database 260 for initiating the process 300. In doing so, the owner may access a web portal (e.g., website or link) or other means for accessing the database via block 302. The web portal, for example, may be stored on a computer server 180 and accessible via a network 190, for example. A web-based program, for example, may be accessed over the Internet to facilitate the execution of blocks set forth in process 300. Two examples of a web portal or application for executing this process 300 can be found at http://www.Timeshareproplus.com and http://www.Closemytimeshare.com, the contents of both of which are hereby incorporated by reference. Moreover, the process 300 can be stored in a memory and include a set of instructions for execution by a process of the computer. An example of a web portal screen 400 is shown in FIG. 4.

The web portal 400 can be accessed by a user who enters a requisite address in a web browser to access the Internet. The web address is unique to the web portal 400. As shown in FIG. 4, once the user enters the required web address into a web browser, the web portal 400 can be displayed on the user's computer display, for example. The web portal 400 can include and display a selectable link 402 for allowing a previous, registered user to enter and access the database. In addition, a second selectable link 404 is displayed which can be selected for accessing help or assistance with the web portal 400. A login box or display 406 can be displayed on the web portal screen 400 as shown in FIG. 4 and include a first text box 408 and a second text box 410. The first text box 408 can be selectable by a user such that text (e.g., letters, numbers, symbols, etc.) can be entered therein. In the example of FIG. 4, an email address associated with a previous, registered user can be entered in the first text box 408. The second text box 410 can be similar to the first text box 408 such that a password or other user-identifiable code can be entered therein. The password or code can be one created specifically by or for the registered user and is linked or associated directly with the email address (or user identification entered in the first text box 408). The email address or user identification and password or code can be stored on a web server or in a database stored on the server. As such, this information may be retrievable by the system 100 each time a user attempts to enter the database.

The web portal screen 400 can also display a selectable button 412, icon, or link for executing a login operation. By selecting the button 412, the processor can request information from the server or database to determine whether the email address, user identification, user name, etc. and associated password or code can be located and identified to a registered user. In the event a registered user is unable to remember his or her password, a selectable link 416 is displayed on the web portal screen 400.

Figure 4:
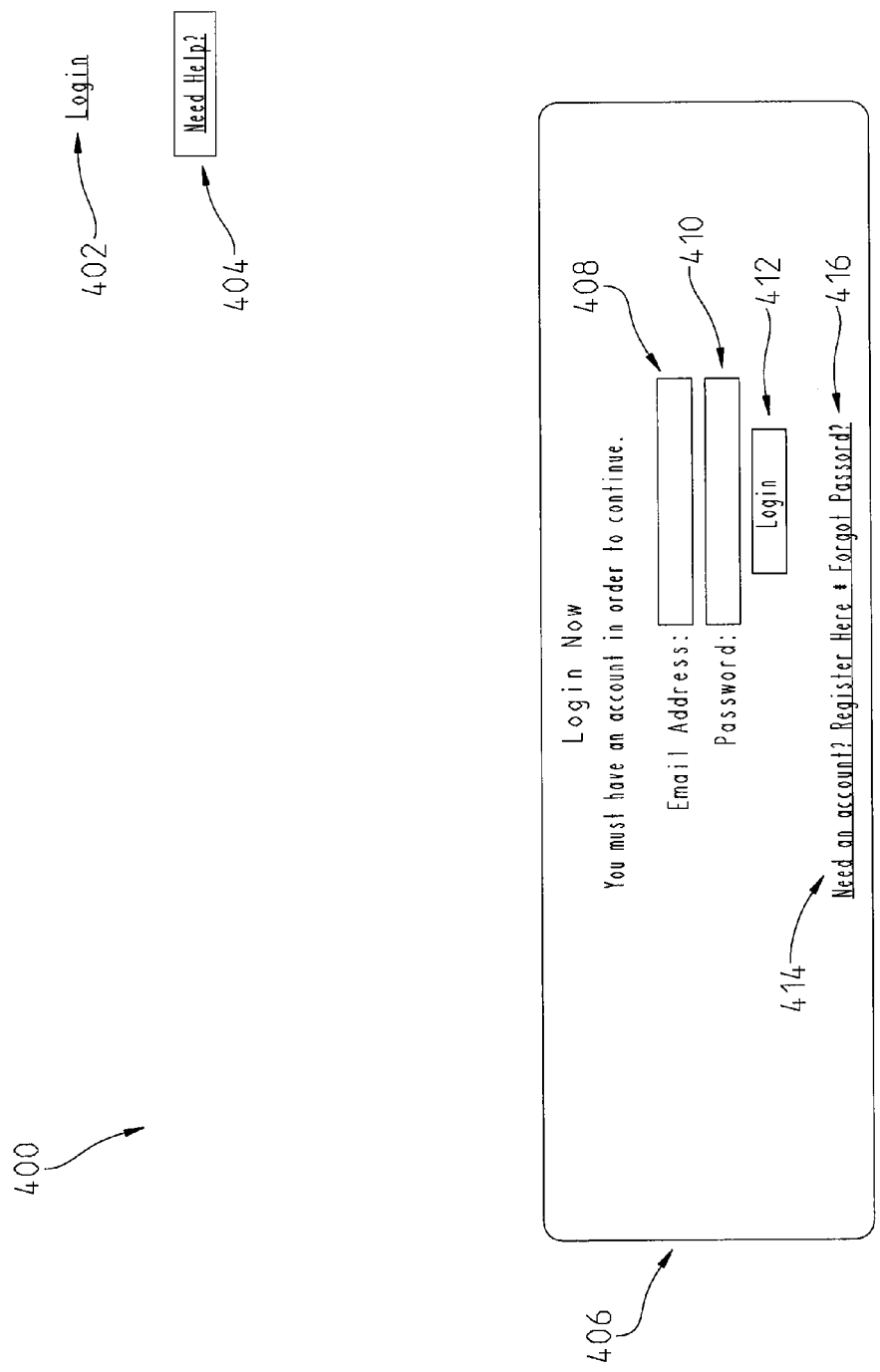
FIG. 4 is a schematic of a login screen.

In FIG. 4, the owner of the timeshare rights or a broker title company representative may be asked one or more questions related to the identification of the owner. For instance, the owner may first create an account through the web portal. To do so, the web portal screen 400 can display a selectable link 414 for creating a user-identifiable account or registration. The account can be a function of various criteria, such as email address, name, location, or a user-identifiable login name. The owner may further be asked to enter a unique password or code in the form of letters (lowercase, uppercase), numbers, symbols, etc.

Figure 5:
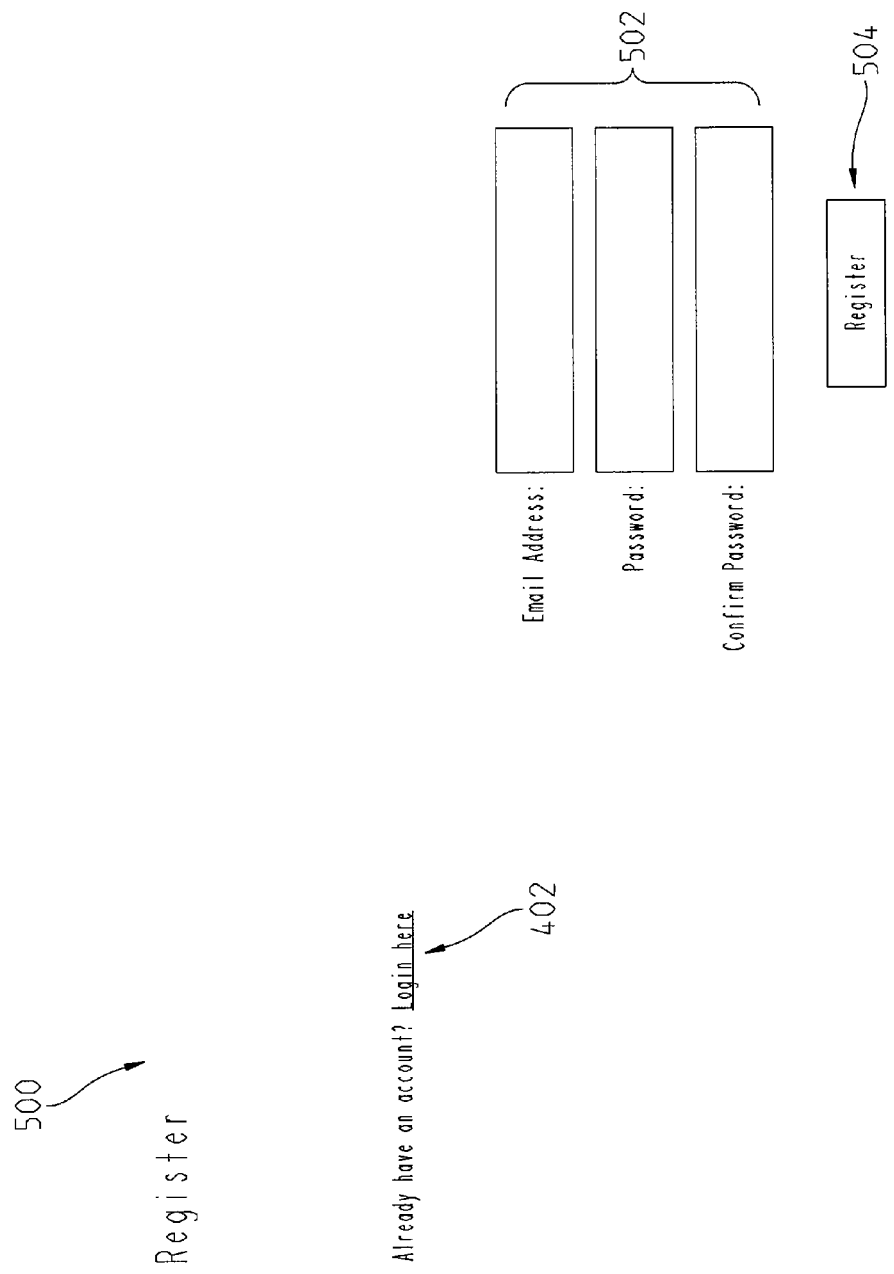
FIG. 5 is a schematic of a screen for registering an account.

An example of a registration screen 500 for setting up and registering an account is provided in FIG. 5. Here, the screen 500 can display a plurality of selectable text boxes 502 for a user to enter information. For instance, the user may be asked for an email address, user name, or login name. In some instances, there may be requirements in terms of the number of letters (uppercase, lowercase), numbers, or symbols that form the user name or login name. The user may also be asked to create a password that is to be associated with the email address, user name, or login name. The system may have requirements for the password as well in terms of length and type of characters (uppercase letter, lowercase letter, number, symbol, etc.).

In one aspect of this embodiment, a broker handling a timeshare transfer may be required to setup a username and password. This may particularly be the case for a broker who is handling multiple transactions or is representing different owners or timeshare companies. In a buyer-seller transaction without a broker involved, neither party may be required to create a username and password. In this instance, each party may only have a single transaction and thus the process 300 may be executed without the need to log into the web portal 400. For purposes of this embodiment, a broker is involved in the transaction and thus the broker may be required to register an account or log into an existing account in order to enable or advance the timeshare transfer application process 300 of FIG. 3.

Once the various requirements are satisfied in the plurality of text boxes 502, the user (e.g., a broker in a transaction) can click or select a selectable register button 504 as shown in FIG. 5. By selecting this button, this information can be communicated over the server and saved to a memory file in the database or some other location that allows it to be located and retrievable if entered at another time via the web portal screen 400. As also shown in FIG. 5, the registration screen 500 may also display a selectable login button which allows a registered user to be directed to or redirected to the portal screen 400 for logging into the database.

As previously described, once the broker or user creates an account, the web-based program or system stored on the server 180 can execute instructions to display a screen indicating the account has been registered. In addition to the registration complete screen, the now-registered user can click a link to log into the timeshare transfer system. The login screen can be similar to the one shown in FIG. 4 and described above. In the event the user has forgotten his or her password, a link can be provided to assist with recovering said password. Moreover, if the user has additional questions or needs help, a similar link 404 as shown in FIGS. 4 and 5 can be provided for the user to receive assistance.

Figure 6:
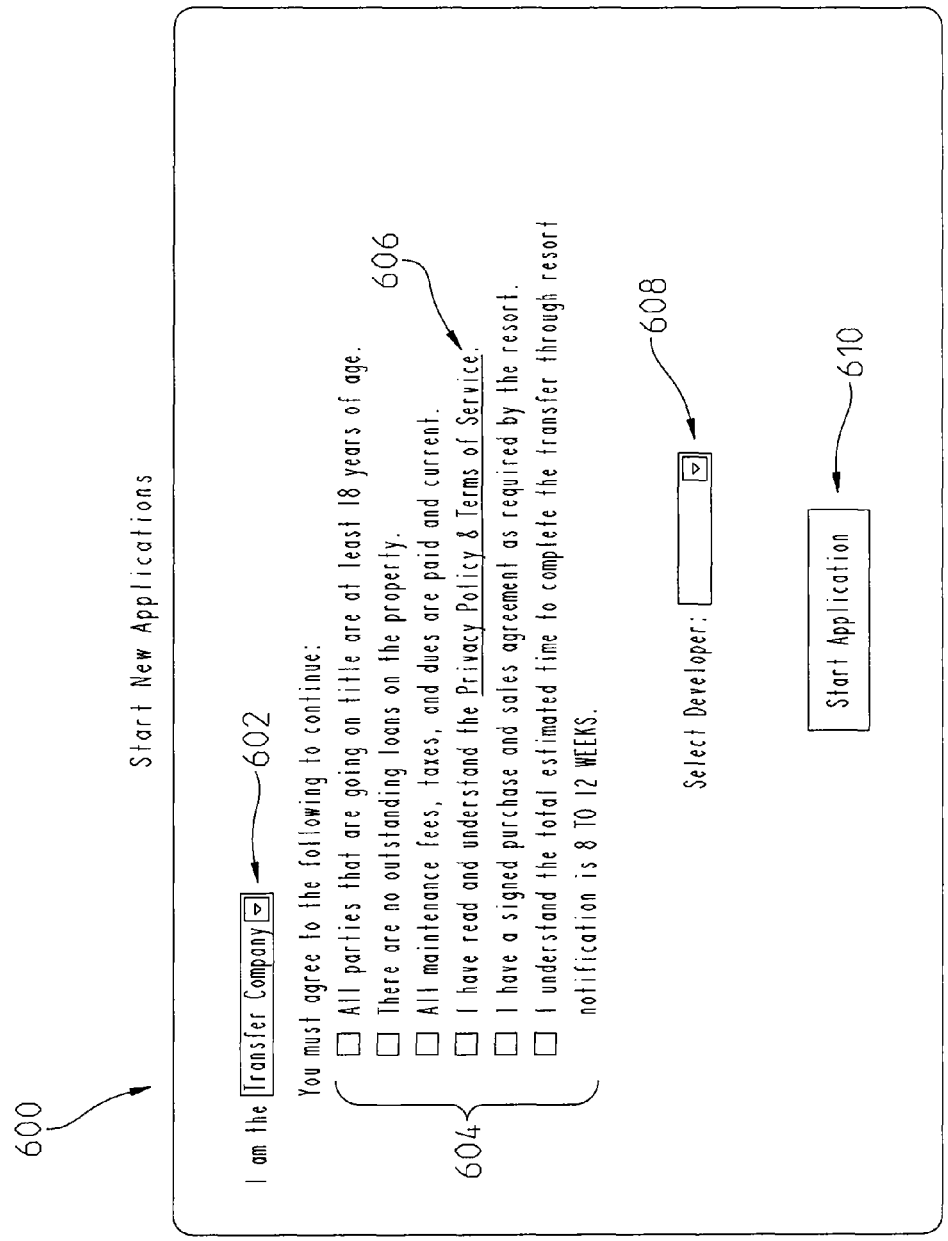
FIG. 6 is a schematic of a screen for starting a new transfer application.

Once the user has logged into his or her account, the application process 300 is enabled or triggered to advance to display a screen 600 similar to the one shown in FIG. 6. Here, the process 300 presents a plurality of questions to the user including the role of the user via a drop-down menu 602. The drop-down menu can include options such as seller, buyer, or transfer company. In other embodiments, additional parties such as brokers, realtors, or other parties to a transfer may be able to log into the system.

Before the user can access the system, the process 300 further displays a list of questions or requirements via the web-based program to continue. This list can include, for example, 1) all parties that are being listed on a title are of a certain age; 2) there are no outstanding loans on the property; 3) all maintenance fees, taxes, and dues are paid and up-to-date; 4) user has read and understood the privacy policy and terms of service; and 5) user has a signed purchase and sales agreement as required by a timeshare resort. In the event one or more of the conditions cannot or is not affirmed, the process 300 of FIG. 3 cannot advance to block 304.

As shown, the privacy policy and terms of service can be stored in the web-based program or on the server and are accessible via a selectable link 606 displayed in the screen of FIG. 6. If clicked, a privacy policy or terms of service can be retrieved and displayed to the user. The user can also be asked to select a developer or resort name from a drop-down menu 608. This information can be downloaded to the server and list any of a plurality of different developers. The list of developers from the menu 608 may change over time, and as it does, the menu will be continuously updated. Once each box or requirement has been selected or affirmed and a developer is selected from the drop-down menu 608, the process can advance once the "Start Application" button 610 is selected.

Figure 7:
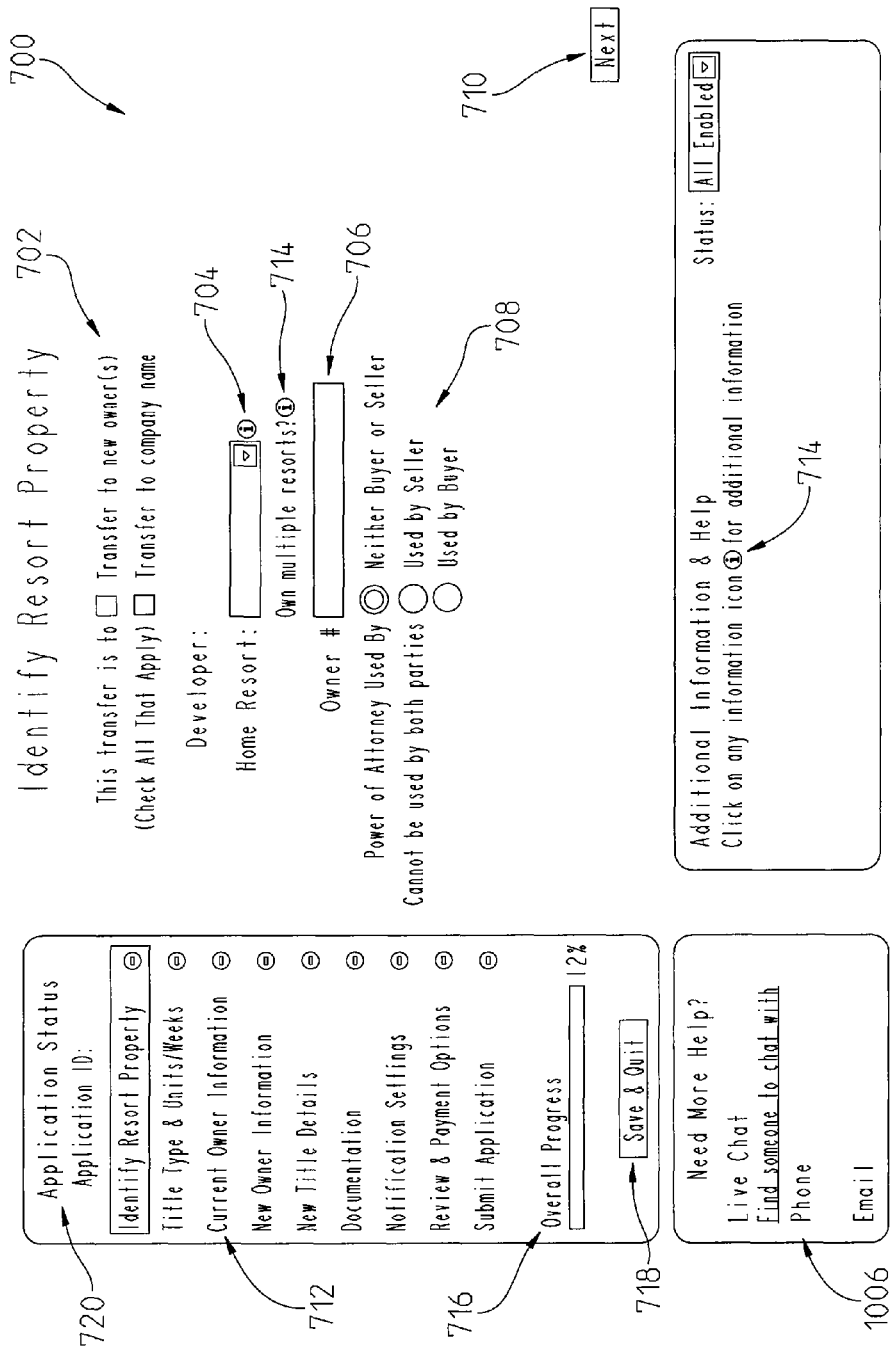
FIG. 7 is a schematic of a screen for requesting resort property information.

Once button 610 is selected, the web-based program advances within its set of instructions to further execute the application process 300. In block 304, the process 300 can present one or more questions related to the transaction and transfer. In FIG. 7, for example, a screen 700 may be displayed to the user requesting information about the transaction type (e.g., a transfer to a new owner, a company, charity, etc.). Here, the user can select one or more of the options from a selectable button or box 702. The screen 700 can once again show the name of the developer, and from a drop-down menu 704 the process 300 can ask the user to select a resort name. In at least one embodiment, the resort name corresponds to at least one or more resorts owned or managed by the developer. If there are multiple transactions, the process 300 may require the user to submit a new application for each transaction. As shown in FIG. 7, an information button or icon 714 can be displayed which can provide additional details to the user if a mouse cursor either is placed over the icon 714 or the icon is selected.

The process 300 may also request the owner's or seller's number that is associated with the property being transferred. In FIG. 7, a text box 706 can be displayed on the screen 700 such that the user can enter this information therein. Moreover, depending on the type of transaction, a power of attorney may be required. A list of options may be displayed on the screen 700 related to a power of attorney document. As shown, a selectable icon or button 708 can be provided on the screen 700 for the user to select, where the option may correspond to neither buyer or seller are submitting a power of attorney form, only buyer is submitting a power of attorney form, or only the seller is submitting a power of attorney form. In other aspects, the web-based program may be able to produce a power of attorney document that is provided to the user via email or other known ways. The screen 700 can further display a continue or next button 710 that is selectable to advance from screen 700. Once the information requested by the process 300 is provided by the user, selection of the continue button 710 can advance the process 300.

As also shown in FIG. 7, an application status or progress menu 712 can be presented by the process 300 on the screen 700. A defined application number or identification 720 that is associated with the transfer is shown in the status menu 712. A similar progress bar 716 is displayed in the status menu 712 to graphically represent the progress being made through process 300. A list of steps or items required for completion can also be shown in the status menu 712, and if a user wants to return to a previous screen, the user may select one of the steps or items displayed in the status menu 712. In other words, each step or item may be presented as a selectable link which allows the user to select a certain step and the web-based program can advance the process 300 forward or backwards (via one or more steps) through the process 300. In addition, the status menu 712 can further display a selectable button 718 which allows the user to save the current transaction at any step in the process 300. The user can then quit and return later to complete the transaction by selecting the button 718.

In block 304, the user may be asked for additional information related to the transfer and timeshare property. As shown in another screen 800 in FIG. 8, the user can select either a "Deeded Week" or "Points" as part of the transfer. In some cases, the resort property may be neither a "deed" property or a "week" property, and therefore a response may not be necessary. A text box 802 can be displayed on the screen 800 so that the user can manually enter the number of points associated with the transfer. Alternatively, the process 300 can retrieve from a memory unit, the server or database and preload the number of points associated with the selected property that is available for the transfer. In the event only a portion of the total number of points is being transferred, the user may be able to adjust the number of points displayed in the text box 802. Alternatively, if the transfer is for a week, the user can make the requisite selection. Moreover, the user can enter the unit number and week number associated with the timeshare transfer in a first text box 804 and a second text box or drop-down menu 806. If there is an additional unit or week, the user can select a corresponding icon to add the additional information.

Once the user enters the information requested, a confirmation screen can display seeking confirmation regarding the selections made by the user. The user can select either to confirm or cancel the information previously entered. To continue to the next screen, the user can select the "Next" button 710, or to return to the previous screen the user can select a "Previous" button 808 on the screen.

In some aspects, on at least one of the screens in this process 300, the screen can display a plurality of options that are selectable by the user. For instance, in FIG. 8, the screen 800 displays near the top thereof a first selectable link 810, a second selectable link 812, and a third selectable link 814. The first selectable link 810 can be associated with a user's profile. The user can select this link 810 and be directed to another screen that displays profile information for the user. In this instance, a signal or request can be sent to the server to retrieve information from a user's profile which is saved on the server or database. This may include the user's name, contact information, property owned as a timeshare or otherwise, completed transactions, pending transactions, transactions in process, etc. The second link 812 can offer the user an opportunity to change the password associated with the user (i.e., user name, login name, email address, etc.). By selecting the second link 812, the processor can execute a set of instructions for displaying a change of password screen (not shown) so that the user can change the user password. The set of instructions may form part of the web-based program or may be a separate program executably stored on the server. Moreover, the third selectable link 814 is a logout link that, by selecting, the processor can execute a logout script or process for exiting the transfer process 300. In some instances, the progress made in a current transaction can be saved so that the user may return to the same transaction at a later time.

Block 304 of the web-based program can be a data gathering or an information collecting step. As shown in the different screen images, the program can execute a set of instructions to retrieve the data or information via one or more screens. Once the system has collected information related to the transaction and transfer property in block 304, the process 300 can advance to block 306 and execute the set of instructions by requesting information about the seller or owner of the timeshare property. An example of this is shown in a display screen 900 in FIG. 9. Information requested can include a full name, marital status, home phone number, mobile phone number, work phone number, country, and complete residential address including city, state, and zip code of the owner or seller. The screen 900 can display a plurality of text boxes, menus, and the like to receive this information from the user.

As residential address information is received by the web-based program in block 308, the server 180 can collect the information in real-time and search over the network 190 (e.g., the Internet) to verify that the address information corresponds to a verifiable address in accordance with United States Postal Service records. In this disclosure, this verification can form part of an address verification module. An address verification box 902 is displayed on the screen 900 and communicates whether the address is verified in accordance with the United States Postal Service records. Once the address, or a similar address, is uncovered, the web-based program can display the residential address on the screen for the user to review and affirm. Once the address is affirmed, the user can select a link or button 904 to add another owner, advance to the next screen (via button 710) or return to a previous screen (via button 808). The system can be setup to auto-fill certain information related to a second owner, such as if the first and second owners share the same residential address information. This information can be obtained from the server or database depending on the setup.

Figure 9:
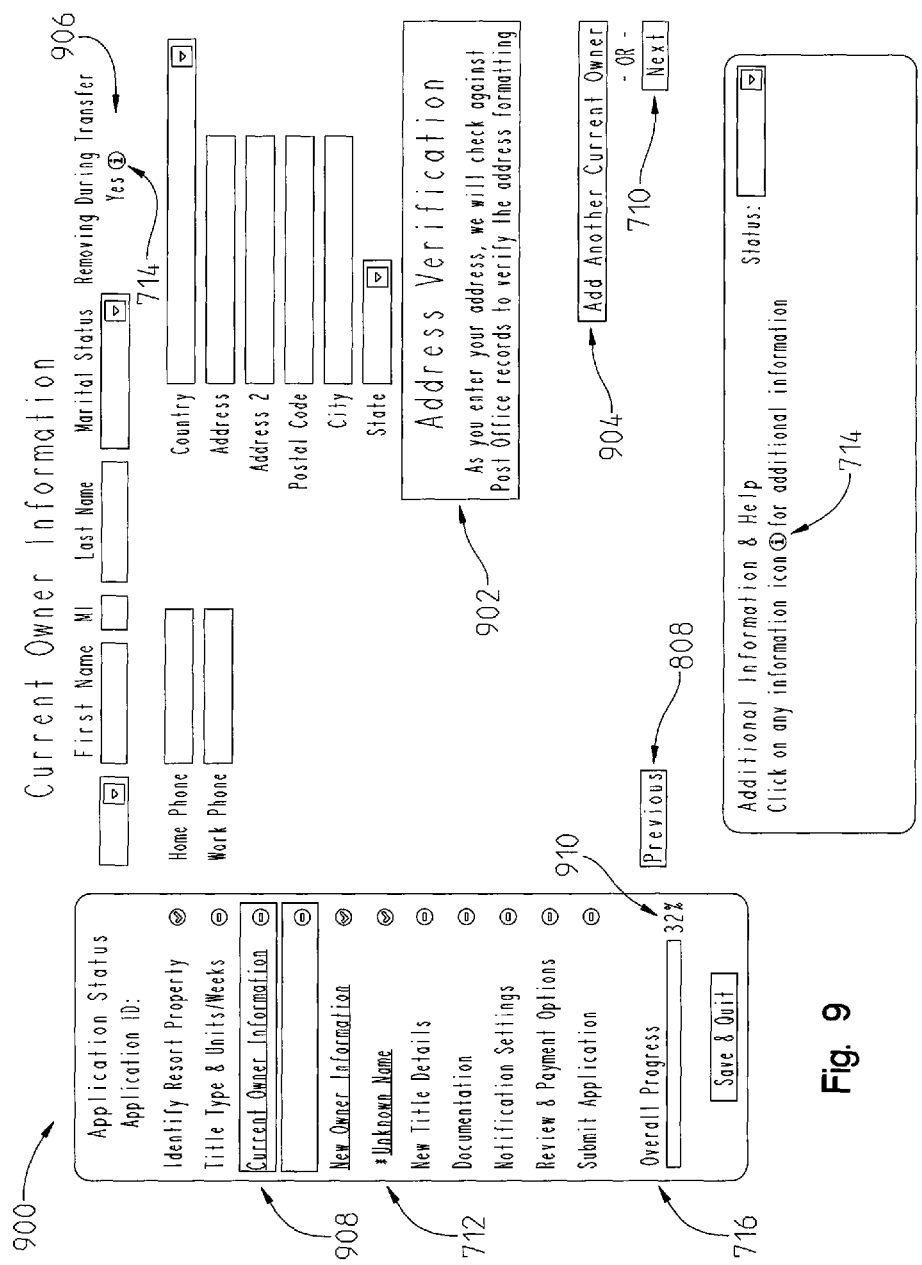
FIG. 9 is a schematic of a screen for requesting information about a current owner.

In FIG. 9, the screen 900 can be arranged with a selectable menu or link 906 to remove a current owner from the property during the property transfer. In addition, as the user progresses through the transfer process 300, the status menu 712 continues to advance through the steps or blocks to be completed. As shown in FIG. 9, the "Current Owner Information" icon or link can be highlighted or displayed in such a way that distinguishes it from the other steps or icons. In this manner, the screen 900 alerts the user to which step or steps the user is completing or has completed. Moreover, the graphical progress bar 716 can further display that the user is a certain percentage 910 through the process 300. In this manner, the user can elect to save the current transaction and return at a later date if necessary.

Figure 10:
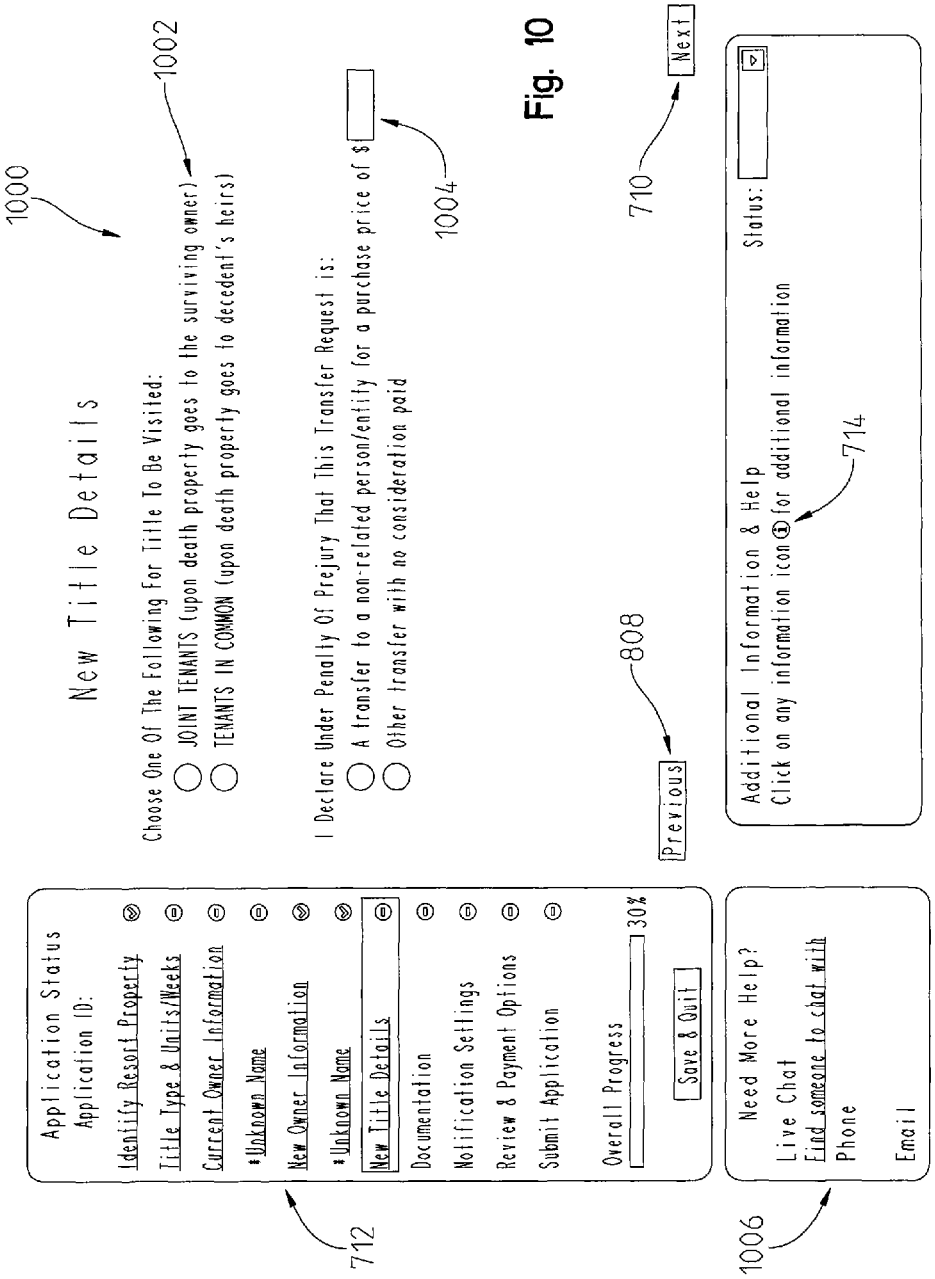
FIG. 10 is a schematic of a screen for requesting information about a new title.

In block 310, the web-based program or process 300 executes another set of instructions to request the user to select how title in the transfer property is to be held. In FIG. 10, for example, a screen 1000 can display a plurality of selectable icons or buttons 1002 related to title ownership. Here, the screen 1000 displays a first option related to joint tenant ownership and a second option related to tenants in common ownership. There may be other options in other embodiments, and in some instances, the options may vary based on the state in which the property is located and what is deemed appropriate and legally enforceable under federal and state laws.

The screen 1000 further displays a statement that the user asserts under the penalty of perjury that the transfer is being made based on some type of consideration. A plurality of selectable options 1004 can be displayed on the screen 1000 which can be used to indicate a purchase price, other value other than a dollar amount, or that no consideration is being paid (e.g., a gift for charity). Other options may be displayed in other embodiments. Once again, to advance from the screen 1000, the user can click either the "Next" or "Previous" buttons on the screen to move to a different screen.

As also shown in FIG. 10, the process 300 may offer a display window 1006 that allows a user to seek help via a live chat window. The live chat function may be controlled by a separate program or process that is independent from the transfer process 300. This may be controlled over the network 190 via a separate, third party web-based program. In any event, the screen 1000 can display a link or selectable icon or button to access the live chat function. By selecting this link, a different window or program may open on the user's computer to facilitate the live chat function. The type of support is not restrictive and can relate to the type of transaction, resort type, etc.

Figure 11:
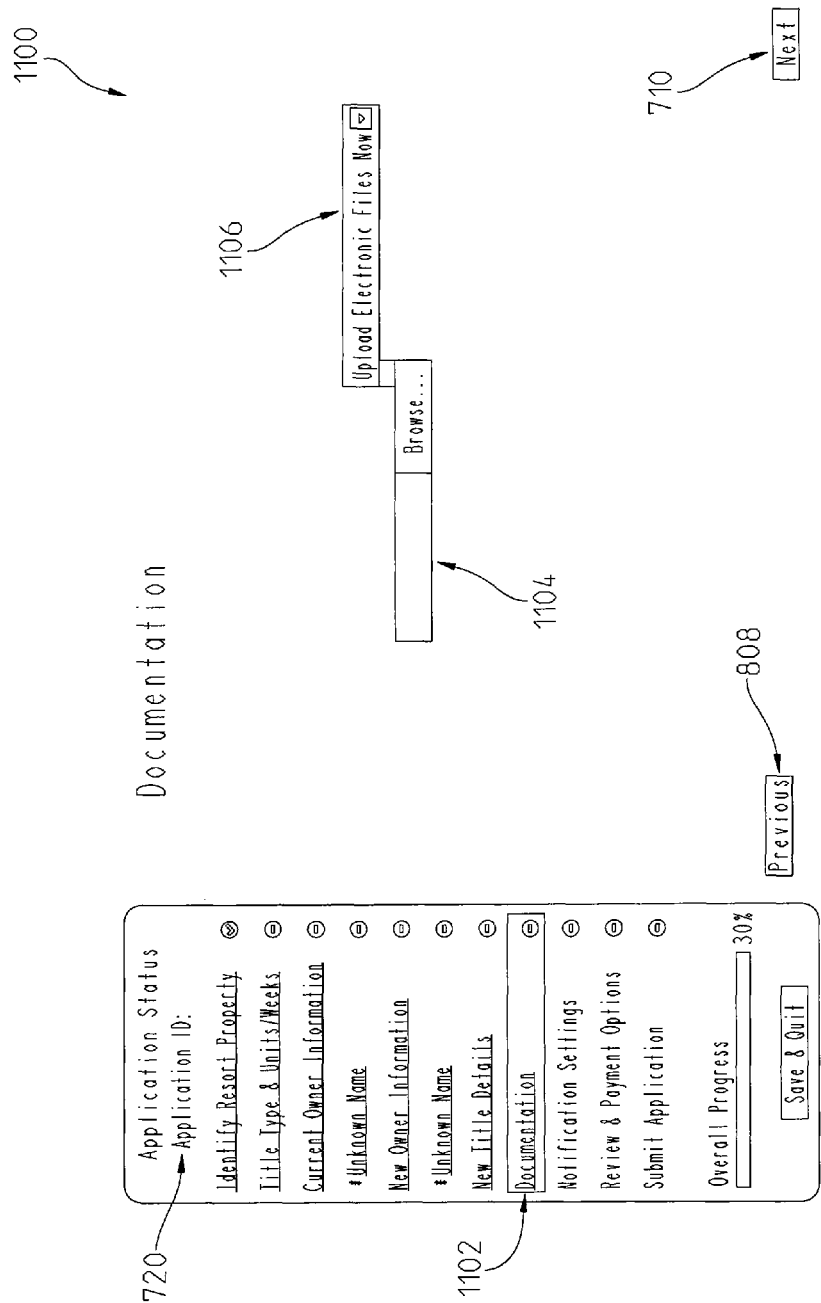
FIG. 11 is a schematic of a screen for requesting documentation for completing a transaction.

In block 312, the process 300 advances to a documentation module or step 1102 in which a different screen 1100 can provide instructions and a mechanism for the user to upload or transmit additional documentation over the network 190 to the server for processing. An example of this screen 1100 is shown in FIG. 11. Here, the web-based program can provide one or more options for how a document or file will be transferred via drop-down menu 1106. The user can electronically upload an executed power of attorney document, purchase and sales agreement, or any other type of document to the network 190 by selecting a selectable icon or button 1104 to add a file. The web-based program may be able to receive different file types such as .doc, .docx, .pdf, .jpg, .jpeg, .bmp, .gif, .tif, .png, etc. Other document types may also be receivable via the selectable link or button 1104. Once an instruction is communicated to the web-based program via button 1106, the user may transfer documentation via uploading it to the server, electronic mail (email), facsimile, through regular postal mail or other transfer means.

In an alternative aspect of this embodiment, a unique email address can be created for each user or application based on a unique application identification number. This is further addressed with respect to FIG. 15 below. In any event, an email address associated with the application identification number can either be provided by the web-based program, a script executed by the server, or a third party website or program. As such, a document or file may be electronically transferred to the email address associated with the application identification number and also stored in the database associated with said number. The user can be given the unique email address for accessing different documents from the web-based program.

When uploading information or documentation to the server, the server can alert the user to a successful upload when a file is electronically submitted. Moreover, if the user desires to send a file via regular mail, for example, the server can pull the address information and display such on the screen for the user. Additional information including order number can also be presented by the web-based program or server to the user as well.

The process 300 can advance to block 314 to execute a payment block or module. Here, the web-based program can request payment arrangement information from the user. For example, a new screen 1200 is displayed that is similar to the aforementioned screens with the status menu 712 configured on one side thereof. The screen can display a plurality of selectable buttons 1202 that present questions to the user for selecting who will pay transfer fees (e.g., seller, buyer, split, etc.), current and previous year maintenance fees (if applicable), club dues (if any or applicable), and previous club dues (if any or applicable). Other closing costs can be presented in the screen 1200 as well for the user to select how payment will be handled. Depending on the resort or developer, the type and number of payment options may vary. In any event, the web-based program can execute the payment block or module 314 to receive the necessary information regarding payment.

In addition to payment information, block 314 can present a plurality of text boxes 1204 that can be editable by the user to enter information such as broker company name, broker contact name, contact phone number, email address for documents, and residential address information including city, state and zip code. The user may also be asked to verify that information being submitted is truthful and correct. The user may be required to click on a box 1206 confirming that such information is truthful and correct.

Figure 13:
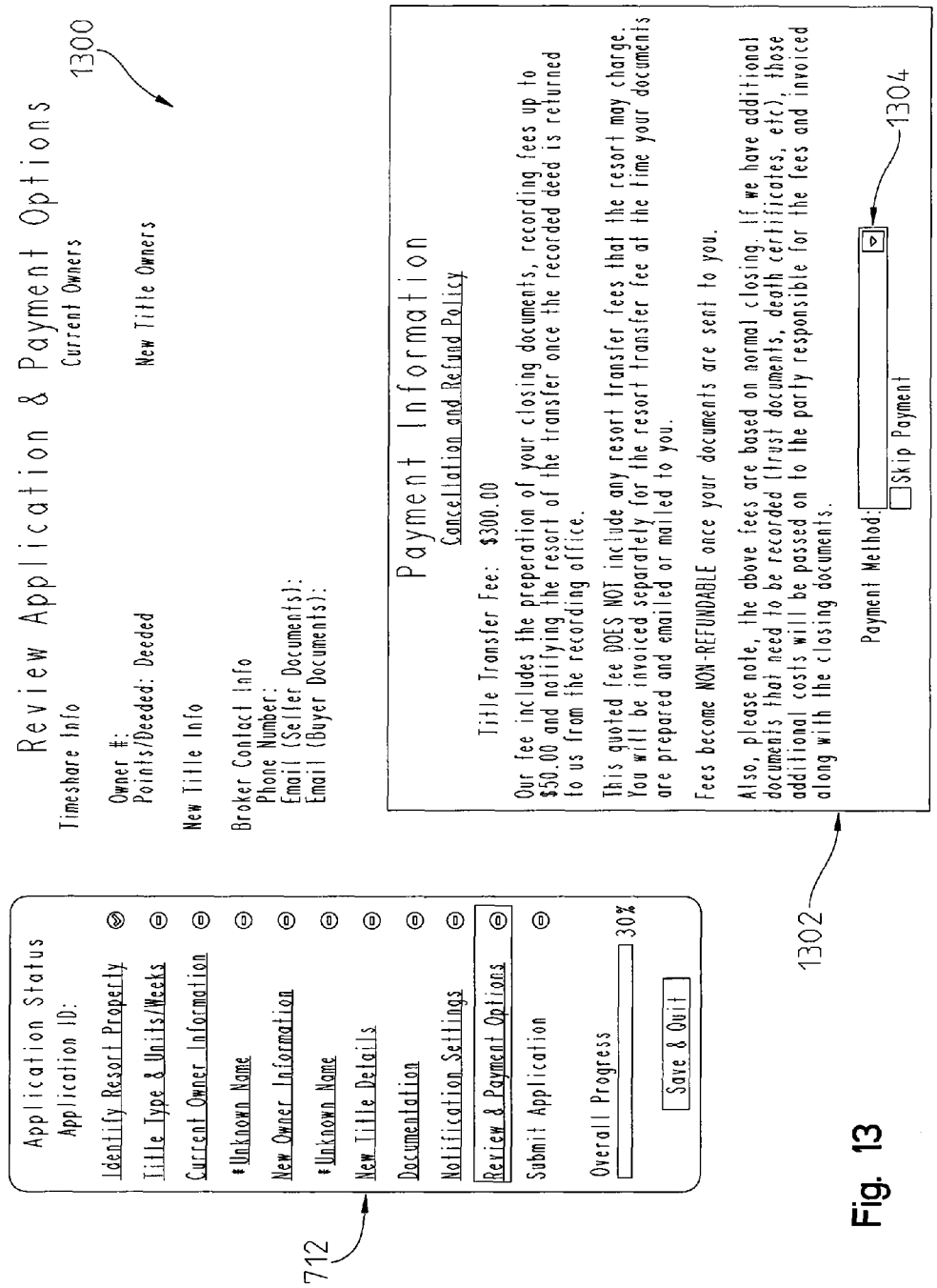
FIG. 13 is a schematic of a screen for reviewing a transaction application and providing payment options.

In block 314, the process 300 can summarize the information entered by the user and present it in a format similar to that shown in a Review Application & Payment Options screen 1300 in FIG. 13. As shown, the process 300 executes block 314 by displaying information including timeshare information (e.g., resort name, owner/seller number, type of transfer, etc.), current owner name(s), new title owner name(s), new title information (i.e., purchase price, how title is to be held), broker information, and the like. The screen layout 1300 of FIG. 13 is not intended to be limiting, and other embodiments may show more or less information depending on what is requested by the process 300 and provided by the user.

In FIG. 13, the process 300 can further be scripted to display a payment information screen 1302. Information related to the payment of the purchase price, title transfer fee, and/or closing costs may be displayed. The screen can include a drop-down menu 1304 to present the user with one or more methods of payment. The web-based program or process 300 can provide additional instructions to the user to enter the necessary information (e.g., credit card type, credit card number, name on credit card, expiration date, security code, zip code, etc.) to complete a payment transaction. Once this information is entered by the user and received by the server, the process 300 may further instruct the user to click an acknowledgment button (not shown) confirming the accuracy of the information submitted and further acknowledge the possibility of having to pay an additional charge if revisions or amendments are later required. Once all information is entered, the user can be provided a "Submit" button (not shown) on the display 1300 to effectively submit or transfer the application form to the server. A third party that handles and manages the transfer can be alerted by the web-based program or an alert from the server to access the submitted application form from the server. At this point, the application submission portion of process 300 is complete and the process can advance to an evaluation block in block 316.

Figure 14:
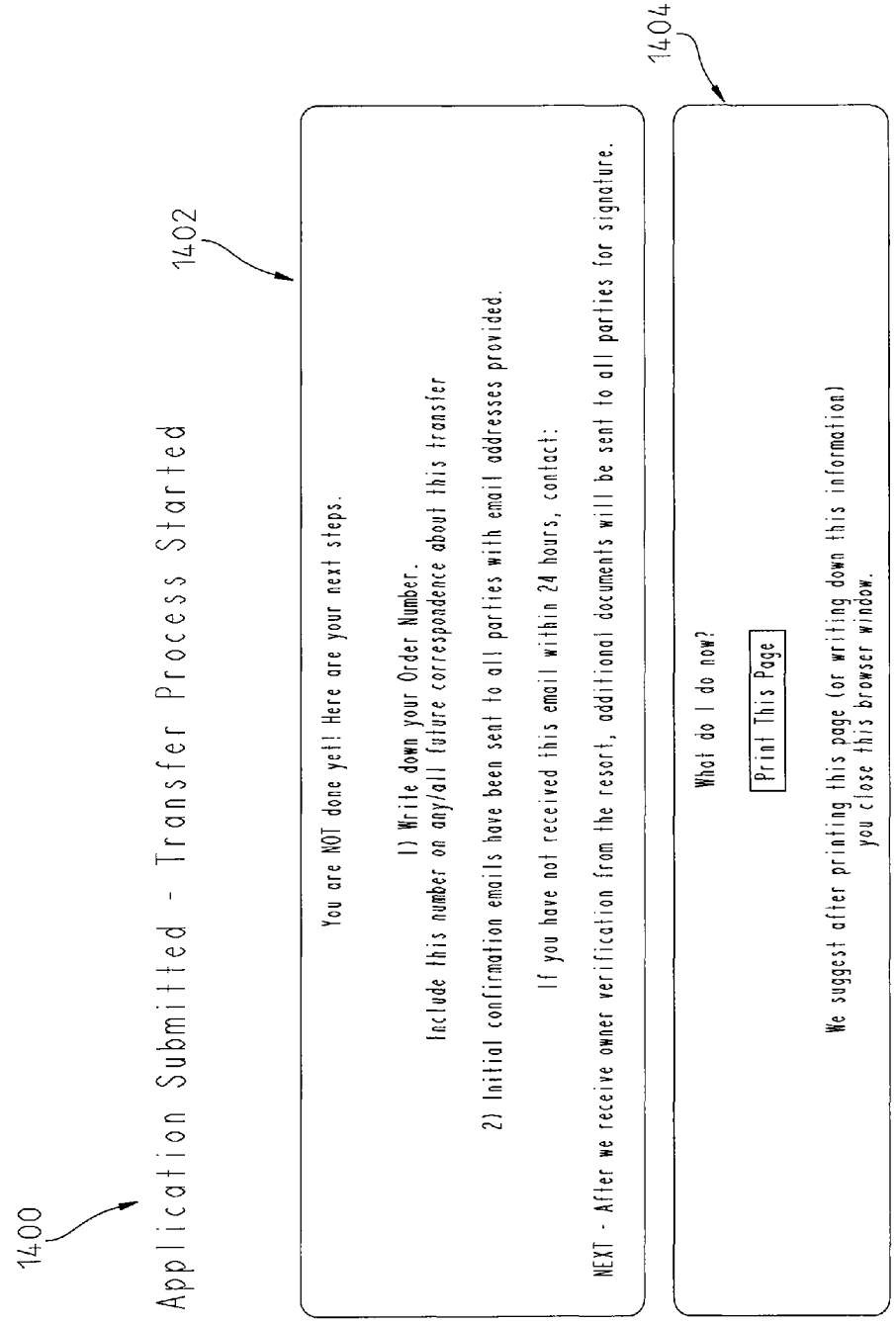
FIG. 14 is a schematic of a screen for providing details after an application has been submitted.

In block 316, the web-based program, server, processor, or other mechanism can evaluate the information received from block 316 and determine whether a payment is received and accepted. If, for example, a credit card payment is declined, the process 300 can return to block 314 and request the user to resubmit new payment information. If the payment is accepted in block 316, the process 300 can generate an order number and submit a receipt electronically to the user's email address in block 318. An example of a screen displaying this information is shown in FIG. 14.

Additional instructions can be displayed on the screen 1400 in a display area 1402. The user can be provided with an opportunity to print the page or close the window in a second display area 1404. Moreover, the remaining steps or processes required to complete the transfer are displayed for the user. Once the application has been submitted by the user, the application file can be transferred and saved to the server 180. An XML file or the like can be created for additional use. The file can be categorized and saved with other files on the server 180, or it can be saved to an alternative memory device or location. For example, there may be another server disposed in electrical communication with the main server 180 via the network 190, such that the main server 180 can store the file to the second server and retrieve it as necessary.

In block 320, once the application has been submitted and a receipt is electronically submitted to the designated email address, the process 300 can further instruct the server 180 to select a template for the particular transfer from a library of templates. The library of templates, e.g., a plurality of templates for different uses, can be electronically stored on the server or in a database on the server. The selected template can include a plurality of inputs that can receive information from the server (e.g., from the XML file) and merge or link the plurality of inputs into the selected template for generating final closing documents in block 322. The template and data can be electrically submitted to SAASPose to merge the information. Alternatively, other mail-merged electronic programs can be used to achieve similar results.

After this, the process 300 can advance to block 324 to prepare and finalize the final closing documents. The server can electronically submit the final closing documents to the buyer and seller for review. The buyer or seller may need to carry out further steps, and the closing documents may provide these instructions. The closing documents can be electronically generated by the server 180 via a program or other logic. Once documents are reviewed and returned by the buyer or seller, the process 300 can import the XML file into its production software in block 326 and download a word document version of the closing package. This package can be retained in the production software.

Figure 15:
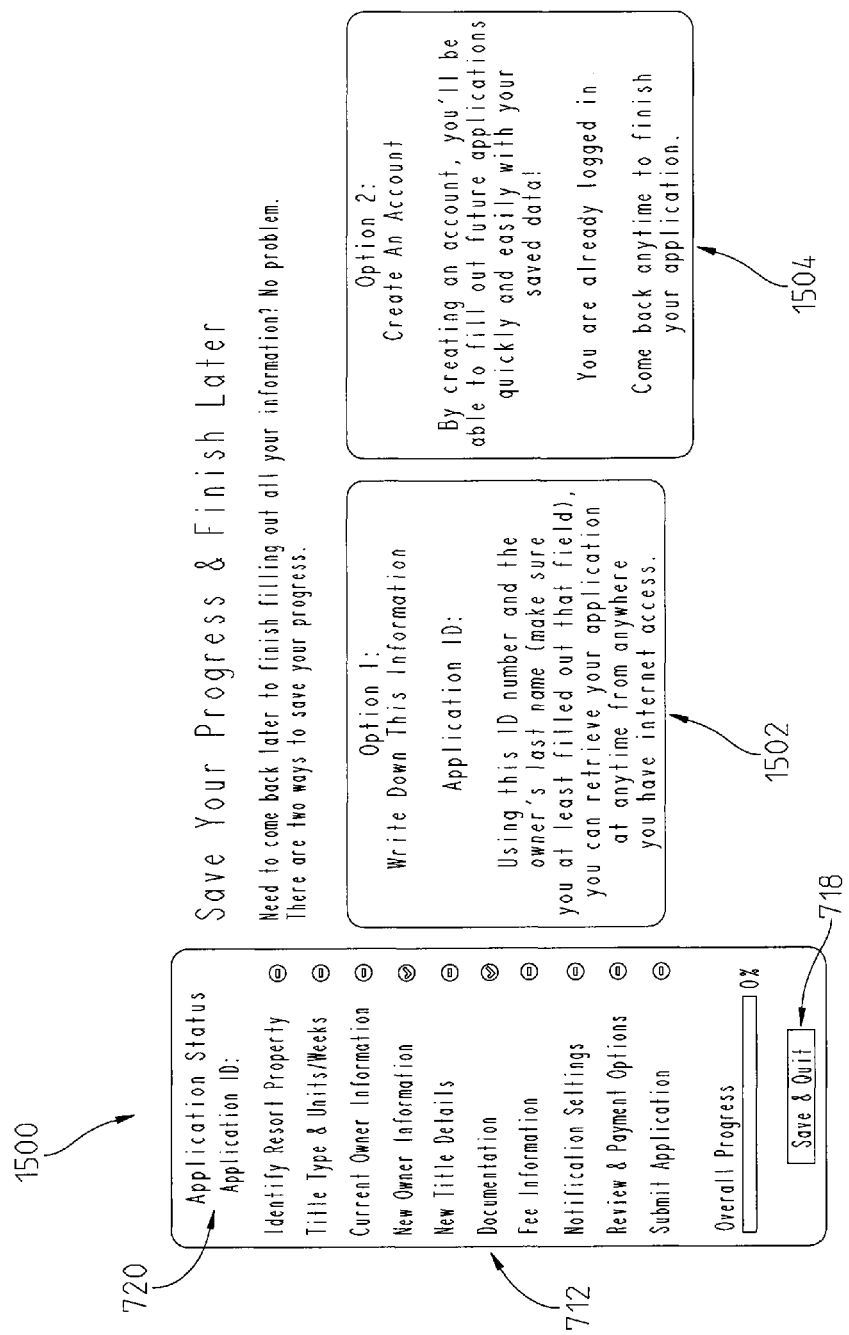
FIG. 15 is another schematic of a screen for providing details after an application is submitted or saved before completion.

In FIG. 15 and as previously described, the web-based program can display a screen 1500 as part of the process 300 such that the user can save a partially completed application at any time. Each screen layout including screen 1500 in FIG. 15 can include the "Save & Quit" selectable button 718 that is displayed in the status menu box 712 and can be enabled at any time by the user clicking on or selecting it. When a user does select this button 718, the server 180 can provide an application identification number 714 in both the status menu 712 and a first display window 1502. For instance, the web-based program may include instructions for generating an application identification number, or the server can execute a script for generating a unique identification number for each application. Alternatively, a third party website may be used to create an application number for each application started through process 300. The user may also create an account at this time by selecting an appropriate icon being displayed in a second display window 1504.

Figure 8:
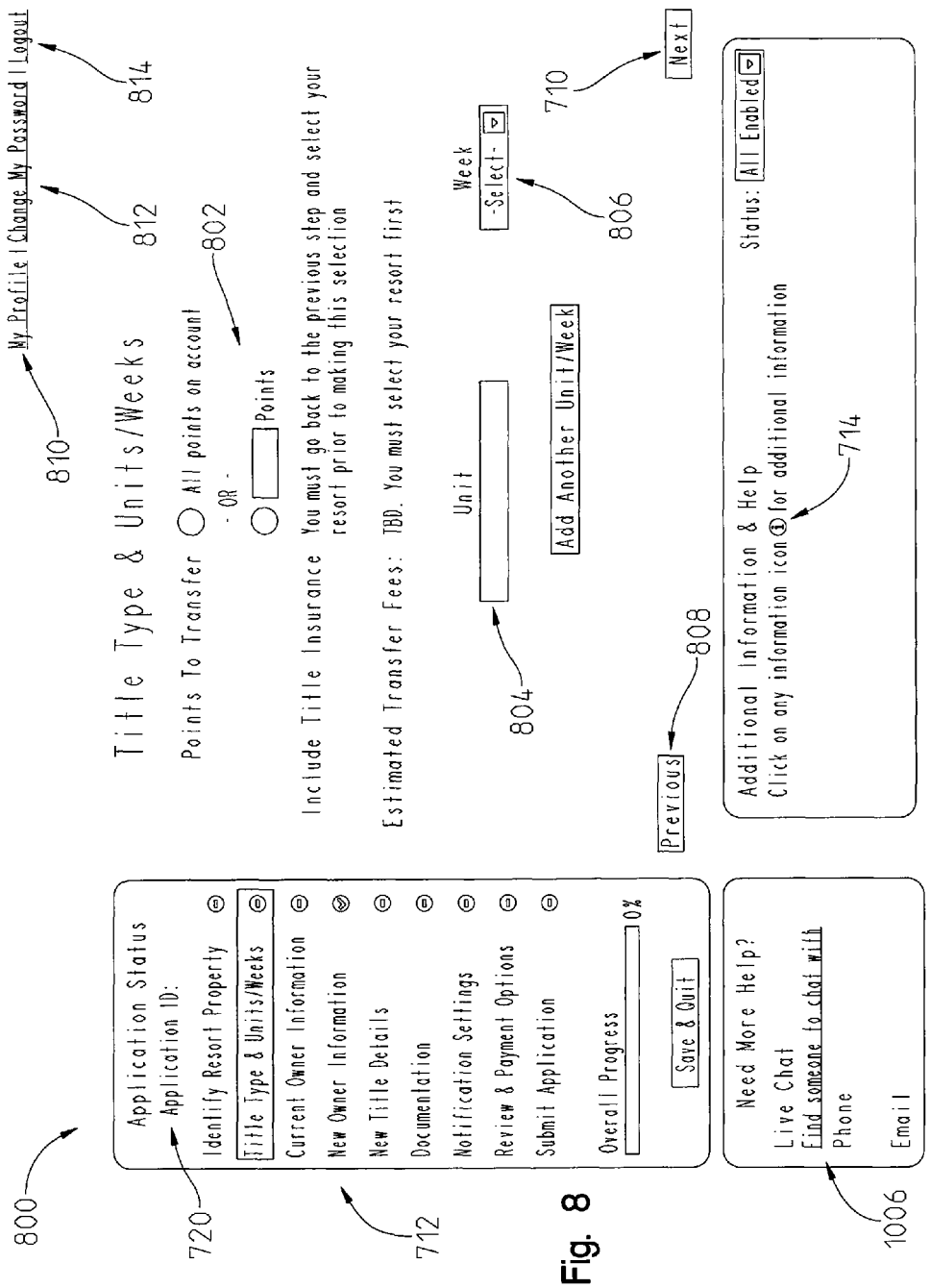
FIG. 8 is a schematic of a screen for requesting information regarding title type and number of units and weeks.

In another embodiment, a user may be presented with an option to open a partially completed application or view a pending application (e.g., to check for a status update). To do so, the user may need to login or enter into the web-based program similar to that shown in FIG. 4. Alternatively, the user can access his or her profile by selecting the profile selectable link or button 810 as shown in FIG. 8. Once the user enters his or her information, the server can retrieve all data or information related to the particular user. As shown in FIG. 16, the web-based program can receive the data or information from the server and display a profile page or screen 1600. The profile data or information can be saved to the server, a memory, a database, or other storage location such that the server 180, upon request, can locate and send this information to the processor or web-based program for display. As shown in FIG. 16, the application identification number, resort name, units/points, status, and options can be provided for each application submitted or started by a user. In other embodiments, the profile page may display more or less information. The profile page can be a template stored in the web-based program and configured to receive and display information that is transmitted to it by the server, for example. The user can select one of the applications to either review its contents or complete it by selecting an appropriate link or button in a My Application box 1602. This option can be available to a user at any time once an application has been started.

Similar to completing a partially started application, a user may also check the status of a completed application. For example, a user can login into the web-based program in a manner as similarly described above. Once logged in, the user may select the profile link or button 810 to access his or her profile. Once the server is instructed to pull or retrieve data or information for the user, the server communicates these details to the web-based program and the one or more applications can be displayed in a screen similar to that of FIG. 16. The user can then select one of the applications, or if only one application is found, then the user can select that application similar to that described above.

Figure 17:
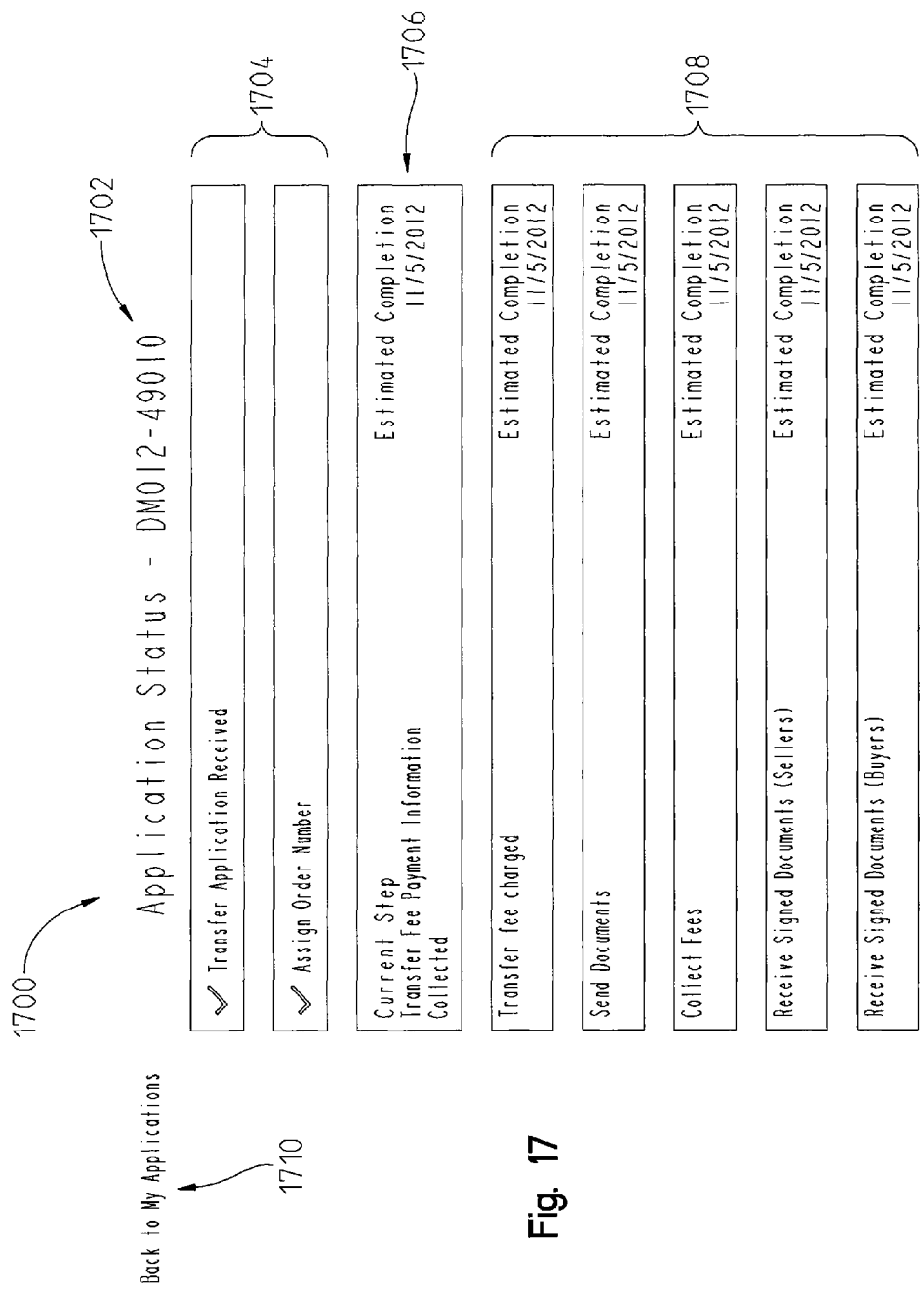
FIG. 17 is a schematic of a screen displaying status information of a stored application.

Once the user selects an application to review, the web-based program can merge or position the input data or information received from the server in a template form similar to that shown in FIG. 17. In other words, when the user desires to open a completed application, a command is sent to the server 180 to retrieve the file (i.e., data or information) associated with the submitted application. The server 180 then communicates the contents of the file to the web-based program and the contents of the file can be displayed in a manner similar to that shown in the screen 1700 of FIG. 17. The contents of the file can be displayed in an arrangement that identifies the application order number or file number 1702, one or more steps in the process that have been completed, one or more steps not yet completed, and a current step in the application process 300.

In FIG. 17, the web-based program can arrange the steps or blocks of the process 300 in the three aforementioned categories. Other categories may be displayed as well. In doing so, each category of steps or blocks can be identified in a specific way, e.g., with a different color, font, print, etc. In FIG. 17, for example, a first category 1704 of steps or blocks is shown or highlighted in a first color. Here, the first category 1704 corresponds to those steps or blocks in which information requested via the process 300 have been received as inputs from the user. This first category may be color-coded green or highlighted with a green color indicating these steps or blocks have been completed.

In a second category 1706, a current step or block in the process 300 is identified in a different way. Here, the current step or block can be identified with a blue color or highlighted in such a way to signify where in the process information was last received or the next step in the process to be completed. The second category 1706 can clearly identify this as the current step or block in the process 300, and also identify an anticipated or estimated date of completion and provide a date. This is shown as an example in FIG. 17.

In a third category 1708, one or more blocks or steps that have not yet been completed in the process 300 are identified. These blocks or steps can be identified by a different color, font, shape, size, etc. from the first and second categories. In addition, each uncompleted block or step can identify the action and estimated date of completion. In this manner, the web-based program can provide an estimated date for completing the transfer process.

In other aspects, a closing date (if known), buyer and seller names, closing officer, settlement agent, description of ordered items, and a list of documents related to the transfer may also be provided in a similar application status window or screen. Moreover, it is to be understood that the server can display more or less information depending on the type of template stored in the web-based program. The web-based program can be constructed to include a library of templates, and depending on the template, all or only some information may be displayed.

In a further aspect, the web-based program may provide the user with an ability to open any of the documents in the application status window or screen by clicking on said document in a display window (not shown), as the document can include a link or button that communicates a command to the processor or server 180 to display the requested information. This information can be saved to a main database, server, memory, etc. Moreover, the user can print the status page or any of the documents shown in the display window. As the information is displayed in the file information display box or window, each document can include a time stamp or history function that shows when a file was submitted, reviewed, or last manipulated. The time stamp or history can include a date and time, although in other embodiments this can be displayed differently. In addition, the size of each file can be displayed. In the event certain items or documents require ordering, this can be displayed in the file information display box or window.

Other aspects of the method 300, and in particular to the overall system setup and arrangement, are only provided as examples. The screen layouts and information contained therein are only provided as examples of how the system can operate and are not intended to be restrictive. Moreover, one example of the method and web-based program is available at http://home.timeshareproplus.com, which is hereby incorporated by reference. Timeshare Pro Plus includes a plurality of modules and is a cloud-based Software-as-a-Service (SAAS) application that performs various functions such as those described in this disclosure.

As described above, the aforementioned process 300 can be adapted for an owner-to-owner transaction or a transaction involving a broker title company. In the event a broker title company is involved in the transaction, the broker title company may be required to register an account in its name. An example of this is shown in a different process 1800 shown in FIG. 18. The process 1800 can include a plurality of blocks for executing a timeshare transfer. The process 1800 may include one or more blocks similar to that of the previously described process 300. For instance, the process 1800 can include a first block 1802 that is executed by a web-based program. Alternatively, the process 1800 can be stored on a memory device or computing device and thereby executed by a processor. In a web-based program, the user may open the web-based program by accessing it through the Internet and opening a web browser. In the first block 1802, the user may be required to create a new account or open an existing account. If the user is a broker title company, the web-based program may first display a screen similar to that of FIG. 4. If the broker title company already has an existing account, the user can enter an email address and password that corresponds with the existing account. In doing so, according to block 1804 of the process 1800, the email address and password are communicated by the web-based program to the server, and the server can search a database of existing accounts to determine if the information submitted corresponds to an existing account. If an existing account file is located, the server can communicate this to the web-based program. As such, the web-based program (i.e., web-based program) can advance the process 1800 to block 1804.

If, however, an existing account is not found or the user selects to create a new account, a different module or script corresponding to block 1804 can be executed by the web-based program. Here, the web-based program can collect different information including at least an email address and password to create an account. The web-based program may request additional information, including the name of the broker title company, address information, correspondence information, and a security question or two in case the user later forgets the password for the account. In any event, once new account information is submitted by the user, the web-based program sends this information over the network to the server, and the server can create a new account file and store the details thereof in the database of existing accounts. The server may save this file in a different location as well. This is one example of this embodiment.

Upon completing the requirements for logging into the system, the process 1800 can advance to a start application module within the web-based program in block 1806. As the start new application module is executed, the process 1800 can advance to block 1808 where the user is presented with a screen similar to that of FIG. 6. Here, the web-based program requests the user to identify itself as an owner, broker title company, transfer company, or other party. This can be executed by providing a drop down menu 602 as shown in the screen 600. Moreover, the web-based program can provide the user with a list of requirements necessary for executing the process 1800. The user may be asked to check a box or otherwise affirm the requirements. Alternatively, the user may affirm the requirements once the start application button or link 610 is selected. The web-based program may further request information about the developer of the property in block 1808. This information may be collected from the user in drop down menu or text box 608. Once the user has entered the information requested from the web-based program and selected the start application button 610, the web-based program can communicate this information to the server. The server can receive this information and begin producing an application file that corresponds with the email address and password of the user.

Once block 808 has been completed, the process 1800 can advance to block 1810 to execute a resort property information collection module. The web-based program can execute this block by using a screen similar to that of FIG. 7 or FIG. 19. In particular, the web-based program can execute the module to request information from the user including resort name, who the transfer is being made to (e.g., new owner, company, trust account, add new individual to title, remove someone from title due to death, marital status change, or for another reason, etc.), owner number (if applicable), and if a power of attorney is being used by either the buyer or seller.

Figure 19:
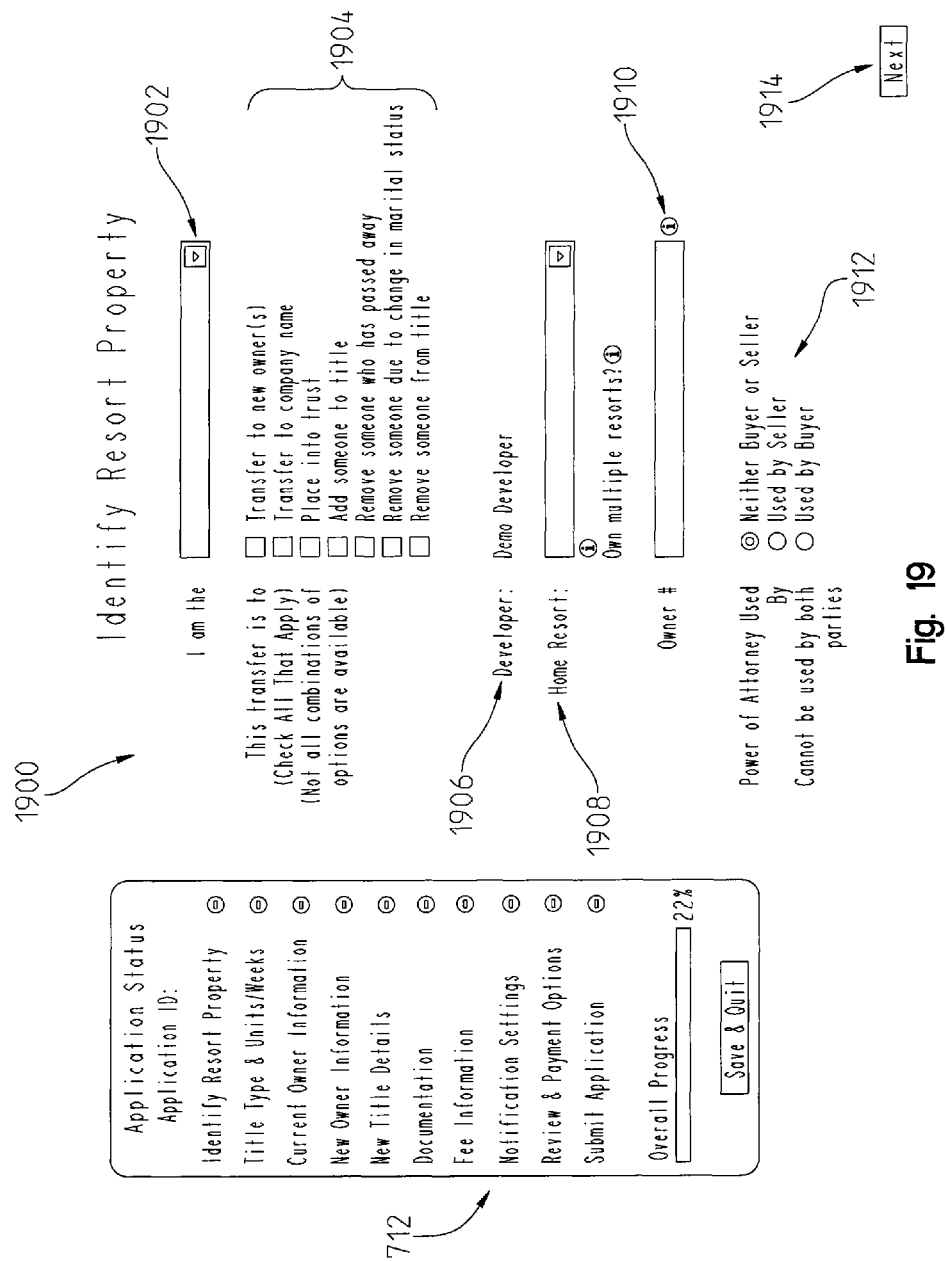
FIG. 19 is of a screen for requesting resort property information.

In FIG. 19, for example, a screen 1900 can be displayed to the user by the web-based program. Here, the user can be identified as a broker title company, owner, or some other party via menu 1902. The manner in which the transfer is being made can be selected according to one of a plurality of options 1904 identified in the screen 1900. Moreover, the user can select the developer in menu or text box 1906 and the home resort in menu or text box 1908. The user can enter his or her owner number in text box 1910 and further identify the use of a power of attorney document in one of the plurality of options 1912 on screen 1900. As the user submits the information, the web-based program may collect and transfer the information to the server or the information is transferred directly to the server. The server can take the information and save it in a file in the database. Alternatively, the web-based program can save the information until the process 1800 is complete.

Figure 20:
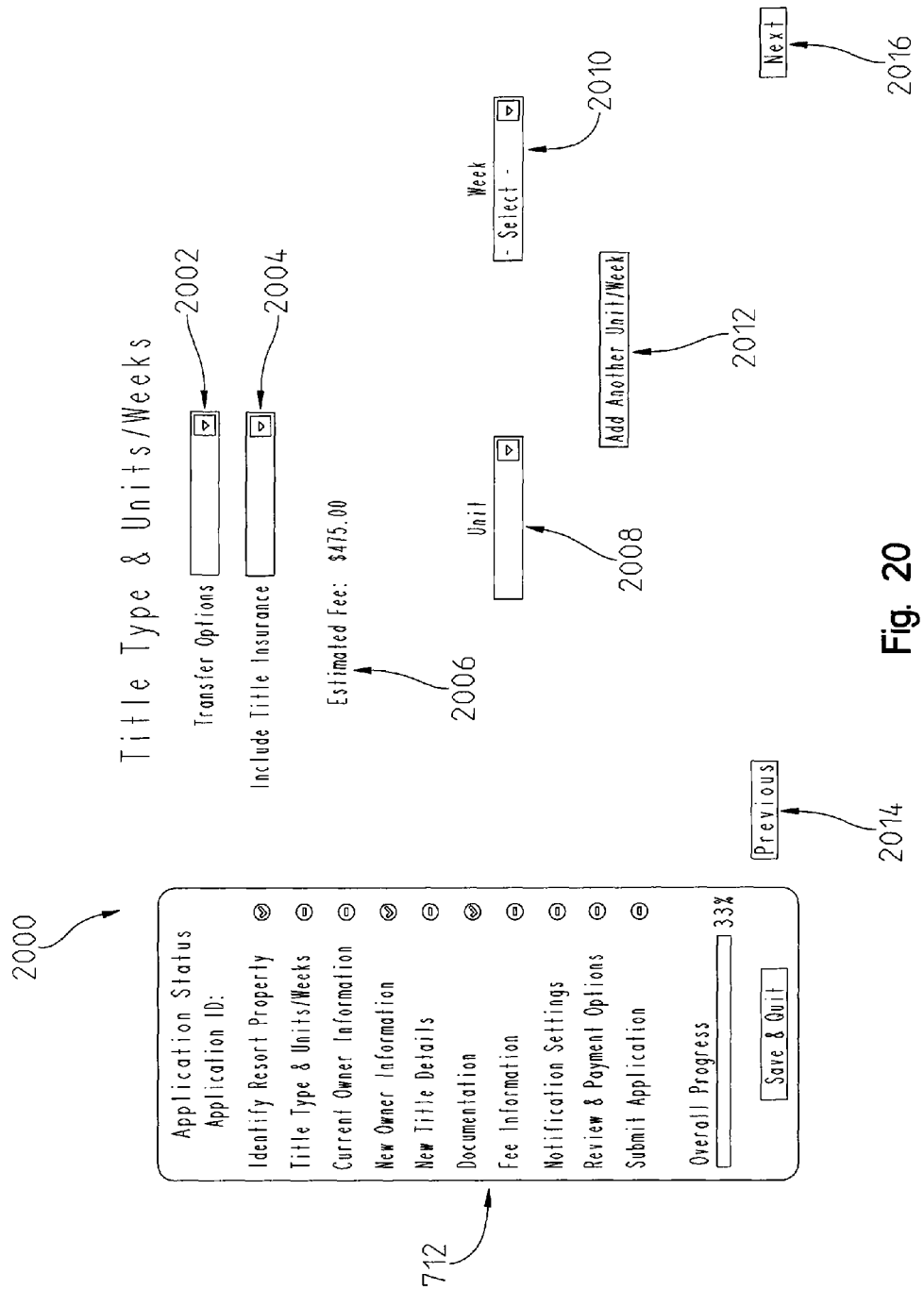
FIG. 20 is a schematic of a screen for requesting information regarding title type and number of units and weeks.

Once the module 1810 is complete, the user can select the "Next" button 1914 on the screen and the process 1800 can advance to block 1812 to execute a title type module. The title type module can be saved on the server or database and presented to the user by the web-based program in a screen display similar to that of FIG. 8 and FIG. 20. In FIG. 20, for example, the web-based program can display a screen 2000 for collecting information related to the type of title being transferred. For instance, the web-based program can request information such as transfer options in a first menu 2002 and title insurance options in a second menu 2004. As the user selects an option from each menu, the web-based program can execute a fee calculation module stored on the server or database to determine an estimated fee for the transaction. The fee calculation module can take into account the developer type, resort type, resort location, insurance costs, type of transfer being made, and what type of documents may be required to execute the transaction. As inputs to the fee calculation module are received by the web-based program, the web-based program can execute the calculation module and display the estimated fee in the box 2006 on the screen 2000.

In FIG. 20, the user may also be requested to provide the web-based program with a unit number 2008 and week number 2010 associated with the transfer property. In some instances, the unit and week numbers may be used as factors in the fee calculation module. Moreover, if more than one unit or week is involved in the transaction, the user can enter additional information in the selection area 2012 of the screen 2000. Additional units or weeks can also be inputs to the fee calculation module, and as additional information is provided to the module, the estimated fee can be automatically and continuously updated as necessary. Upon completion of the inputs in the title type module, the user can select the "PREVIOUS" button 2014 to return to block 1810 or the "NEXT" button 2016 to advance the process 1800.

Once block 1812 is complete, the process 1800 advances to block 1814 to complete an owner information module stored on the server. In this module, the web-based program can receive information about the owner of the property. A screen similar to that in FIG. 9 can be used to collect this information. In particular, the web-based program can collect information such as whether the owner is an individual or company, the owner's name, marital status, country of residence, address, home phone number, work phone number, mobile phone number, email address, and any other information necessary to complete the transaction. Similar to that in FIG. 9, the block 1814 can receive the owner's address information and perform an address validation module to determine whether the address is valid. To do so, the web-based program or server can collect the address information from the user and submit the information over the network to the United States Postal Service or a third party verifier. Once the Postal Service or third party verifies the address as being valid, the server can alert the user via the web-based program to the verification of the address.

Figure 21:
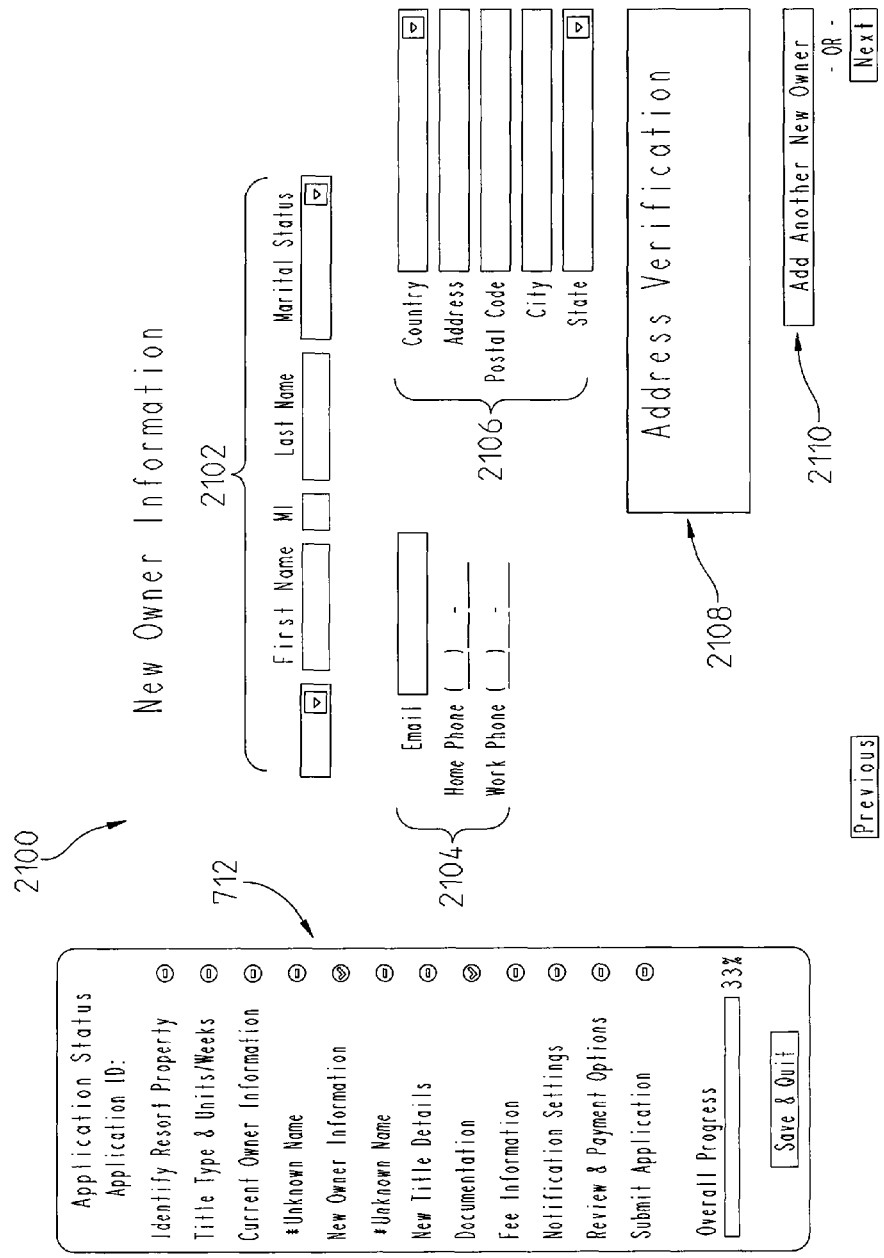
FIG. 21 is a schematic of a screen for requesting information about a new owner.

In addition, the owner information module can allow the user to remove an owner during the transfer or add another current owner. Examples of this are shown in FIG. 9. Once the user submits the information requested in the owner information module, the web-based program can save the information to the server to be saved in a file on the server or in the database. The owner information module in block 1814 can also collect information about the new owner. An example of this is shown in a screen 2100 in FIG. 21. The screen 2100 can include several menus or text blocks for the user to enter information therein. For instance, in a first menu or text block 2102, the user can be requested to enter the full name of the new owner and the marital status. In a second menu or text block 2104, the user can submit the email address, home phone number, and work phone number of the new owner. In a third menu or text block 2106, the address information for the new owner can be provided. Upon entering the address information for the new owner, the address verification module stored on the server can be executed by the web-based program in a manner similar to that previously described. If a second or additional new owner needs to be added, a link 2110 can be selected such that a new owner can be added similar to that in FIG. 21. The new owner information can be saved in a file on the server or in the database, for example.

Figure 22:
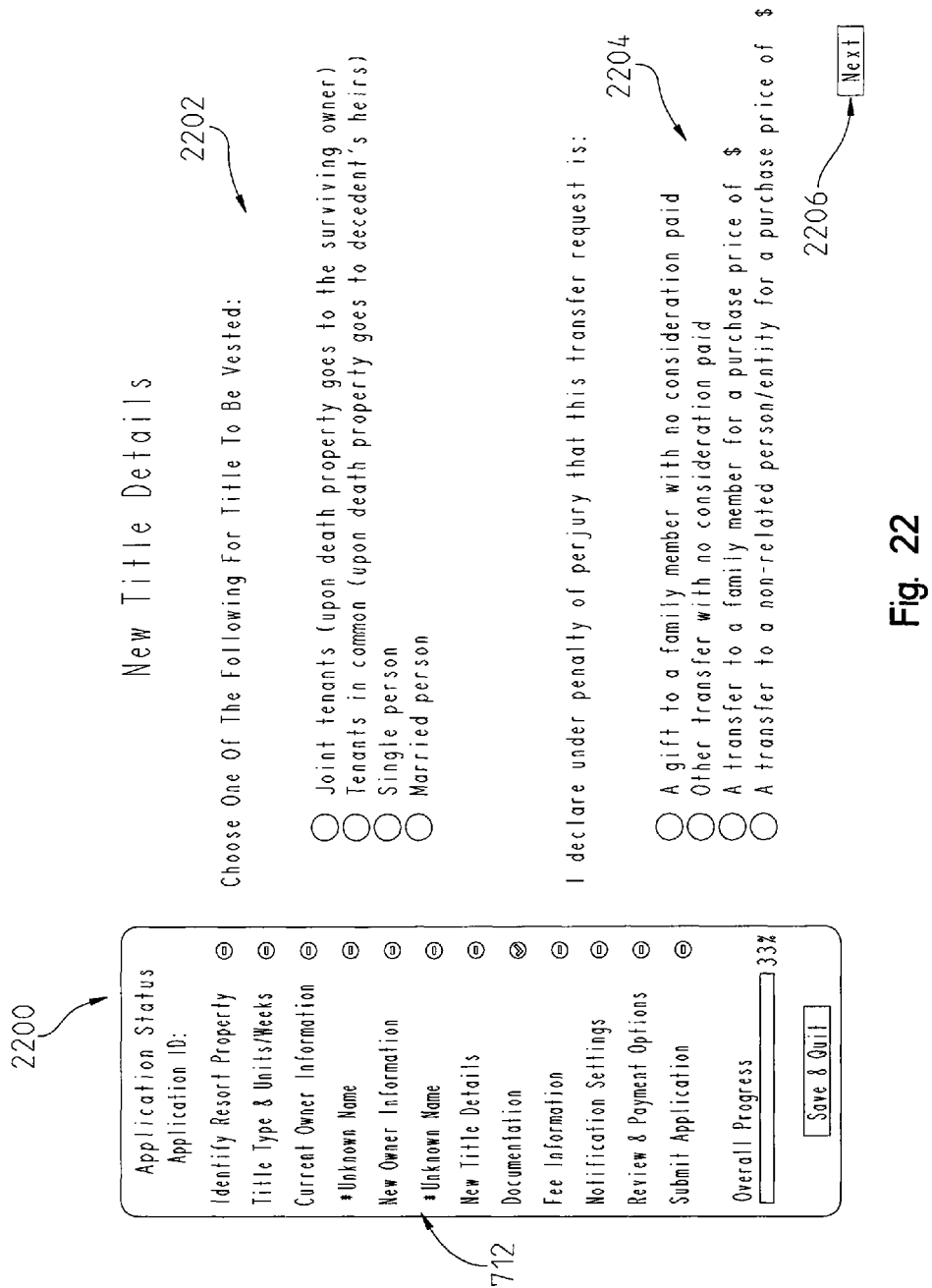
FIG. 22 is a schematic of a screen for requesting information about a new title.

Upon completion of the owner information module in block 1814, the process can advance to the new title module stored on the server in block 1816. The new title module can be executed by the web-based program in a manner similar to that described above and shown in FIG. 10. Alternatively, a new display 2200 as shown in FIG. 22 can be provided by the web-based program to request information from the user. As shown, the user can be provided with a plurality of options 2202 for how the property will be vested, e.g., joint tenants or tenants in common. The user can also be presented with a plurality of statements that the user agrees with by selecting the "NEXT" button 2206 from screen 2200. The user may be required to acknowledge whether the transfer is a gift to a family member, a transfer where no consideration is paid, a transfer to a family member for a purchase price, or a transfer to a non-related person or entity for a purchase price. In some instances, the user may be required to enter a purchase price.

Once the new title module in block 1816 is completed, the process can advance to block 1818 where the web-based program executes a documentation module. The documentation module can be a separate module from the other modules and stored on the server or database. An example of the documentation module is shown in FIG. 11 and described above. In particular, the user may be able to submit a power of attorney document, a purchase and sales contract, or any other documentation required by the web-based program to complete the closing documents for the transfer. The user may elect from screen 1100 whether the documents will be uploaded and transferred electronically, submitted via facsimile, or submitted via mail. Other means for submitting the documents are contemplated by this disclosure, and thus the disclosure should not be limited to these examples. Information may be provided by the web-based program to the user for how to fax or mail copies of the documents in this block 1818.

Once the documentation module has been executed in block 1818, the process can advance to block 1820 and the web-based program can execute a notification settings module, which can be stored on the server or in the database. In the notification settings module, the web-based program can gather information such as how transfer fees will be paid, how current and prior year maintenance fees will be paid, and how current and prior year club dues will be paid. The web-based program can also collect information related to the broker company name (if applicable), the broker contact name, phone number, email address, and physical address. An example of a screen display is shown in FIG. 12 and described above. Once the web-based program receives the information from the notification settings module, the web-based program can communicate this information to the server and this information can be saved to the server. In some aspects, the information collected in block 1820 can be used by the fee calculation module to further determine an estimated fee for the transfer.

Once the notification settings module in block 1820 is completed, the process can advance to block 1822 and the web-based program can execute a review application and payment module stored on the server. An example of this is shown in the display screen 1300 of FIG. 13 and described above. In this module, the web-based program can coordinate with the server and compile the information collected in the previous modules. Once compiled, the web-based program can structure the information in a format similar to that shown in FIG. 13. In this way, the user can easily review the information previously submitted, and if an error is present, the user can use the status window 712 to return to a previous screen and correct any error. If the information is correct, the user can submit payment to complete the transaction. This is shown in FIG. 13 in a payment window 1302. The fee payment module has calculated the estimated title transfer fee based on the information collected in previous modules and the fee can be displayed to the user. The user can then select a method of payment 1304 and complete the payment. A third party can control the payment process and collect the necessary fees to complete the title transfer process 1800. Additional modules can be stored on the server and executed by the web-based program such as those shown in FIGS. 14-17.

Figure 23:
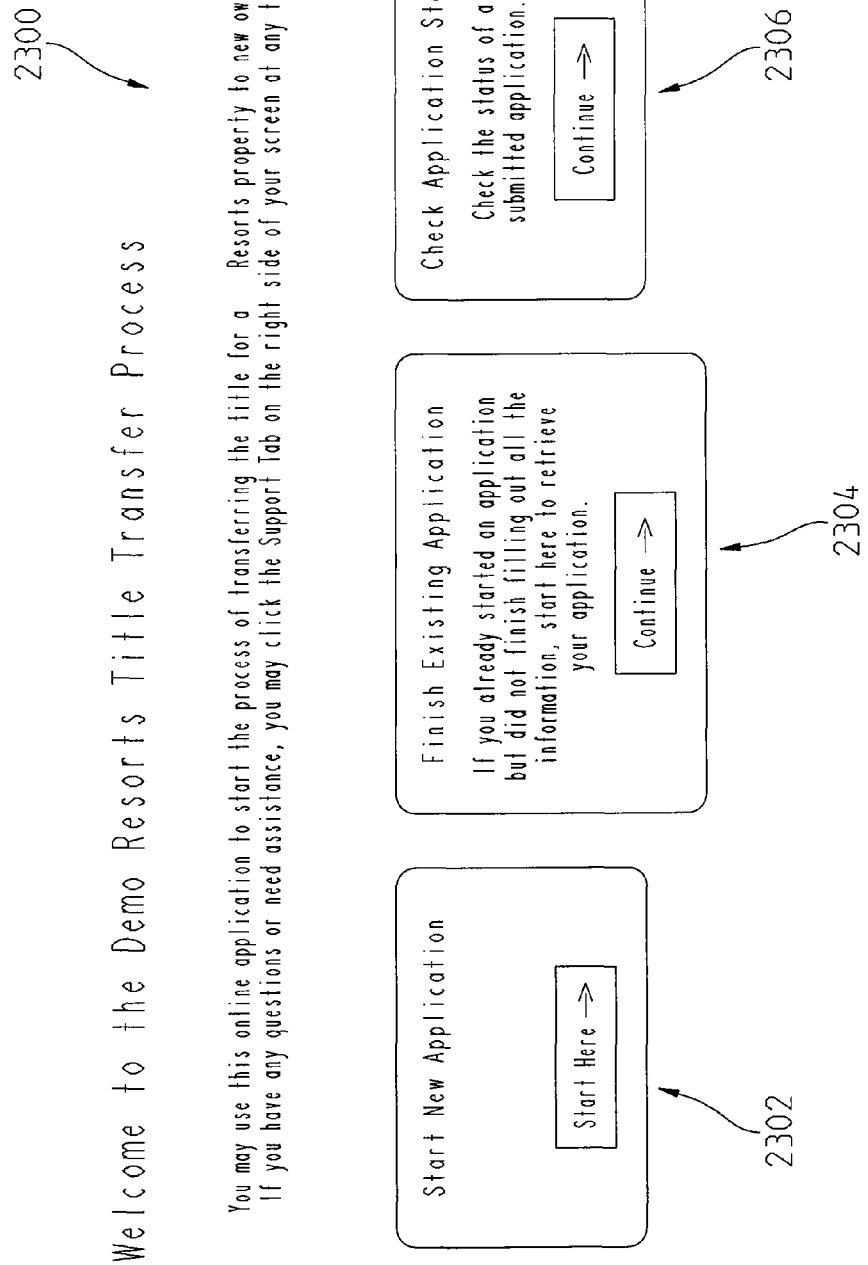
FIG. 23 is a schematic of a screen providing options for starting a new application, finishing an existing application, or checking a status of a completed application.

Once block 1822 is executed, the process is completed. Nevertheless, the web-based program can present the user with a plurality of options such as those shown in FIG. 23. For example, the web-based program can execute another process whereby the applicant is presented with an option to start a new application, finish an existing application, or check a status of a previously submitted application. In FIG. 23, the web-based program can execute this process by displaying a first screen 2300 to the user. Instructions can be sent from the server to the web-based program and to the user's computer over the network, and in this screen the web-based program provides the plurality of options to the user. To begin a new application, the web-based program can display a first selectable link or button 2302. To finish an existing application, the web-based program can display a second selectable link or button 2304. To check the status of a previously submitted application, the web-based program can display a third selectable link or button 2306.

Figure 18:
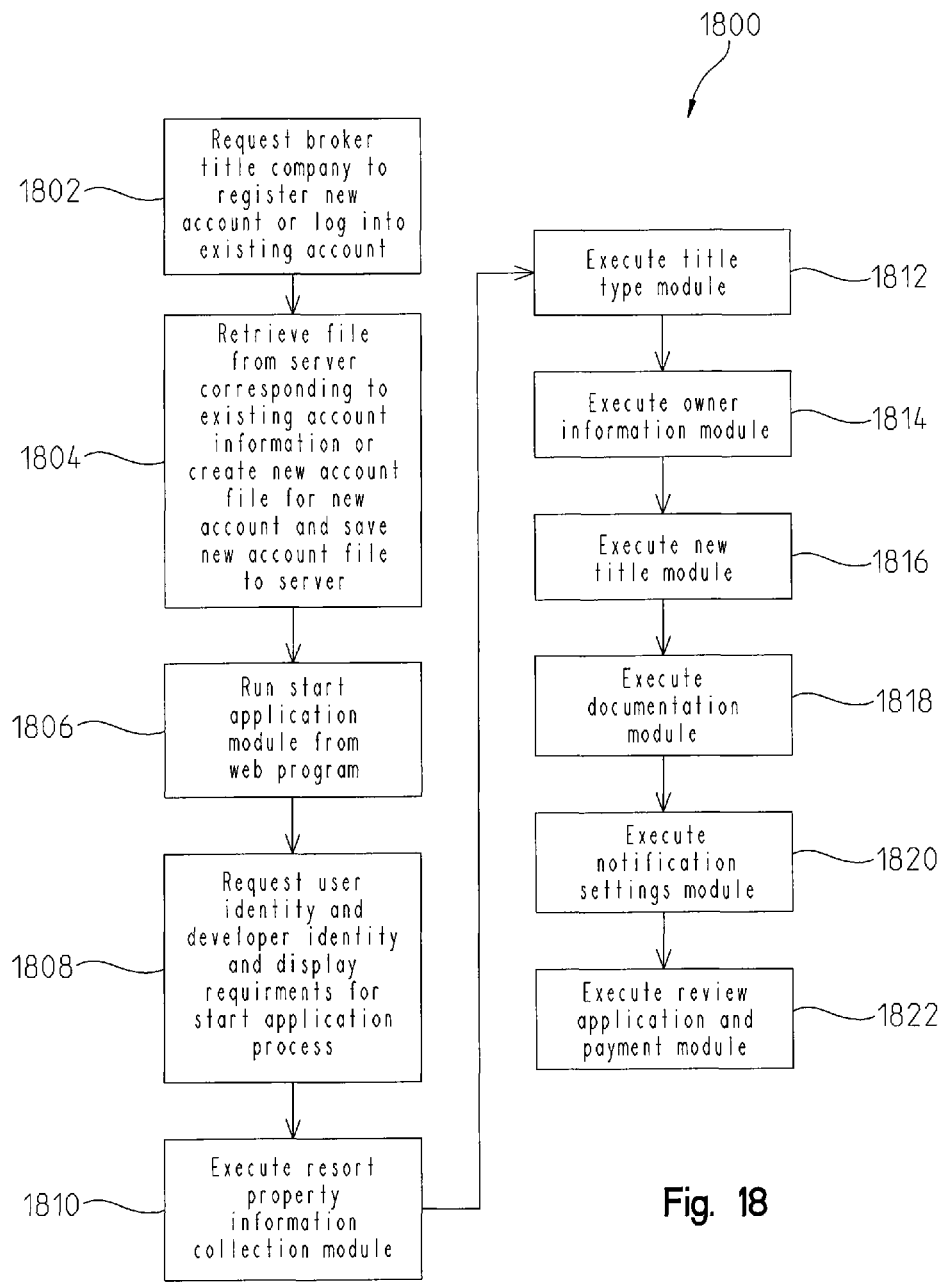
FIG. 18 is a flow diagram of another embodiment of a process for transferring a timeshare property.

If the first selectable link or button 2302 is triggered, a signal can be sent to the web-based program over the network and the web-based program can interpret the signal and send instructions over the network to the user's computer to execute a process similar to that of FIGS. 3 and 18. If, however, the second selectable link or button 2304 is triggered, a signal can be sent to the web-based program over the network. Upon receiving the signal, the web-based program can send instructions to the server to retrieve a file corresponding to an unfinished, existing application. This application may be stored on the server or in a database as previously described, and the file can be saved in such a manner that it is identifiable with a login and password previously submitted by a user to the web-based program. Thus, the web-based program can send instructions to the server to retrieve the file and also provide the user's login (e.g., email address) and password so that the correct file can be retrieved from the database. In the event there is more than one existing file that corresponds with the login and password, both files can be transferred to the web-based program. The web-based program can therefore receive both files and send instructions over the network to the user's computer to provide the user with an option to select between the two or more files. Once the desired file is selected, the web-based program can return the unselected file to the server.

Similarly, if the third selectable link or button 2306 is triggered, the web-based program can send a request to the server to retrieve all completed applications from the database that correspond with the login and password. The server can pull these files from the database, and send all files to the web-based program. Alternatively, if a user has not logged into the web-based program, the web-based program can display a screen 2400 similar to that of FIG. 24. Here, the user can be asked to identify the completed applications based upon the owner's last name and order number 2402 or email address and password 2404. There may be other ways to identify the applications and those shown in FIG. 24 are only one example. The web-based program can execute the aforementioned process, and if the user supplies information based on 2402 or 2404, the web-based program can send this information to the server to locate files associated with the submitted information. In the event no file can be found, the server can provide this information to the web-based program and the web-based program can further execute the process by asking if the user wants to start a new application. As such, the user or applicant can retrieve a previously existing application since each application is assigned its unique identification code or number. If the applicant is unable to produce the identification code or number, the applicant may submit a previously established email address and password to achieve further assistance. In the event the information is found on the server or in the database, the server can communicate this information to the web-based program such that the information can be presented to the user in a format similar to that in FIG. 17.

Another aspect to the present disclosure is the generation of closing documents required for the transfer and closing of a timeshare transaction. The documents may be stored on a server, in a memory unit of a computing system, or in a database, such that once information is submitted in an application (as described above), the necessary documents can be prepared and submitted to the party or parties of the transaction for review and execution. In other words, once an application is completed via a process similar to application process 300 or application process 1800, the web-based program can execute a script, logic, or set of instructions stored on the server for producing the necessary forms or documents as another step for closing the timeshare transfer.

Figure 25:
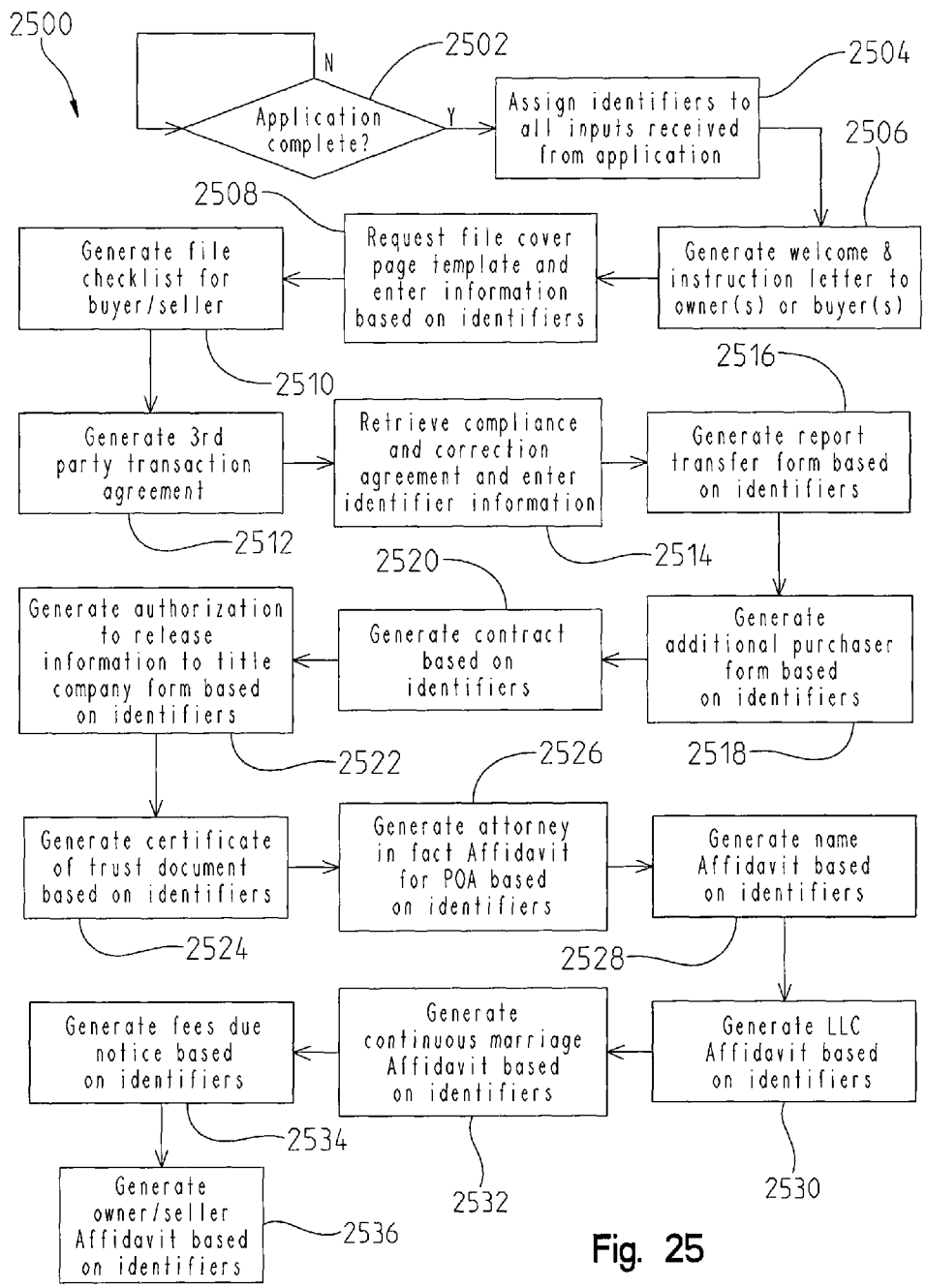
FIG. 25 is a different embodiment of a process for preparing documents and forms for a transfer application.

In FIG. 25, one example of a set of executable instructions is provided for producing the documents and forms. It is to be understood that the web-based program is operable in conjunction with the server for executing the set of instructions. In particular, one transaction may be different from another based on the parties involved, such as, for example, whether a title broker company is involved, the type of developer, resort property, resort property location, the laws of each individual state or country where the developer and/or resort is located, the number of parties involved in a transaction, and the fees involved in the transaction. In other words, the set of instructions in FIG. 25 may not be executed for each transaction, and the web-based program can be executed in such a way that based on information received from the user the program or server can determine which documents are required for a certain transaction, thereby allowing the web-based program to produce the required documents and forms for execution. Examples of different documents and forms that can be produced in the set of instructions 2500 of FIG. 25 are shown in FIGS. 26-42.

The set of instructions 2500 can be a script, program, method, module, logic, or process executable by the web-based program and/or a processor of a computer to produce the documents and forms for carrying out the transfer. For simplicity, the set of instructions 2500 will be referred to as the forms process 2500. In a first block 2502 of the forms process 2500, a determination is made by the web-based program or server whether the application is complete. Here, the previously described processes 300, 1800 or variants thereof may have been executed and the user has supplied requested information. Once the application process, i.e., process 300 or 1800 or some variant thereof, is completed, the forms process 2500 advances to block 2504 and each of the inputs received by the web-based program from the user are assigned unique, predefined identifiers or variables. In the event the application process is not complete, block 2502 is repeated until the process is complete.

In the to-be-generated documents and forms, in many instances information can be pulled directly from the application and transferred to the appropriate location on these documents. As will be described below, one or more of these documents or forms can be stored as a template on the server or database and merged with corresponding identifiers that link information being input into the application (e.g., seller name, address, etc.). Seller's name can be identified or linked by a variable "${sellerName1}". If there are two sellers, then a second variable can be "${sellerName2}". The resort name can be identified by variable ${resortName}. Again, the aforementioned algorithms can be structured such that an applicant can enter the first seller name into a corresponding location in the application, and the variable ${sellerName1} is assigned or linked to the input entered into that location in the application. Moreover, this and each variable (or identifier) can be saved in the memory unit of the computing device, on the server, or in a file in a database so that other documents where the same variable is required, the content of that variable can be retrieved from the server and inserted into a document at the assigned location.

In block 2504, unique identifiers or variables are assigned to a plurality of the inputs. The plurality of inputs can include the buyer's name, buyer's address, buyer's phone number, seller's name, seller's address, seller's phone number, file number, date of submission, fees due, title broker company name, etc. The processes 300, 1800 previously described can be developed such that as the user enters buyer's information in blocks 2102, 2104, and 2106 of FIG. 21, for example, the web-based program can correlate and merge this input data with one or more of the identifiers. The inputs and identifiers can be linked and merged into a file on the server, and the server can store the file with the inputs and identifiers either on the server or in the database.

Once the inputs are assigned to the identifiers, the forms process 2500 can advance to any of blocks 2506 through 2536. Based on how the inputs are linked with the unique identifiers, the web-based program or server (e.g., via a determination module stored on the server) can make a determination which documents or forms are required to complete a desired transaction. The document generation portion of the forms process 2500 can be executed in blocks 2506 through 2536. In addition, the documents or forms shown in FIGS. 26-42 are only examples. Certain developers or resorts may require different or additional documents for execution. In any event, the documents and forms can be stored in a template library on the server or in a database. As such, the necessary documents and forms can be obtained and prepared within a short amount of time after the application is submitted and all inputs have been received.

In block 2506, for example, the forms process 2500 can execute and generate a welcome and instruction letter for the buyer and seller based on a letter template 2600. In one example, a welcome or introduction letter can inform the party or parties that the transaction order has been received and the process has been initiated. Fees may be transferred to an escrow account, bank account, or other location during the process. The welcome letter can inform the party or parties about the timing of such a transaction and what expectations of the different parties may be. Contact information may be provided for any questions during the process. An example of the letter template 2600 is shown in FIG. 26. The letter template 2600 can include an identifier "${eDate} 2602 which corresponds to a predetermined date set forth from the date all inputs are received by the web-based program. For instance, the date identifier 2602 may correspond to the date all inputs are received by the web-based program, or it may refer to some other date based off the date all inputs are received. In any event, the date identifier 2602 can be predefined within the forms process 2500 such that the date can be input into the letter template 2600 in the position shown.

The forms process 2500 can advance to block 2508 and generate a file cover page. Here, a file cover page template can be stored on the server or database, or the web-based program can process the information provided in the application and merge information from the application into predefined fields in the file cover page template. As such, a file cover page module can be executed by requesting the file cover page template from a template library (e.g., stored on the server), and the identifiers in the file cover page template can be merged with the inputs received from the user.

In FIG. 27, an example of a file cover page template 2700 is shown. Here, the file cover page template 2700 can include a plurality of identifiers that correspond to the buyer, seller, resort, and fee structure. In one example, identifier ${fileNumber} 2702 corresponds to an assigned file number or application number for a given transaction. The file or application number can be assigned by the web-based program in an incremental or random fashion. Other identifiers can include seller name, seller address, seller phone number, seller email address, buyer name, buyer address, buyer phone number, buyer email address, resort name, unit number(s), unit week(s), purchase price, broker transfer fee, current year maintenance fee(s), current year club fee(s), past year(s) maintenance fee(s), and past year(s) club fee(s). Moreover, other identifiers may include the date identifier 2602, processor identifier, file review identifier, additional documents requested or received, estoppel ordered, and date documents and forms submitted to resort. The file cover page template 2700 is only shown as an example, and one skilled in the art can appreciate that additional identifiers may be provided on other templates, or in some instances, the template may be tailored for a given transaction. In any event, the inputs received can be inserted or merged into each location in the template 2700.

The forms process 2500 can advance to block 2510 and produce a file checklist for buyers and sellers. A checklist may be generated and identify certain or all documents required from each party (e.g., buyer and seller). These listed documents can include a sellers authorization, charitable donation form, donor letter stating fair market value assigned, third party transaction agreement, purchase and sales contract, compliance agreement, resort transfer form, LLC affidavit, power of attorney (and accompanying information or documents), completed W-9 forms, identification forms or cards of buyer and/or seller. Forms specific for buyers can include documents necessary in the event a business entity is taking title (e.g., articles of incorporation, corporate resolution, certificate of good standing) and other documents similar to those for seller.

In FIG. 28, an example of a seller checklist 2800 is shown. In FIG. 29, an example of a buyer checklist 2900 is shown. Each checklist can be generated in block 2510 and include one or more identifiers that corresponds with one or more inputs received from the user. Other items may be provided on different checklists, and FIGS. 28 and 29 are only intended to provide an example of what each checklist might include for a given transaction.

In block 2512, the forms process 2500 can generate a third party transaction agreement. An example of a third party transaction template 3000 is shown in FIG. 3. The template 3000 can include the date identifier 2602 along with other identifiers (not shown). Like the other templates, the third party template 3000 can be stored on the server or database in a template library.

The forms process 2500 can advance to block 2514 to request a compliance and correction agreement template 3100 similar to the one shown in FIG. 31. The compliance and correction agreement template 3100 can include a plurality of identifiers as shown, and based on the inputs received, the inputs can be disposed or merged in each location as shown in FIG. 31. For example, the file or application number can be disposed in the file number identifier location 2702. Other identifiers can include the seller's name(s) and buyer's name(s).

Upon completion of the compliance and correction agreement template 3100, the forms process 2500 can advance to block 2516. In block 2516, a resort transfer form template can be requested from the template library and the server can provide a resort transfer form template 3200 similar to the example shown in FIG. 32. The resort transfer form template 3200 can include a plurality of identifiers including identifiers corresponding to seller's name(s) (e.g., ${sellerName1}), buyer's name(s) (e.g., ${buyerName1}), seller's address(es) (e.g., ${sellerAddress}), buyer's address(es) (e.g., ${buyerAddress}), seller's phone number(s) (e.g., ${sellerPhone}), buyer's phone number(s) (e.g., ${buyerPhone}), seller's email address(es) (e.g., ${sellerEmailAddress}), buyer's email address(es) (e.g., ${buyerEmailAddress}), resort name (e.g., ${resortName}), unit number (e.g., ${unitNumbers}), and week number (e.g., ${unitWeeks}). Other identifiers may include developer name, submission date, etc. As previously described, each of these identifiers corresponds to an input provided by the user during an application process similar to that of process 300 and process 1800. As such, each input is linked with a corresponding identifier, and upon requesting the resort transfer form template 3200, a resort transfer form can be produced by linking each input with the corresponding identifier in the template.

Upon completing the resort transfer form in block 2516, the forms process 2500 can advance to block 2518 to generate an additional purchaser form. The additional purchaser form can be part of the resort transfer form, or it may be a separate document. In any event, in block 2518 an additional purchaser form template 3300 similar to the example of FIG. 33 can be provided from the server. The template 3300 can include a plurality of identifiers that correspond to inputs received during an application process. The additional purchaser form can be produced by linking each input with the corresponding identifier as shown in FIG. 33. In the event there are no additional purchasers, there will be no inputs corresponding to any of the identifiers in the additional purchaser form template 3300. The web-based program or server may detect this once the application is completed in block 2502, and thus block 2518 may be skipped. Similarly, other blocks in the forms process 2500 can be skipped based on the inputs received.

The forms process 2500 can advance to block 2520 to produce a sales contract or contract between the parties. A contract template 3400 similar to the example in FIG. 34 can be stored in the database or on the server and communicated to the web-based program upon an instruction to do so. The contract template 3400 can include a plurality of identifiers including the date identifier 2602 and file number identifier 2702. Other identifiers similar to the ones described with respect to FIG. 32 can form part of the template 3400. In addition, identifiers corresponding to a purchase price (e.g., ${salesPrice}), transfer costs (e.g., ${brokerTransferFeePayer}), current year maintenance fees if due to be paid by (e.g., ${brokerMaintenanceFeePayer1}), current year club dues if due to be paid by (e.g., ${brokerClubFeePayer1}), previous year maintenance fees if due to be paid by (e.g., ${brokerMaintenanceFeePayer2}), previous year club dues if due to be paid by (e.g., ${brokerClubFeePayer2}), joint tenants to hold title (e.g., ${vestedJoint}), and tenants in common to hold title (e.g., ${vestedCommon}). Moreover, while not shown in FIG. 34, other identifiers may include sales commission (if applicable), real estate broker (if applicable), and any other way title may be held following the transfer. Once the inputs are inserted into the template 3400, the sales contract is produced in block 2520.

The forms process 2500 can advance to block 2522 and generate an authorization to release information to title company document. Here, a template 3500 similar to the one shown in FIG. 35 can be stored in the server or database. The template 3500 may include a plurality of identifiers corresponding to inputs received from the application process. The identifiers can include the date identifier 2602 and file number identifier 2702 as previously described. The inputs can be linked to their respective identifier and the authorization to release information to the title company document can be produced in block 2522.

The forms process 2500 can also execute the necessary actions to produce a Certificate of Trust document in block 2524. The Certificate of Trust document can be produced by linking inputs with identifiers in a Certificate of Trust template 3600 similar to the one shown in FIG. 36. Once the inputs are linked with their respective identifiers, the Certificate of Trust document is produced.

In block 2526, an Attorney in Fact Affidavit for Power of Attorney document can be produced via the forms process 2500. Here, a template 3700 similar to the one shown in FIG. 37 can be stored on the server or in the database, retrieved by the server, and inputs can be linked to corresponding identifiers in the template 3700. Once the inputs are linked with their respective identifiers in the template, the Attorney in Fact Affidavit for Power of Attorney document is produced.

The forms process 2500 can further execute the steps necessary to produce a Name Affidavit document. A Name Affidavit document can be produced by executing block 2528 and linking inputs with their respective identifiers in a Name Affidavit template 3800 similar to the one shown in FIG. 38. For instance, the template 3800 can include the file number identifier that is linked with the predetermined file or application number. Other identifiers, such as those corresponding with the seller's name(s), can also be linked in the template 3800.

In FIG. 39, an example of a Limited Liability Company (LLC) Affidavit template 3900 is shown. The template 3900 can be stored in the template library in the database or on the server. The server can send the template 3900 to the web-based program or process and each identifier in the template 3900 can be linked or merged with its corresponding input. The template 3900 can be completed in block 2530 to produce the LLC Affidavit.

The forms process 2500 can advance to block 2532 to generate a Continuous Marriage Affidavit document. The Continuous Marriage Affidavit document can be produced by linking the appropriate inputs with one or more identifiers in a Continuous Marriage Affidavit template 4000 similar to the one shown in FIG. 40.

The forms process 2500 can also execute the conditions set forth in block 3534 to produce a Fees Due Notice document. The Fees Due Notice document can be generated by linking the appropriate inputs with one or more identifiers in a Fees Due Notice template. An example of a Fees Due Notice template 4100 is shown in FIG. 41. Like the other forms and documents shown and described in this disclosure, the Fees Due Notice template 4100 is only one illustrative example of this embodiment, and other templates may be completed to generate similar Fees Due Notices.

The forms process 2500 can further advance to block 2536 where an Owner/Seller Affidavit template 4200 similar to the one shown in FIG. 42 can be retrieved by the server. The template 4200 can include a plurality of identifiers that are linked to inputs received by the web-based program or server. Once the inputs are inserted or linked to the respective identifier, the Owner/Seller Affidavit is produced in block 2536.

The forms process 2500 can also produce additional documents other than those described herein. In some embodiments, the forms necessary for a transaction can depend on the type and number of parties involved, the underlying state or federal laws, the type of transaction being completed, the type of property subject to the transaction, the developer or resort that owns the property, etc. Thus, for this disclosure, the forms process 2500 disclosed herein is only intended to be an example of one such process for producing the necessary documents to be executed by the party or parties of the transaction.

In another aspect of this disclosure, the application process of collecting information for a timeshare transfer and producing documents to complete the transfer can form part of a larger process. An example of this is shown in process 4300 of FIG. 43. The process 4300 can include a plurality of procedures or steps for completing the overall transfer process. The process 4300 can include processes 300, 1800, and 2500 as will be described. Moreover, the process 4300 can be executed as part of an algorithm stored on the server or as part of a web-based program similar to the one described above for executing processes 300 and 1800. Alternatively, process 4300 can be handled by more than one source. A computing system may include a memory and processor, as described above, such that the memory stores instructions therein for the processor to execute one or more of the procedures or steps of the process 4300. As another example, a financial institution or banking system may execute one of the steps that relates to payment or fees collected. For purposes of the illustrated embodiments, reference will be made to a web-based program that executes one or more blocks and modules stored on the server.

Figure 43:
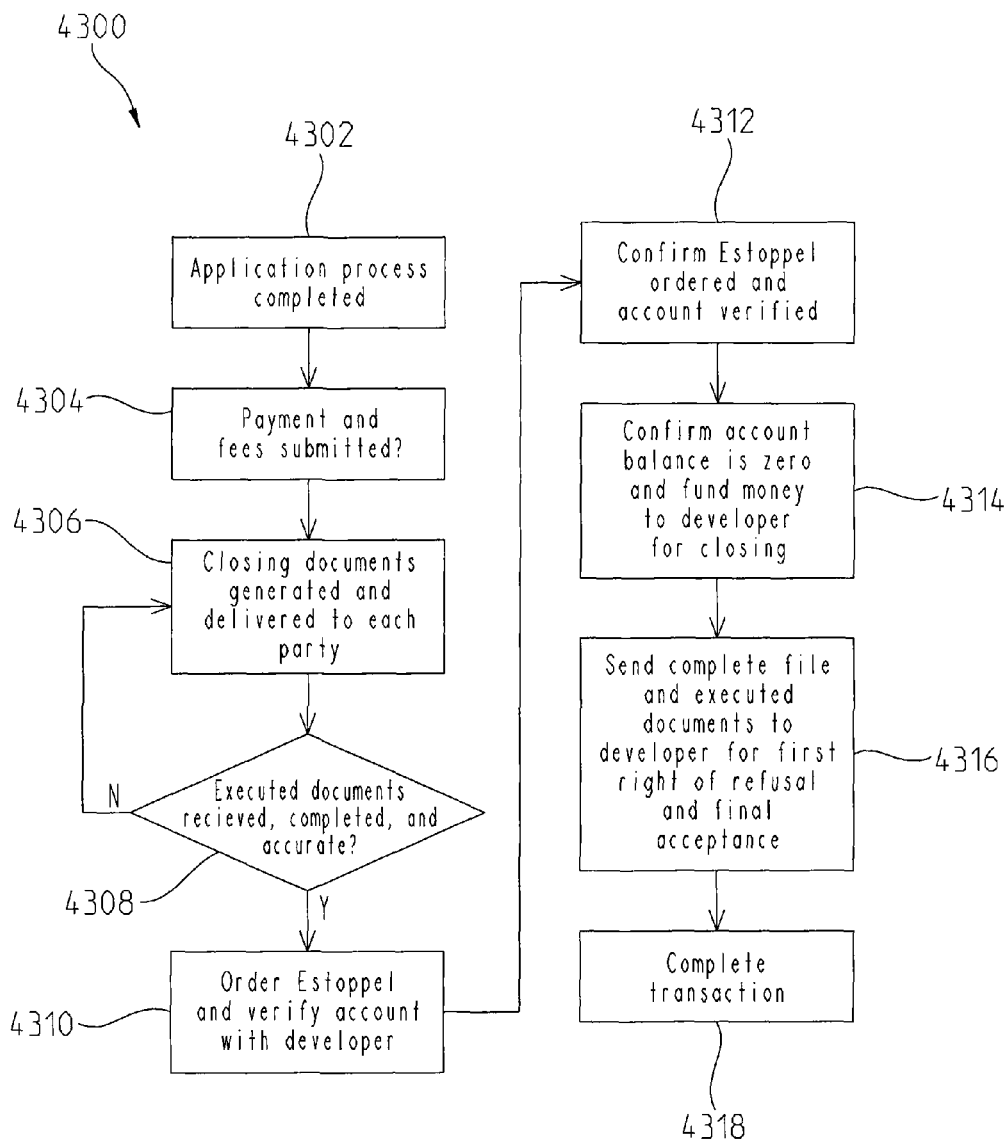
FIG. 43 is a flow diagram of a further embodiment of a method for receiving a transfer application and processing the application to complete an overall transaction.

In FIG. 43, the process 4300 can begin with a first block 4302 where the application process is completed. An example of this is the process 300 shown in FIG. 3 or the process 1800 shown in FIG. 18. In these examples, the parties of the transaction may include one or more individuals, a corporate entity, a broker title company, a charity, or other known entities. In block 4302, information is collected from a party to initiate, enable, or trigger a timeshare property transfer transaction.

Once the information is received in block 4302, the process 4300 can advance to block 4304. Here, a determination is made if all payments and fees have been collected from one or each of the parties of the transaction. This may be determined by a third party such as a bank or financial institution. Alternatively, the transaction file stored on the server or in the database may track payments received. Other means for collecting and tracking payments may be included in block 4304.

Process 4300 can advance to block 4306 where the closing documents and forms can be generated and delivered to each party. The document generation process is similar to the forms process 2500 of FIG. 25. Once all documents and forms have been generated, the aforementioned web-based program can electronically transfer the documents and forms to each party. For example, if a seller email address and buyer email address are provided in the application process, the email address for each party can be used as a means for electronically transferring the documents and forms. In another example, documents and forms can be mailed to the address of each party based on information supplied during the application process. Other communication means such as facsimile can be used in block 4306.

Once the documents and forms have been submitted to each party, the process 4300 can advance to block 4308 where a determination is made whether all documents and forms have been received as completed. In some instances, electronic signatures and the like can be used for executing documents, and in these instances the entirety of block 4308 can be executed electronically by a computing system or the web-based program. In other instances where original signatures are required, and particularly notarized signatures, a third party may be used to review the executed documents and forms for completeness and accuracy. In other words, block 4308 can be executed automatically, manually, or both depending on the document or form being executed. If each document and form is received and a determination is made that each is complete and accurate, the process 4300 can advance to block 4310. If, however, one or more documents is not received, complete or accurate, the process 4300 may not advance past block 4308 until all documents and forms are received and verified as being complete and accurate.

Once block 4308 is completed, the process 4300 can advance to block 4310 to order an estoppel and verify account information with the developer of the timeshare property. One example of ordering an estoppel is explained below with reference to FIG. 44. However, in another example the information gathered from the application process of FIG. 3 or FIG. 18 can be used to complete an application for holding an estoppel. Moreover, in block 4310, the web-based program or computing system can electronically transfer the executed documents and forms, along with a copy of the completed application and any other required documents, to the developer of the timeshare property for verification of the details thereof. The same information and documents can be transferred via facsimile or mail as well.

In block 4312, the process 4300 makes a determination whether the estoppel is ordered and the developer has verified the details of the application and closing documents and forms. In one aspect, block 4312 can be performed electronically by the web-based program or computing system. In other aspects, block 4312 may be performed by a third party or manually. Once the determination is made in block 4312, the process 4300 executes block 4314 and confirms that the owner's account balance is zero and there are no other fees or payments due (e.g., maintenance fees, club fees, mortgage payments, insurance payments, etc.). In addition, the fees or payments required by the developer for the transaction can be transferred thereto. Any third party fees can also be transferred to the appropriate party. The sales or purchase price of the transaction can also be confirmed as paid in this block.

The process can advance to block 4316 to send a complete file and executed documents to the developer. The complete file may be stored in the database or on the server, and as such a copy of the file can be transferred to the developer. In some instances, the developer may include a first right of refusal which may impact the execution of block 4316. In any event, the final acceptance of the transaction can be consummated in blocks 4316 and 4318. This may involve recording any deeds or other documents with the appropriate government authorities. Other tasks may be completed as well in block 4318.

In another embodiment of this disclosure, the aforementioned web portal (program) or web-based program can be used for handling a request for an estoppel application. This is similar to block 4310 in FIG. 43. In one example, this can be handled through a similar URL or website as the timeshare transfer process of FIGS. 3 and 18. Alternatively, an independently distinct URL or website may be available for completing the process. One such example may be found at http://www.RequestMyEstoppel.com.

Figure 44:
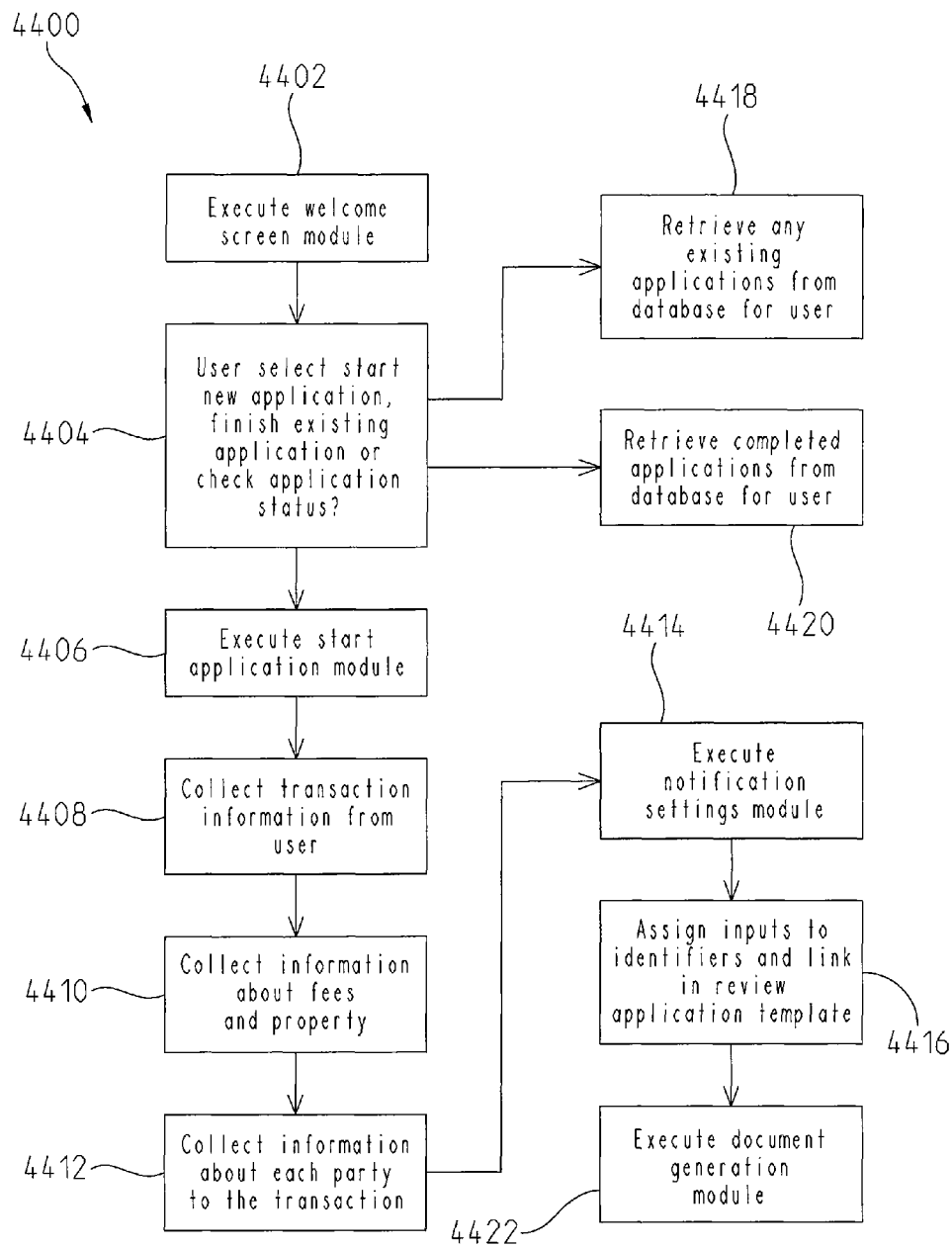
FIG. 44 is a flow diagram of one example of a process for executing a request an estoppel application.
Figure 45:
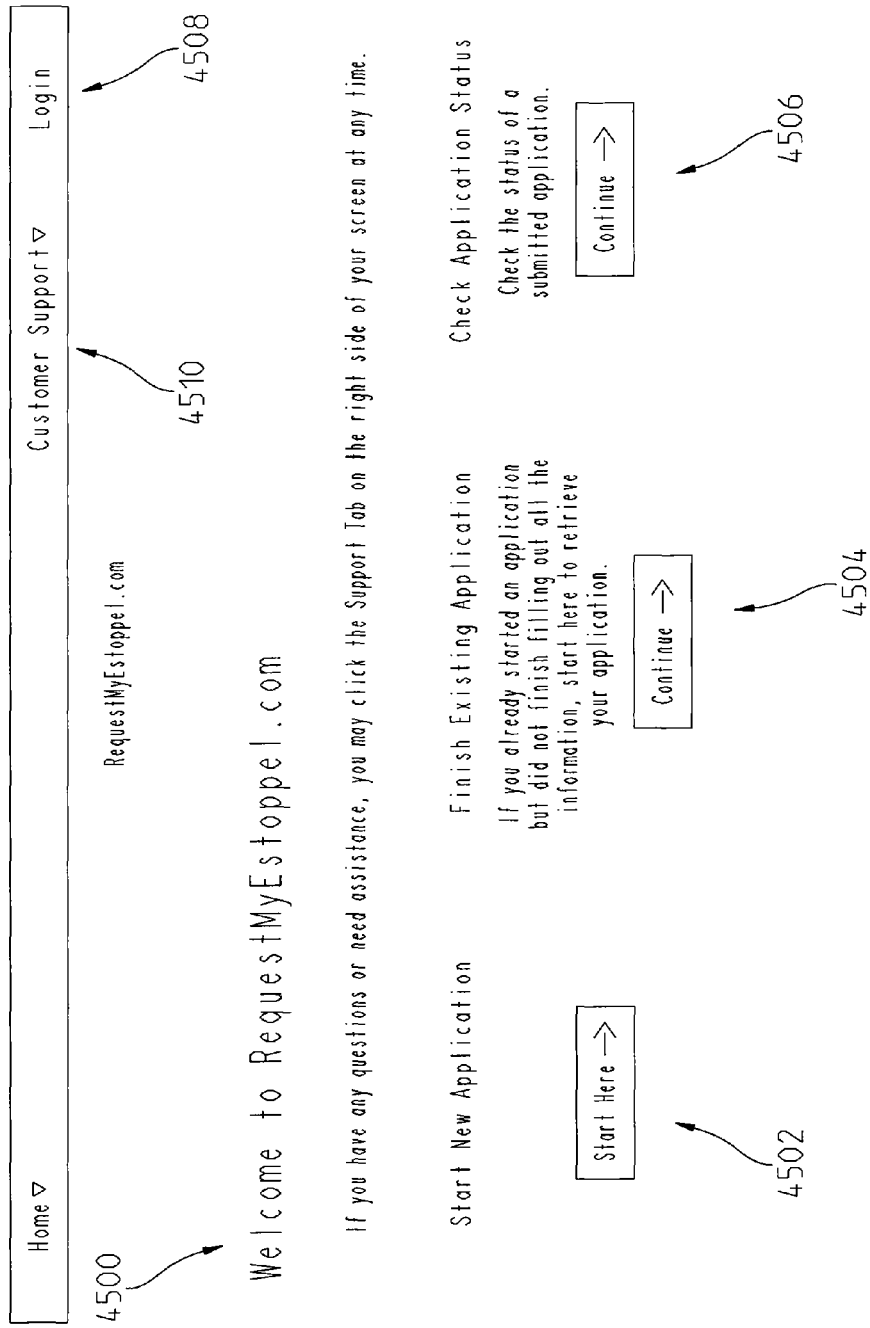
FIG. 45 is a schematic of a welcome screen module of the process of FIG. 44.

One example of a process 4400 for requesting an estoppel is shown in FIG. 44. This process 4400 can include one or more steps similar to the processes of FIGS. 3 and 18. For instance, once the user accesses the web portal or web-based program over the network (e.g., http://www.RequestMyEstoppel.com), the web-based program can execute the process 4400 by first advancing to a first block 4402. In the first block 4402, the web-based program can execute a welcome screen module. The welcome screen module can be stored on the server and display a screen 4500 similar to that shown in FIG. 45. In this screen 4500, the user can be presented with a plurality of options for advancing beyond the welcome screen 4500. For example, the user can select a first link or button 4502 to start a new application, a second link or button 4504 to finish an existing application, or a third link or button 4506 to check a status of a completed application. A fourth link or button 4508 allows a user to log into their file, which can be stored on the server or database. In addition, a fifth link or button 4510 can allow a user to access customer support or otherwise seek help.

Once a link or button is selected from the welcome screen 4500, the process 4400 can advance to block 4406. If the user selects the first link or button 4502, the web-based program can receive a signal indicative of the selection and advance the process 4500 to block 4404. If, however, the user selects the second link or button 4504, the web-based program can receive a signal indicative of this selection and advance the process 4500 to block 4418. Alternatively, if the user selects the third link or button 4506, the web-based program can receive a signal indicative of this selection and advance the process 4500 to block 4420. In the event the process 4500 advances to block 4418, a screen similar to that of FIG. 16 can be displayed. The web-based program can send a request to the server to retrieve any uncompleted applications stored on the server or in the database that correspond with the user, and this information can be communicated to the web-based program and displayed accordingly. Alternatively, if the process 4500 advances to block 4420, the web-based program can communicate in a similar manner with the server and in turn display the status of a completed application similar to that in FIG. 17.

Figure 46:
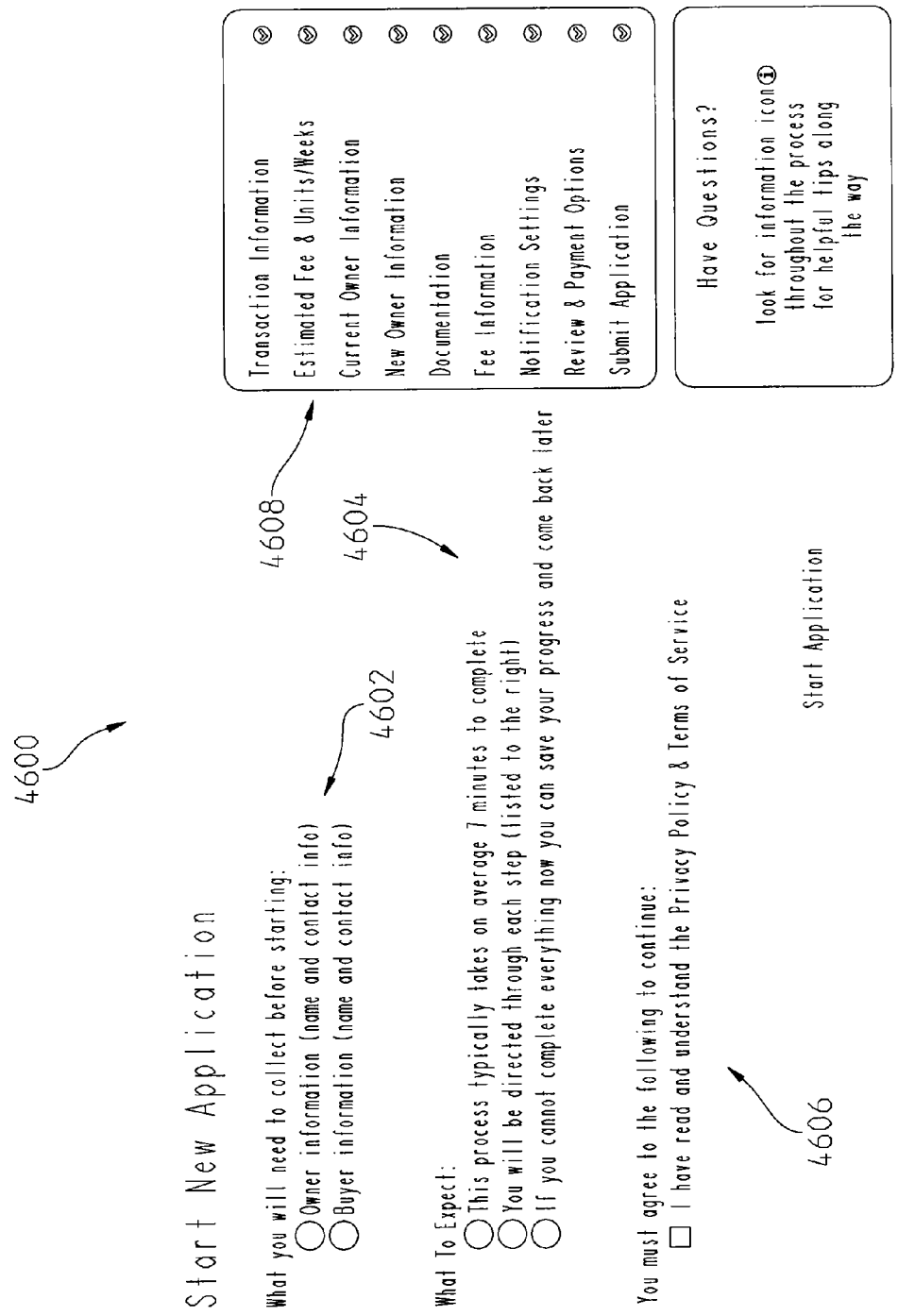
FIG. 46 is a schematic of a start application module of the process of FIG. 44.

In the event a new application is started and the process 4400 advances to block 4406, the web-based program can execute a start application module. The start application module can be stored in the server or database. In any event, the module can be executed by displaying a start application screen 4600 similar to that in FIG. 46. Here, the module can display on the screen 4600 a first block of information 4602 that identifies what information may be required to complete the application process (i.e., owner name and contact information, buyer name and contact information, etc.), a second block of information 4604 corresponding to what to expect with the process 4400, and a third block of information 4606 that includes an acknowledgement section whereby the user is asked to review privacy policy and terms of service and confirm such review. This screen 4600 further provides the user with a status block 4608 that displays a timeline or list of steps for completing the application. Moreover, the start application module can provide the user with a link or mechanism to ask questions during the process by selecting either customer support or selecting "information icons" located throughout the process on different screens.

The process 4400 can be structured such that it cannot advance past block 4406 until the user selects a check box or link in the third block of information 4606 to acknowledge the privacy policy and terms of service. Until the user completes this action and the web-based program (or server) receives instruction that the user has made an acknowledgement, the process 4400 may not advance. Although not shown, a "next" or "continue" button may be displayed on the screen 4600 such that once the check box or link is selected, the process 4400 can advance upon actuation of the "next" or "continue" button.

Figure 47:
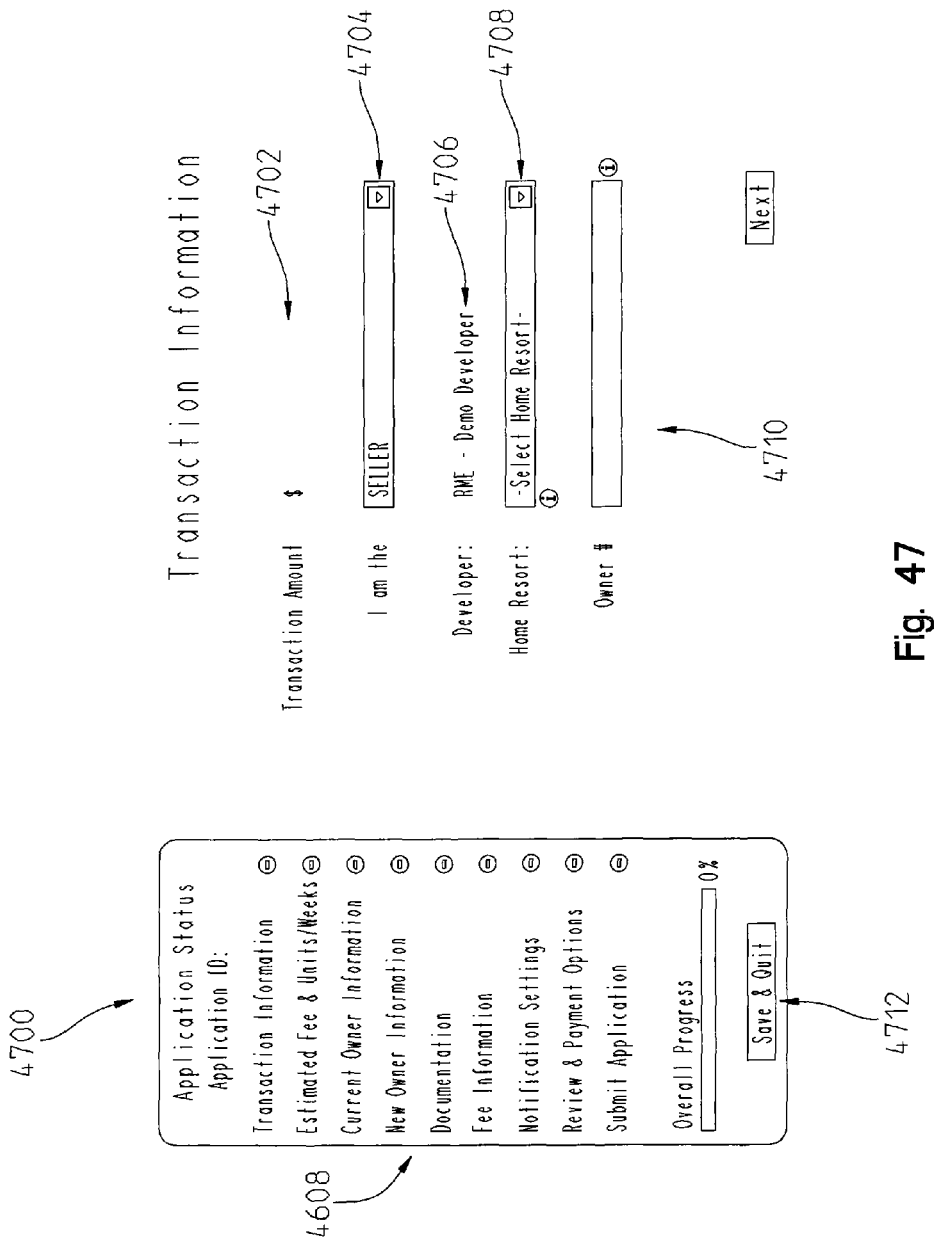
FIG. 47 is a schematic of one block in the process of FIG. 44 for requesting transaction information.

The process 4400 can then advance to block 4408 to request information from the user about the transaction. An illustrative example of this is shown in FIG. 47. Here, a transaction screen 4700 can request a transaction amount 4702, identity of the user 4704 (e.g., buyer, seller, broker title company, third party, etc.), developer identity 4706, home resort identity 4708, and owner number 4710 (if applicable). The screen 4700 can be structured as a template similar to that described above in FIG. 25. In this manner, each item of information requested from the user can be referred to as an input, and each input can be assigned a corresponding identifier. The identifier may be used later for executing the necessary documents for completing the transaction, and also at the end of the process 4400 when the review screen is completed by the web-based program.

As also shown in FIG. 47, the status block 4608 can be displayed on the screen 4700. This is similar to as described above. The status block 4608 can include a "save and quit" link or button 4712 to allow the user to save his or her progress at any point during the process 4400, and then return later to complete the application. Upon saving the application, each input received by the web-based program can be communicated to the server and a file can be created with a corresponding application number or identifier. The file can then be saved on the server or database. Upon executing block 4418, the server can retrieve the file and communicate the contents thereof to the web-based program so that the process 4400 can return to the block where the user exited.

Figure 48:
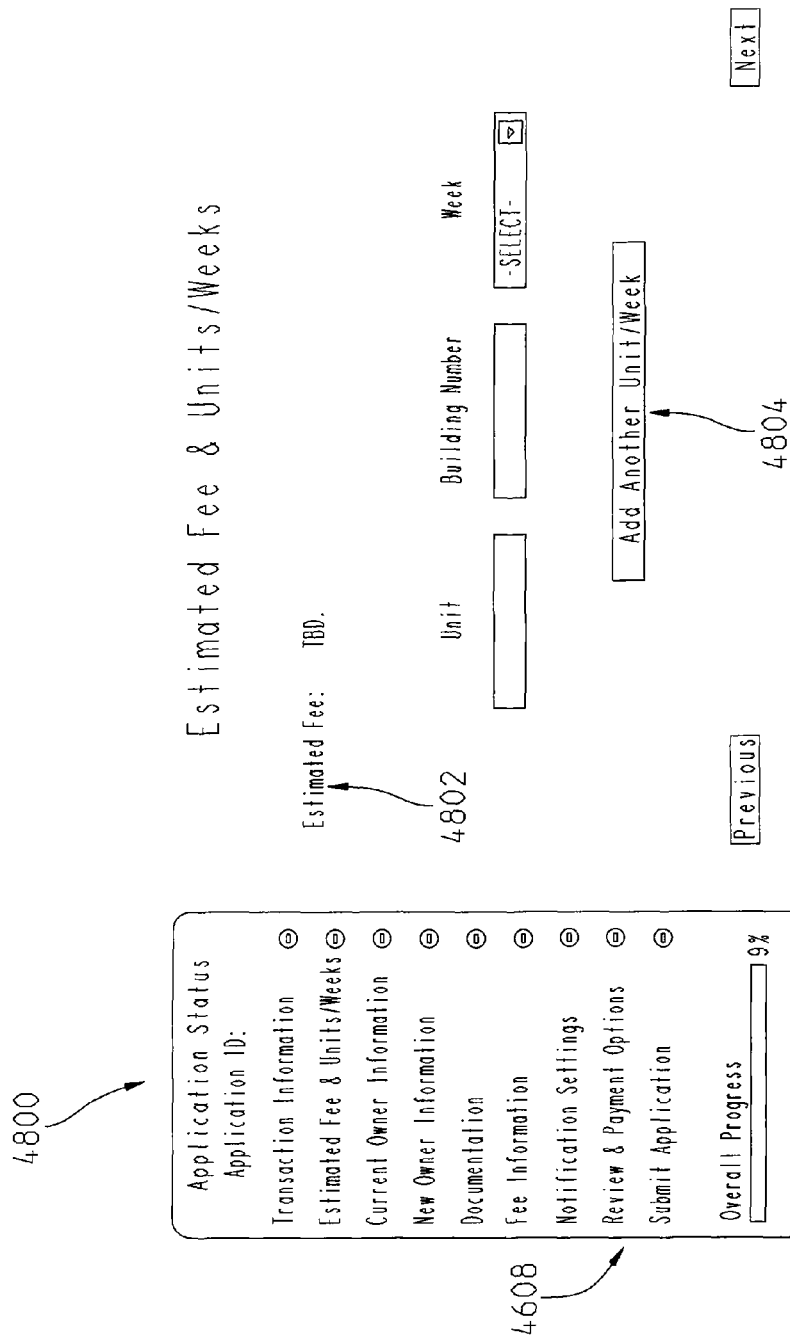
FIG. 48 is a schematic of one block in the process of FIG. 44 for requesting information regarding estimated fee, unit(s), and week(s)

Once the transaction information is received in block 4408, the process 4400 can advance to block 4410 to collect information about transaction fees and the property. A screen 4800 similar to that in FIG. 48 can be displayed by the web-based program to request information from the user including unit number, building number, and week number, as applicable. An estimated fee for completing the transaction can be predetermined or calculated by the web-based program based on the information provided in block 4408. As such, the estimated fee due for the transaction can be displayed in a fee block 4802 in the screen 4800. The estimated fee can also be adjusted if an additional unit or week is selected from selectable link 4804. Here, if the transaction involves two or more properties or additional weeks, the user can select the link 4804 and add additional units or weeks. A calculation module, similar to the one previously described, can be stored on the server, and based on the inputs received in blocks 4408 and 4410, the estimated fee can be determined.

The process 4400 can advance to block 4412 to further collect information about each party to the transaction. For example, information about an owner or seller as part of the transaction can be requested and received in block 4412. A screen similar to that of FIG. 9 or 21 can be displayed for requesting this information. As previously described, the owner or seller screen can be a template stored on the server or database and displayed to the user for collecting certain information. An identifier can link to each input received from the user for later processing. Moreover, an address verification module stored on the server, for example, can be executed to affirm the address received for the owner or seller corresponds to a valid, known address by the U.S. Postal Office records. This module can be executed by a third party and communications can be transferred between the web-based program and the third party to receive the desired information.

Likewise, buyer or new owner information can be received in block 4412. A screen similar to that of FIG. 9 or 21 can be displayed to the user for receiving the necessary information. The address verification module can be executed, and each input of information can be linked with a corresponding identifier for later use. In this manner, all input information is linked or merged with a predefined identifier as similarly described above. In addition, any documentation necessary for the transaction can be collected. A documentation screen similar to that of FIG. 11 may be displayed for receiving the necessary documentation. If a certain document is required for the transaction, a template of this document can be stored in a template library on the server or database and thereby be provided to the user for execution. For instance, a document in which the seller authorizes the release of information may be necessary. The template can include identifiers in it that are linked to inputs received from the user, and thus the template may only require a signature, date, notarization, etc. for completion. Once completed, the user can then upload, email, fax, or mail the completed form. Instructions for completing this step can be provided on a screen similar to that in FIG. 11.

Once information for each party to the transaction is received, the file that corresponds to the transaction or application can be updated and saved to the server or database. Moreover, the process 4400 can advance to block 4414 to execute a notification settings module. To execute the notification settings module, an example of one screen 4900 is shown in FIG. 49. Here, the notification settings module can be retrieved from the server and request information including contact name, company name, email address, phone number, facsimile number, website, and address. As a safety verification tool, the process 4400 can further verify the address against United States postal records. In the event a foreign jurisdiction is entered into the address blocks, further verification can be done to determine the accuracy and existence of such a postal address. If an address is not verified, the process 4400 may not be able to advance past block 4414.

Contrary to screen 1200, the notification settings screen 4900 in FIG. 49 may require a broker title company to disclose the closing company for the transaction. This may not be required in either process 300 or 1800, but at least in one aspect of process 4400 the identity of the closing company may be required. In other aspects, however, the closing company identity may not be required.

Figure 50A:
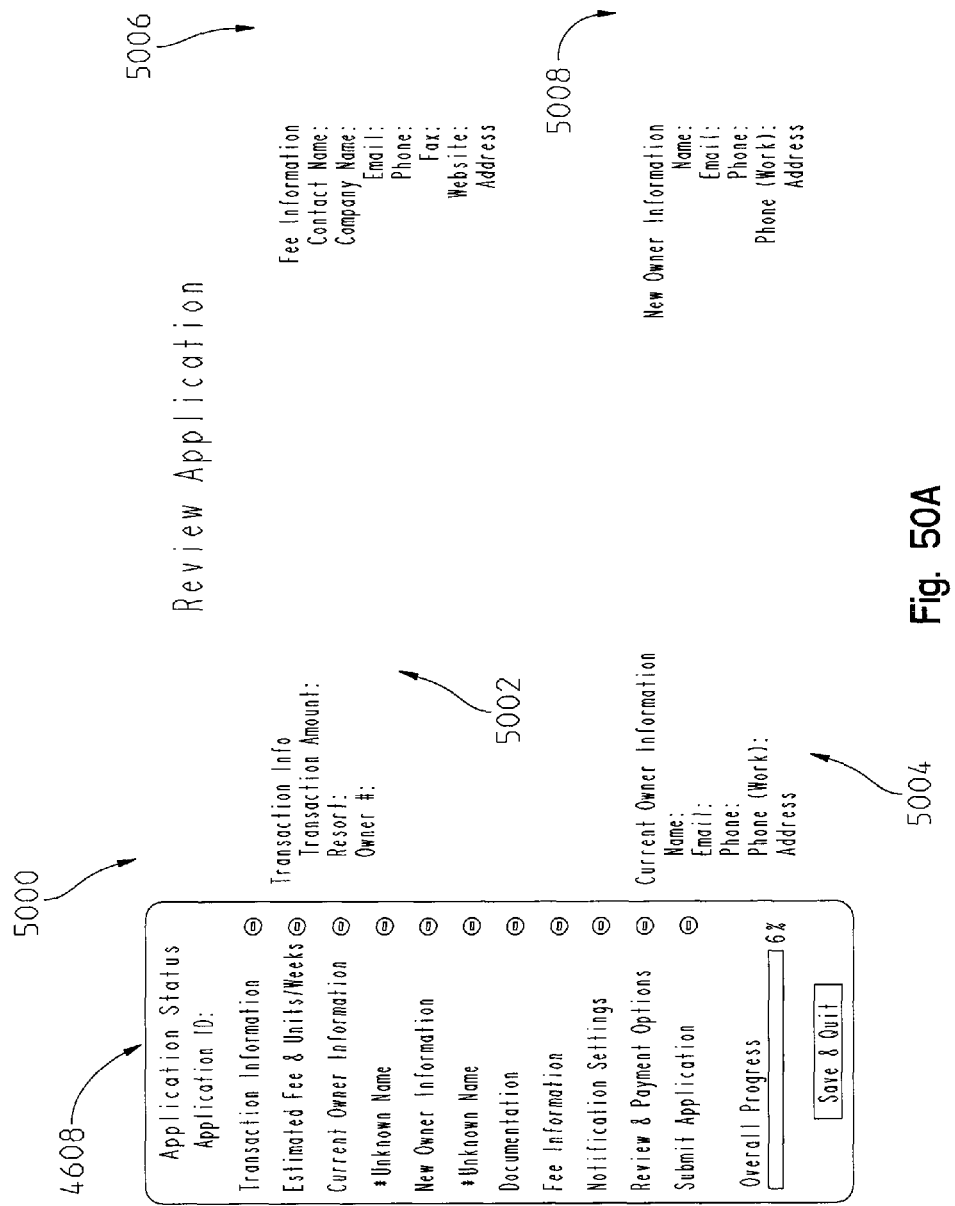
FIG. 50A is a partial schematic of one block in the process of FIG. 44 for displaying a review application template with information collected in the process.
Figure 50B:
FIG. 50B is another partial schematic of one block in the process of FIG. 44 for displaying a review application template with information collected in the process.

Once the inputs are received in block 4414, the web-based program can link any remaining inputs with predefined identifiers. The file for this transaction or application can be updated in block 4416 and a summary or review template can be retrieved by the web-based program from the server and link or merge all inputs to identifiers in the template. The template can be saved in the template library on the server or in the database, and retrieved therefrom by the web-based program. Once the review template is generated, it can be displayed to the user in a screen 5000 similar to that in FIGS. 50A and 50B. FIGS. 50A and 50B can form a single screen 5000, but for purposes of clarity the screen 5000 is separated to better illustrate some of the features displayed.

In the review screen 5000, each input collected from the user can be displayed once it is linked to or merged with a corresponding identifier. Here, a transaction information block 5002 can display one or more inputs received in blocks 4408 and 4410. Information collected in block 4412 can be displayed in a current owner information block 5004 and a new owner information block 5008. Moreover, information collected in block 4414 can be displayed in a notification settings block 5006. Each of the aforementioned blocks in the screen 5000 can be selectable links such that any changes to inputs in a block can be updated immediately. For instance, if the current owner name is misspelled, the user can select the current owner information block 5004 and the process 4400 can return to block 4412 for further execution.

In the review screen 5000, a payment information block 5010 can display any fees or payments that remain to be paid. To make any necessary payment, the user may be presented with a payment window or block 1302 similar to that in FIG. 13. In the event all fees and payments have been received, such as shown in FIG. 50, the payment window or block 1302 may not be displayed.

If the information displayed in the review screen 5000 is accurate and complete, and no further payment is needed, the user can select a check box and/or link in a "submit application" block 5012 to complete the application for requesting an estoppel. Each input received from the user can be saved to the transaction file to the server or database, and the corresponding estoppel application can be processed according to those means known by one skilled in the art.

Once information in the review screen 5000 is affirmed, the web-based program can advance the process 4400 to block 4422 to execute a document generation module. The document generation module can be stored on the server or in a database such that documents such as an Assessment Certificate and Estoppel Letter, for example, can be generated. Other documents may also be generated in this block 4422. Each document can include one or more identifiers such that each identifier is merged with an input received during the execution of the process 4400.

Referring to FIG. 77, an Assessment Certificate and Estoppel letter template 7700 is shown. The template 7700 can include a plurality of identifiers as shown. For example, a first block or section 7702 can include one or more identifiers associated with the closing company. Inputs corresponding to the broker title company can be merged into the template 7700 in this first section 7702. Similarly, a second block or section 7704 can include one or more identifiers associated with the seller. Inputs corresponding to the seller can be merged into the template 7700 in this second section 7704.

In the template 7700, the seller name can be linked to a seller name identifier (<<sellerNames>>) 7706, the buyer name can be linked to a buyer name identifier (<<buyerNames>>) 7708, and a purchase price can be linked to a purchase price identifier ($<<salesPrice>>). The purchase price input can be received in either block 4408 or 4410. Similarly, a resort information section 7712 can be positioned in the template 7700 to merge resort input data with corresponding identifiers. The resort input data may be received in one or more of the blocks of process 4400, or in one of the processes described in another embodiment of the present disclosure.

The template 7700 may also link input data related to current fees due, past fees due, and resort transfer fees. The current fees due input data can be merged with identifiers in a current fees due section 7714, the past fees due input data can be merged with identifiers in a past fees due section 7716, and resort transfer fees input data can be merged with identifiers in a resort transfer fees section 7718 of the template 7700. The template 7700 can also link a mailing address (<<mailingAddress>>) to a designated agent along with the agent's signature (e.g., <<signingAgent>>) and date of signature (e.g., <<eDate>>). Other input data can be merged into this document as necessary. In addition, other documents can be produced in block 4418 in a similar manner as the Assessment Certificate and Estoppel Letter described herein.

In this disclosure, files, templates, modules, programs, etc. can be stored on a web server or in a database. In some instances, more than one database can be used. For example, one database can be used to store information related to the processes 300, 1800 for transferring a timeshare. A second database may be used for storing information and files related to the process 4400 for requesting an estoppel. Another database can be used to store the templates for closing documents, etc. such as those described in process 2500. Thus, while only one database may be described herein, it is to be understood that multiple databases can be used to store files, information, programs, instructions, logic, modules, templates, etc.

In a different embodiment of this disclosure, a process for holding an escrow is provided. In this embodiment, an application for holding an escrow can be completed by a user logging into a web portal system or web-based program similar to those previously described. In one example, a web-based program at http://www.Holdmyescrow.com can be accessed and completed. The process can include a series of blocks or steps that are organized into an algorithm or set of instructions stored on a server and executed by a web-based program at the aforementioned URL. Alternatively, the process can be stored as a program or set of instructions in a memory unit of a computing device or controller, and executed by a processor of the computing device or controller. An example of a process 5100 for requesting a hold of escrow is shown in FIG. 51.

Figure 51:
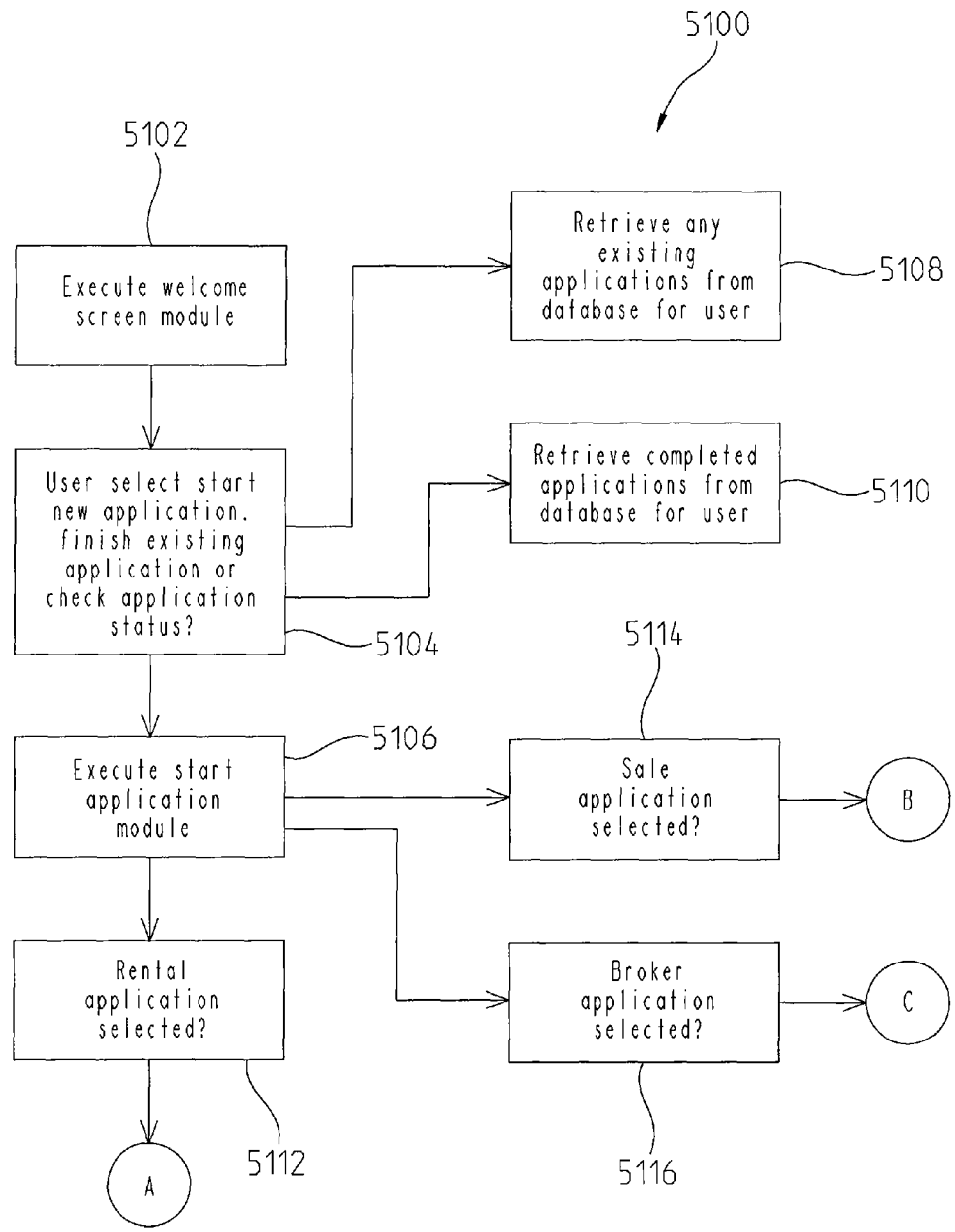
FIG. 51 is a flow diagram of another embodiment of a process for executing a hold an escrow application.

Referring to FIG. 51, the process 5100 can advance to a first block 5102 in which the web-based program can execute a welcome screen module. The welcome screen module can be stored on a server and display a screen similar to that shown in FIG. 45. For instance, the user can be presented with a plurality of options for advancing beyond the welcome screen. For example, the user can select to start a new application, finish an existing application, or check a status of a completed application. Similar to the welcome screen of FIG. 45, the user may also log into their file, which can be stored on the server or database. In addition, a user may access customer support or otherwise seek help.

The process 5100 can advance past block 5102 based on the instruction sent by the user to the web-based program from the welcome screen. Here, in block 5104, the web-based program receives an instruction or communication from the user and the instruction is processed and executed by completing one or more additional blocks or steps in the process 5100. For example, if the user selects to start a new application, the process 5100 can advance to block 5106. If, however, the user instructed the web-based program to finish an existing application, the process 5100 can advance to block 5108. Moreover, if the user instructed the web-based program to retrieve completed applications corresponding to the user's account, the process 5100 can advance to block 5110. Block 5108 can be carried out similar to that of block 4418 as previously described. In addition, block 5110 can be executed similar to that of block 4420 of FIG. 44.

Figure 55:
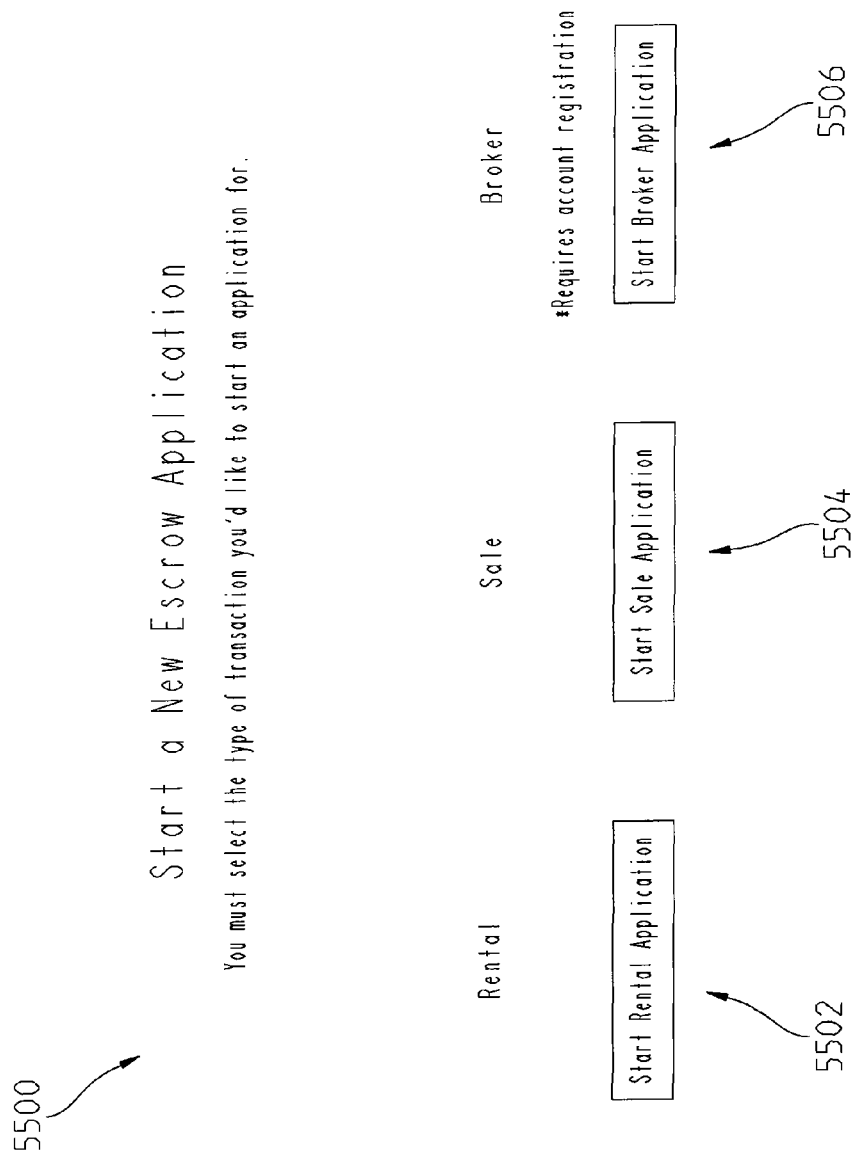
FIG. 55 is a schematic of a screen for requesting a type of application to complete.

In block 5106, the web-based program is configured to execute a start application module. This module can be stored on the server or in the database on the server. In any event, the module can provide the user with a plurality of options. In FIG. 55, for example, a new escrow application can be executed by presenting the user with a plurality of different applications to complete. A screen 5500 can be displayed that presents these options to the user. The user may execute a new rental application, a new sale application, or a broker application. To prepare a new rental application, the display includes a first link 5502 that can be selected by the user to advance to a rental application process 5200. To prepare a sale application, the display can include a second link 5504 that can be selected by the user to advance to a sale application process 5300. In addition, to prepare a broker application, the display can include a third selectable link 5506 for advancing to a broker application 5400.

Once the user selects one of the options, the process 5100 can advance to blocks 5112, 5114, and 5116 to determine which application the user selected. If the process 5100 determines that the new rental application is selected, in block 5112 the process 5100 can advance to the rental application process 5200 shown in FIG. 52. If, however, the process 5100 determines that the new sale application is selected in block 5114, the process 5100 can advance to the sale application process 5300 shown in FIG. 53. Moreover, if the process 5100 determines that the new broker application is selected in block 5116, the process 5100 can advance to the broker application process 5400 shown in FIG. 54.

Figure 56:
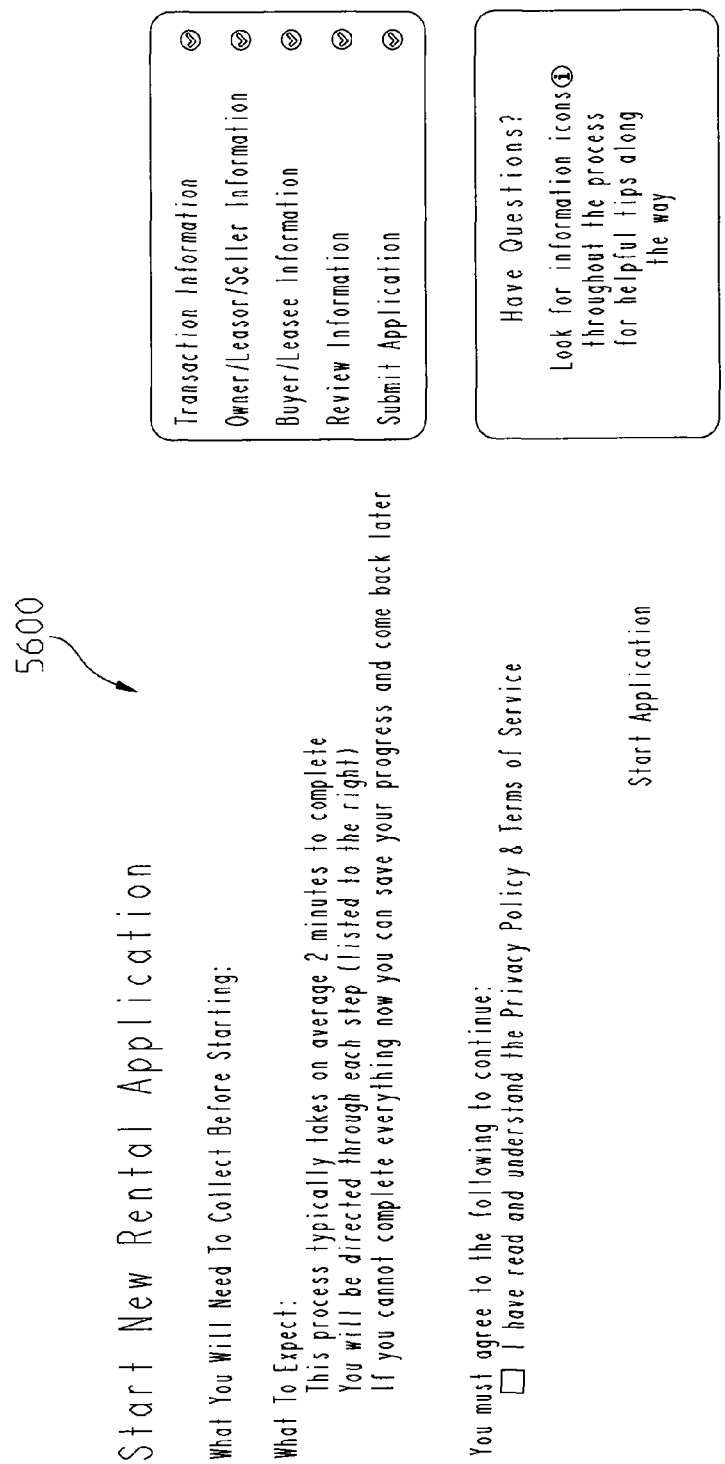
FIG. 56 is a schematic of one block of the process of FIG. 52 for executing a start rental application module.

A new rental application can be completed according to the process 5200 shown in FIG. 52. The process 5200 can begin with a first block 5202 for executing a start rental application module. In this module, a screen 5600 similar to the one in FIG. 56 can be displayed for the user. The screen 5600 can be arranged similarly as the screen 4600 in FIG. 46. The screen 5600 can be predefined and stored on the server or database. In the screen 5600, the process 5200 can set forth items needed to complete the application, what the user can expect by completing the application, and a link to the privacy policy and terms of service. The screen 5600 can also include a "start application" or "continue" button for the user to select and advance the process 5200 to the next block. The web-based program 5200 may not advance unless a check box is marked or selected by the user before selecting the "start application" or "continue" button.

Figure 57:
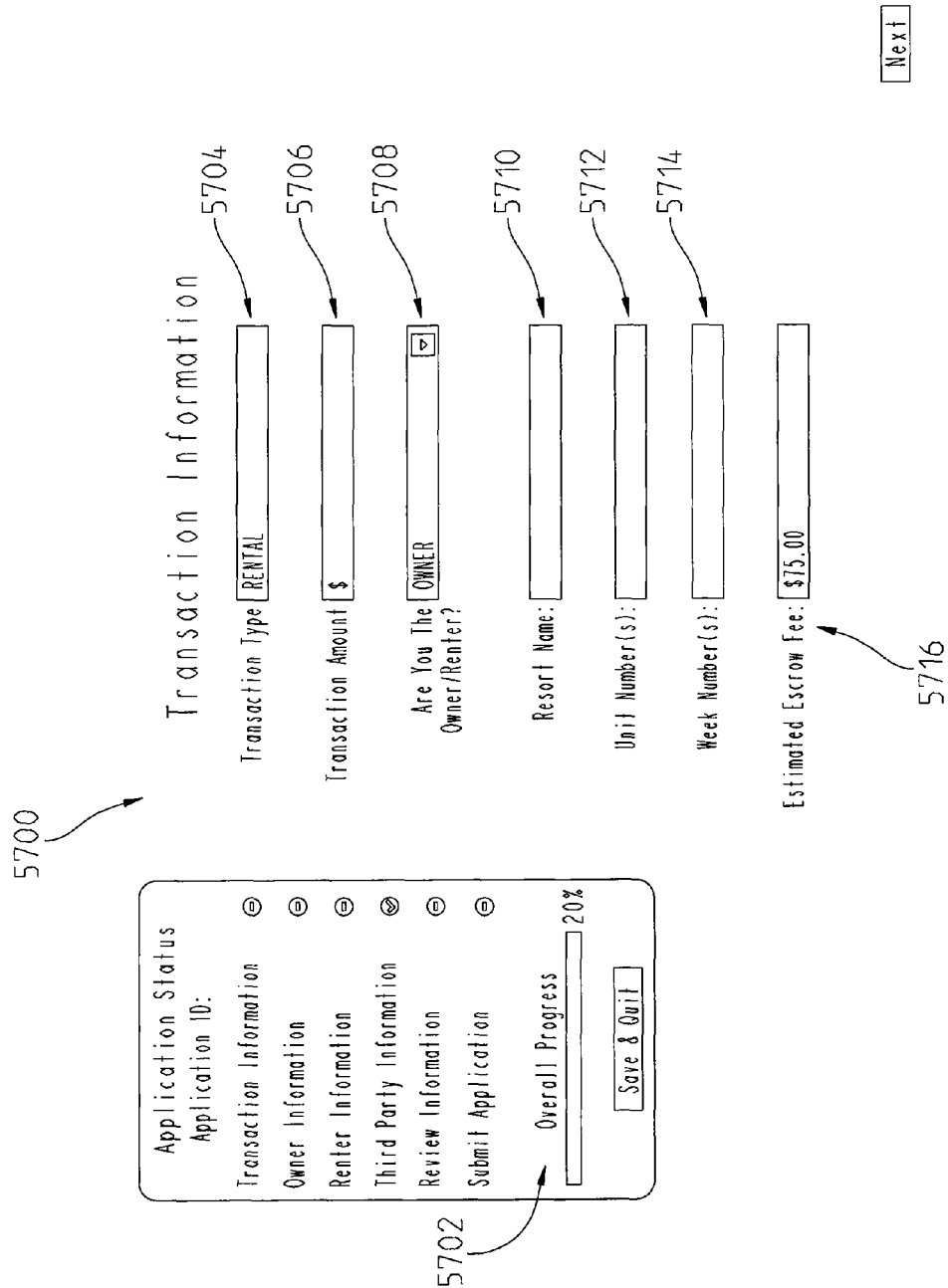
FIG. 57 is a schematic of one block of the process of FIG. 52 for requesting transaction information.

Once the start rental application module has been executed in block 5202, the process 5200 can advance to block 5204 to collect transaction information from the user. In block 5204, the process 5200 can request information in a screen 5700 as shown in FIG. 57. In this screen 5700, an application status window or box can be displayed to show the user where in the process 5200 the user currently is. This is similar to the application status windows or boxes described previously in this disclosure. In addition, block 5204 can request information such as transaction type 5704 (e.g., rental, sale, broker), transaction amount 5706, party identity 5708 (e.g., lessee, lessor), resort name 5710, unit number or numbers 5712, and week number or numbers 5714. Based on this information, the web-based program can provide the user with an estimated amount for an escrow fee 5716 as shown in FIG. 57. Once this information is provided by the user, the inputs received by the web-based program can be used to produce a transaction file. The inputs may be transferred to the web-based program or the server once the user selects a "Next" or "continue" button from the screen 5700. In any event, once the inputs are received and placed in the transaction file, the transaction file can be stored on the server or database.

Once block 5204 is completed, the process 5200 can advance to block 5206 to collect information about each party to the transaction. In a rental agreement, information may be requested of the lessor and lessee. This information can include name, address, email address, home phone number, work phone number, cell phone number, employer, employer address, etc. Similar to the modules described above, the address of each party can be verified by confirming with the U.S. Postal Office records. If the address is unfound or not confirmed as valid, the process 5200 (like the previously described processes) may not advance until a valid address is provided.

Figure 58A:
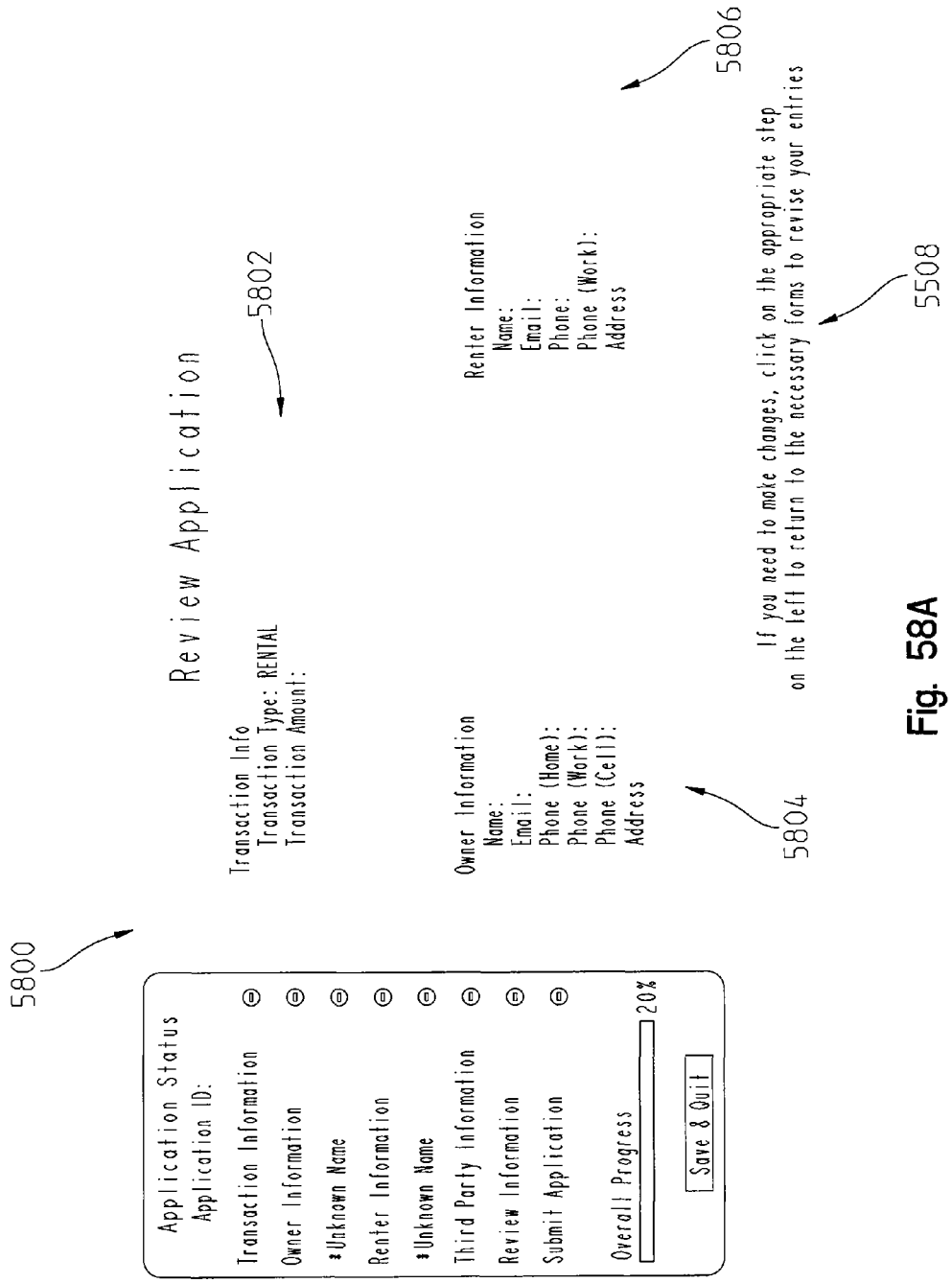
FIG. 58A is a partial schematic of one block of the process of FIG. 52 for providing a review rental application template with information received during the process.
Figure 58B:
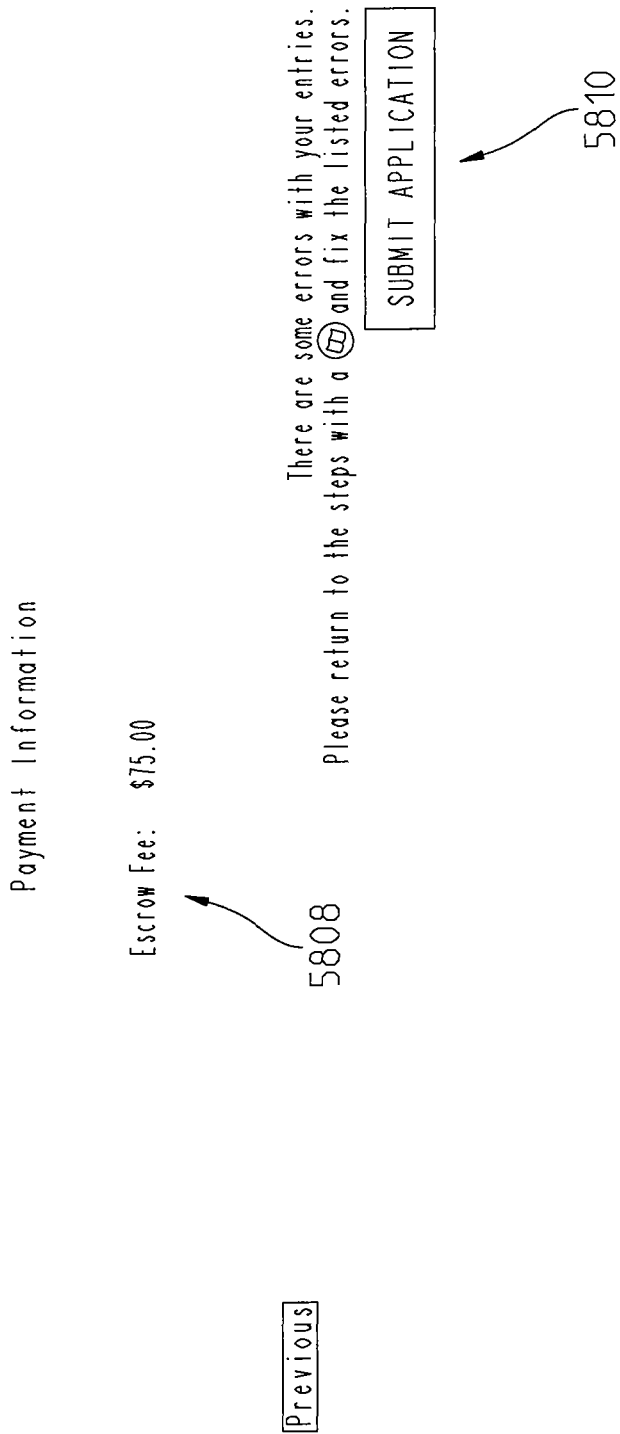
FIG. 58B is another partial schematic of one block of the process of FIG. 52 for providing a review rental application template with information received during the process.

In each block, information received from the user may be linked with an identifier similar to that described above with respect to process 2500. In this manner, many of the screens can directly link an input with an identifier, and this can be saved to the server or database. Each input is linked with its corresponding identifier in block 5208, and as such a review template can be pulled from a template library stored on the server or database. Each input can be linked or merged in the review template, and the template can then be displayed to the user in a screen 5800 similar to that shown in FIGS. 58A and 58B. Similar to the screen 5000 in FIGS. 50A and 50B, the screen 5800 is separated into FIGS. 58A and 58B to better illustrate some of the features displayed therein. The review screen 5800 can identify the transaction information 5802 received from the user in block 5204, lessor information 5804 received in block 5206, and lessee information 5806 received in block 5206. Moreover, payment information, e.g., the escrow fee, can be displayed in a payment window 5808 and a verification block 5810 can be provided for the user to select a check box or link to verify the completeness and accuracy of the information shown in the review screen 5800. Once the user affirms this information and submits the application, the process 5200 can advance to an application processing block 5210. The application can be stored in the database or server during this execution of this block 5210.

Figure 59:
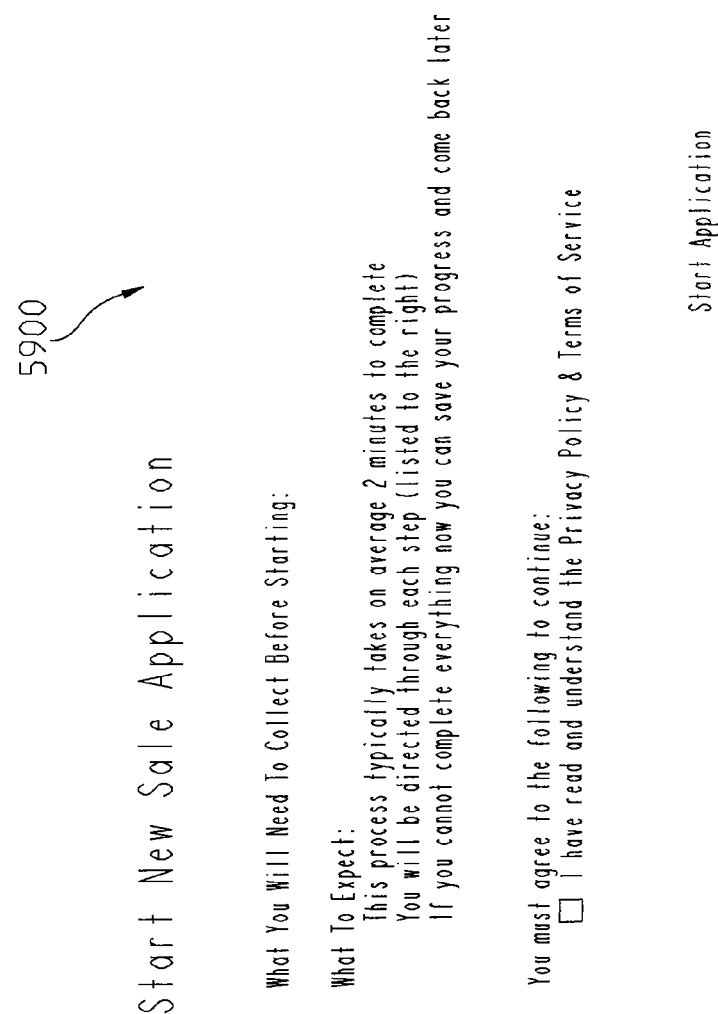
FIG. 59 is a schematic of one block of the process of FIG. 53 for executing a start sale application module.

In another aspect, if the user selects a sale agreement in block 5114, a sale application process can be executed. The sale application process can be stored on the server and executed by the web-based program. In FIG. 53, one example of a sale application process 5300 is shown. The process 5300 can begin with a first block 5302 for executing a start sale application module. In this module, a screen 5900 similar to the one in FIG. 59 can be displayed for the user. The screen 5900 can be arranged similarly as the screen 4600 in FIG. 46 and the screen 5600 in FIG. 56. The screen 5900 can be predefined and stored on the server or database. In the screen 5900, the process 5300 can set forth items needed to complete the application, what the user can expect by completing the application, and a link to the privacy policy and terms of service. The screen 5900 can also include a "start application" or "continue" button for the user to select and advance the process 5300 to the next block. The process 5300 may not advance unless a check box is marked or selected by the user before selecting the "start application" or "continue" button.

Figure 60:
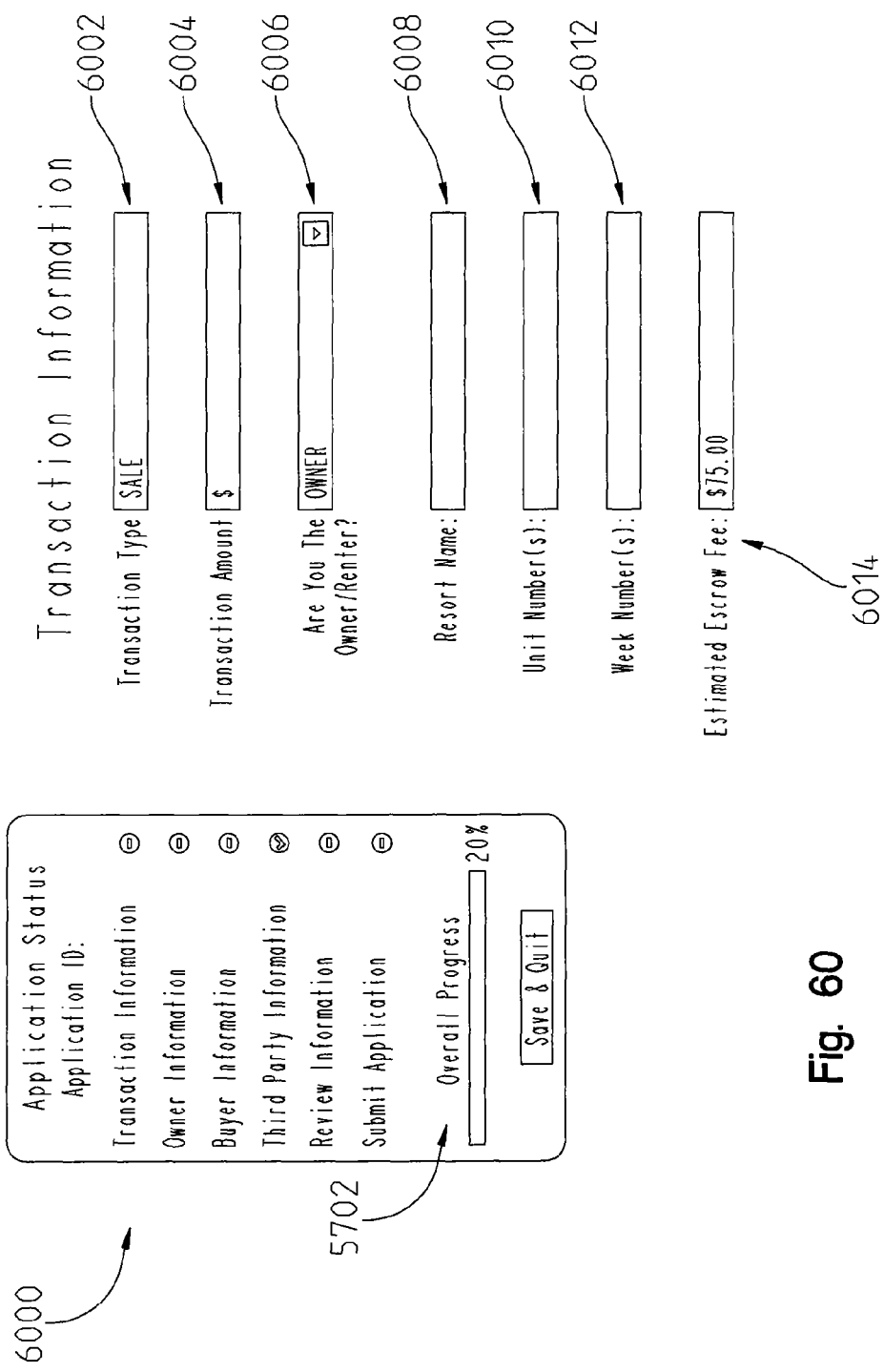
FIG. 60 is a schematic of one block of the process of FIG. 53 for requesting transaction information.

Once the start sale application module has been executed in block 5302, the process 5300 can advance to block 5304 to collect transaction information from the user. In block 5304, the process 5300 can request information in a screen 6000 as shown in FIG. 60. In this screen 6000, an application status window or box 5702 can be displayed to show the user where in the process 5300 the user currently is. This is similar to the application status windows or boxes described previously in this disclosure.

In addition, in block 5304 the process 5300 can request information such as transaction type 6002 (e.g., rental, sale, broker), transaction amount 6004, party identity 6006 (e.g., owner, buyer, third party), resort name 6008, unit number or numbers 6010, and week number or numbers 6012. Based on this information, the web-based program can provide the user with an estimated amount for an escrow fee 6012 as shown in FIG. 60. Once this information is provided by the user, the inputs are received by the web-based program and a transaction file can be produced and saved on the server. The inputs may be transferred to the web-based program once the user selects a "Next" or "Continue" button from the screen 6000. In any event, once the inputs are received and placed in the transaction file, the transaction file can be stored on the server or database.

Once block 5304 is completed, the process 5300 can advance to block 5306 to collect information about each party to the transaction. In a sale agreement, information may be requested of the owner, buyer, and/or a third party. In some agreements, a real estate agent, broker, or other party may be a party to the transaction. This information can include name, address, email address, home phone number, work phone number, cell phone number, employer, employer address, etc. Similar to the modules described above, the address of each party can be verified by confirming with the U.S. Postal Office records. If the address is unfound or not confirmed as valid, the process 5300 (like the previously described processes) cannot advance until a valid address is provided.

Figure 61:
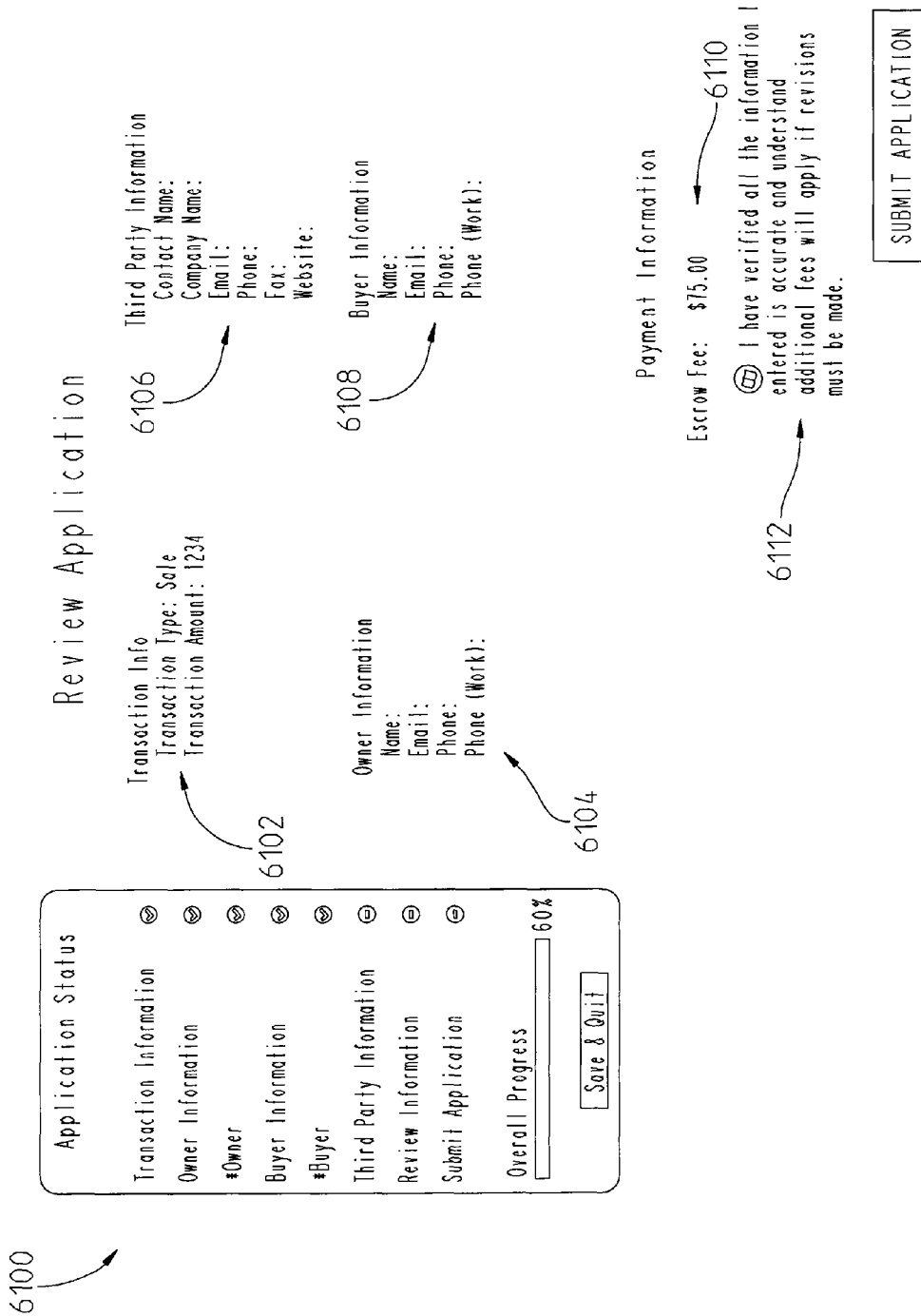
FIG. 61 is a schematic of one block of the process of FIG. 53 for providing a review sale application template with information received during the process.

In each block, information received from the user may be linked with an identifier similar to that described above with respect to processes 2500 and 5200. In this manner, many of the screens can directly link an input with an identifier, and this can be saved to the server or database. Each input is linked with its corresponding identifier in block 5308, and as such a review template can be pulled from a template library. Each input can be linked or displayed in the review template, and the template can then be displayed to the user in a screen 6100 similar to that shown in FIG. 61. The review screen 6100 can identify the transaction information 6102 received from the user in block 5304, owner information 6104 received in block 5306, third party information 6106 received in block 5306, and buyer information 6108 received in block 5306. Moreover, payment information, e.g., the escrow fee, can be displayed in a payment window 6110 and a verification block 6112 can be provided for the user to select a check box or link to verify the completeness and accuracy of the information shown in the review screen 6100. Once the user affirms this information and submits the application, the process 5300 can advance to an application processing block 5310. The application can be stored in the database or on the server during the execution of block 5310.

Figure 54:
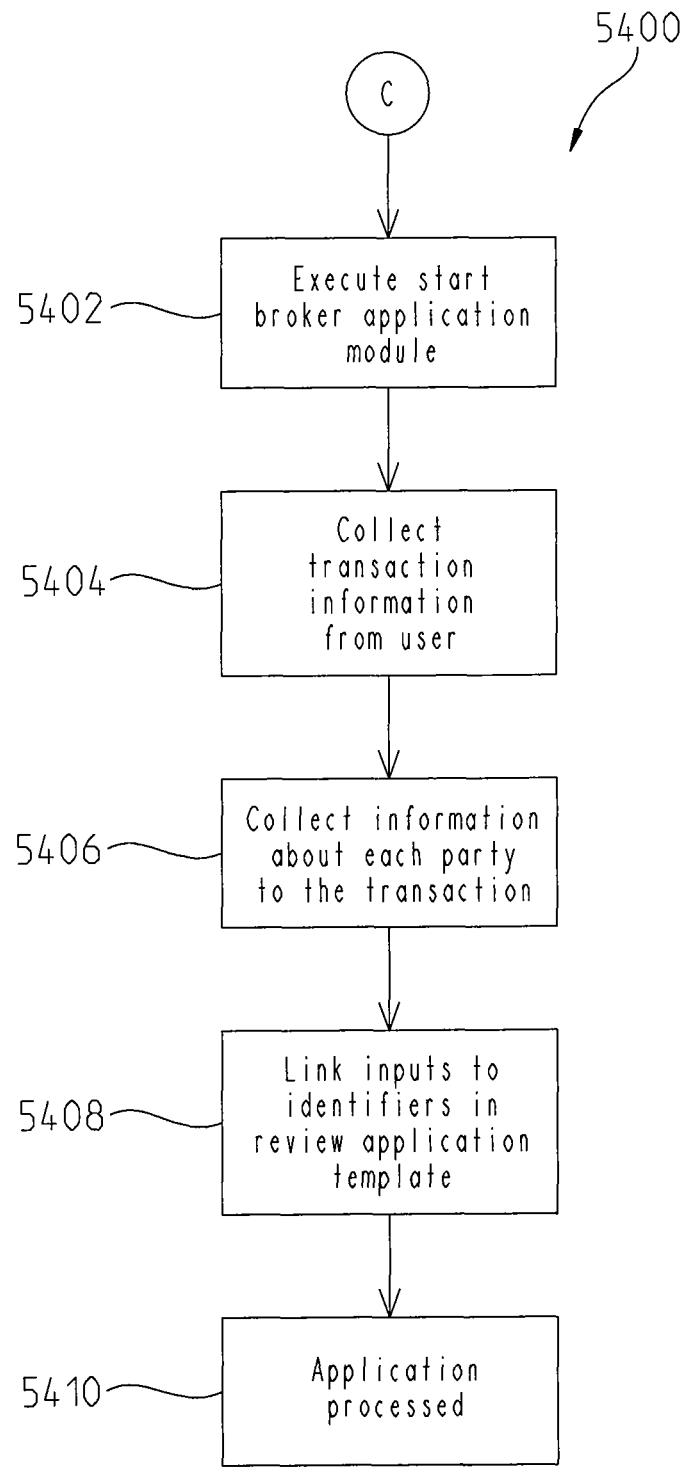
FIG. 54 is a flow diagram of executing a process for a broker application as part of the process of FIG. 51.

Returning to FIG. 51, if the user selects a broker agreement in block 5116, a broker application process can be executed. In FIG. 54, one example of a broker application process 5400 is shown. The process 5400 can be stored as a web-based program on the server and begin with a first block 5402 for executing a start broker application module. In this module, a broker may be required to login or sign into the web portal as previously described. In this instance, a file may already be stored for a given login in the database or on the server. Once login information is submitted, the information can be linked with the existing file. In the event the broker does not already have a file, the broker may be requested to register or create a file similar to that previously described.

Figure 62B:
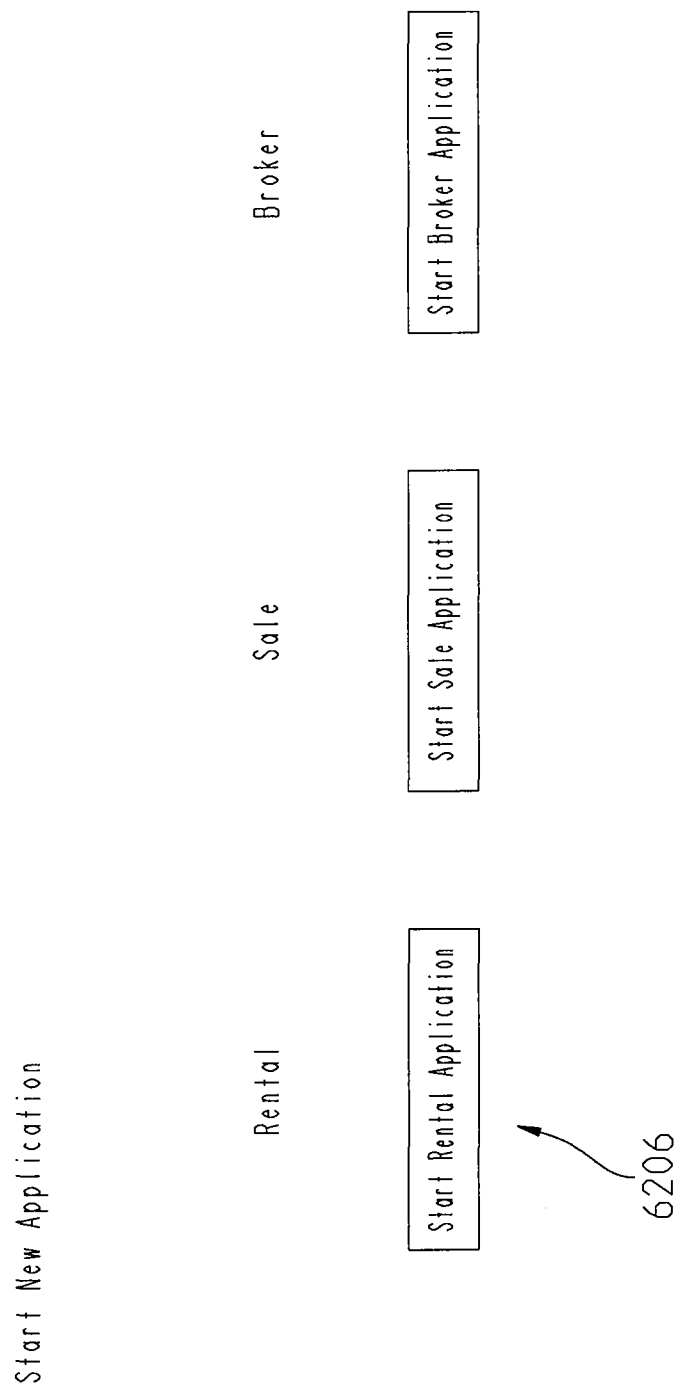
FIG. 62B is another partial schematic of one block of the process of FIG. 51 for providing application information for a given registered account.

If the broker does have a file, once login information is received and the file is retrieved, account information corresponding to the login information can be displayed in a screen 6200 similar to that in FIGS. 62A and 62B. The screen 6200 can include a plurality of features and therefore the screen 6200 is shown partially in FIGS. 62A and 62B to better illustrate these features. In the screen 6200, the web-based program can display in an application window 6202 any existing applications previously started or completed by the user which correspond with the login information. In FIG. 62, there are no applications that have been started for this particular login information. If an application is shown in this window 6202, the application can be displayed based on its application number or identification, its status, type of application (e.g., rental, sale, or broker), order number, last name of one party, date application was submitted, and any options that may be exercised with this application. For example, if the application was not complete, the user may be able to open the application and complete it.

The screen 6200 can also provide a drop-down menu 6204 for the user to select other options related to the applications. For instance, a broker may have one application for one particular developer or resort and another application for a different developer or resort. The drop-down menu 6204 can allow the user to access different applications for different developers or resorts. Other options may be available as well from this menu.

The screen 6200 can further provide the broker or user with an option to start a new application in a new application window 6206. This is similar to the screen 5500 in FIG. 55. Here the user can select to start a new rental agreement, a new sale agreement or a new broker agreement. If the new rental agreement or application is selected by the user, the process 5400 ends and the web-based program executes the rental application process 5200 of FIG. 52. Likewise, if the new sale agreement or application is selected by the user, the process 5400 ends and the web-based program executes the sale application process 5300 of FIG. 53. If, however, the user selects the new broker application, the process 5400 continues executing the start broker application module in block 5402. For instance, similar to FIGS. 56 and 59, the process 5400 can set forth items needed to complete the application, what the user can expect by completing the application, and a link to the privacy policy and terms of service. The screen can also include a "start application" or "continue" button for the user to select and advance the process 5400 to the next block. The process 5400 may not advance unless a check box is marked or selected by the user before selecting the "start application" or "continue" button.

Figure 63:
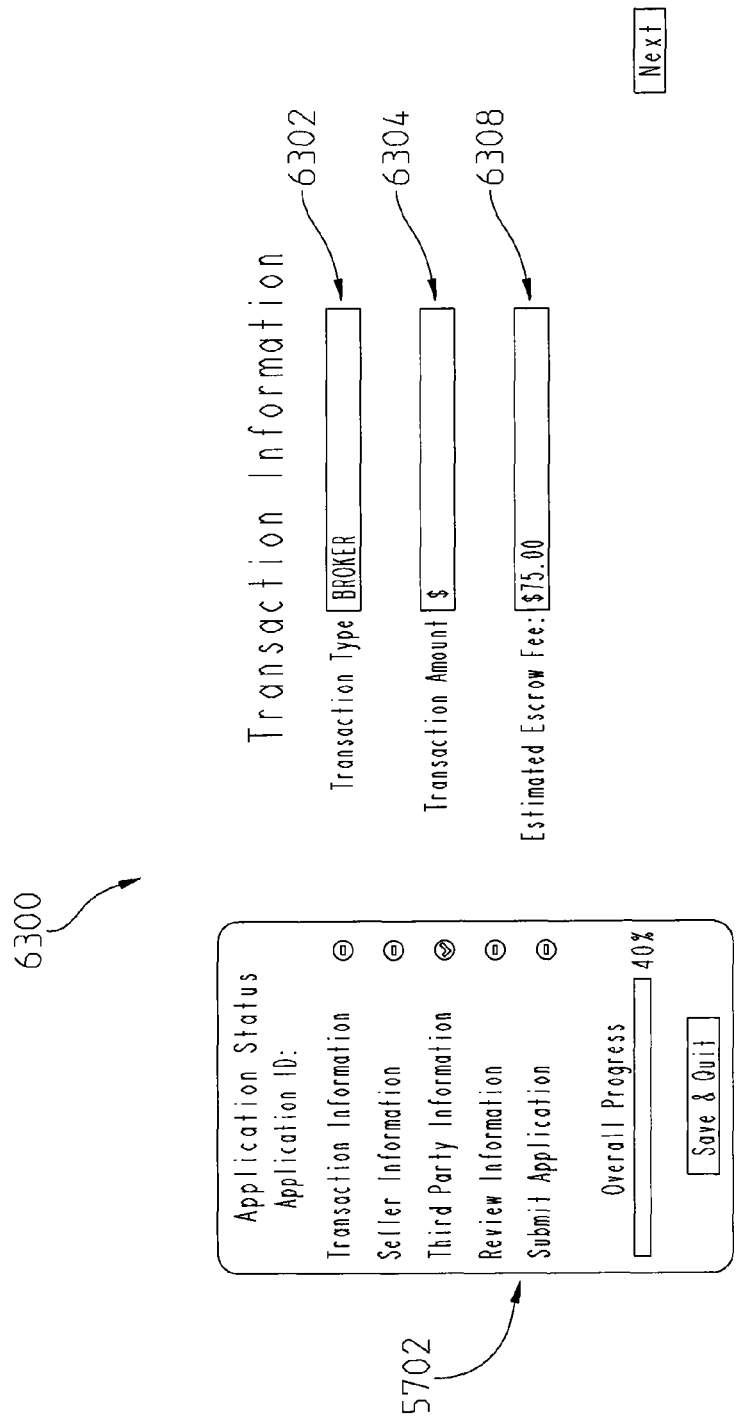
FIG. 63 is a schematic of one block of the process of FIG. 54 for requesting transaction information.

Once the start broker application module, which can be stored on the server, has been executed in block 5402 the process 5400 can advance to block 5404 to collect transaction information from the user. In block 5404, the process 5400 can request information in a screen 6300 as shown in FIG. 63. In this screen 6300, an application status window or box 5702 can be displayed to show the user where in the process 5400 the user currently is. This is similar to the application status windows or boxes described previously in this disclosure. In addition, in block 5404 the process 5400 can request information such as transaction type 6302 (e.g., rental, sale, broker), transaction amount 6304, and party identity 6306 (e.g., seller, buyer, third party). Other information may be requested from the user other than that shown in the screen 6300. Based on this information, the web-based program can provide the user with an estimated amount for an escrow fee 6308 as shown in FIG. 63. Once this information is provided by the user, the inputs are received by the web-based program and a transaction file can be produced. The inputs may be transferred to the server or the web-based program once the user selects a "Next" or "Continue" button from the screen 6300. In any event, once the inputs are received and placed in the transaction file, the transaction file can be stored on the server or database.

Once block 5404 is completed, the process 5400 can advance to block 5406 to collect information about each party to the transaction. In a broker application, information may be requested of the seller and third party. In some applications, a real estate agent, broker title company, or other party may be a party to the transaction and information about this party is requested. This information can include name, address, email address, home phone number, work phone number, cell phone number, employer, employer address, employer website, etc. Similar to the modules described above, the address of each party can be verified by confirming with the U.S. Postal Office records. If the address is unfound or not confirmed as valid, the process 5400 (like the previously described processes) cannot advance until a valid address is provided.

Figure 64A:
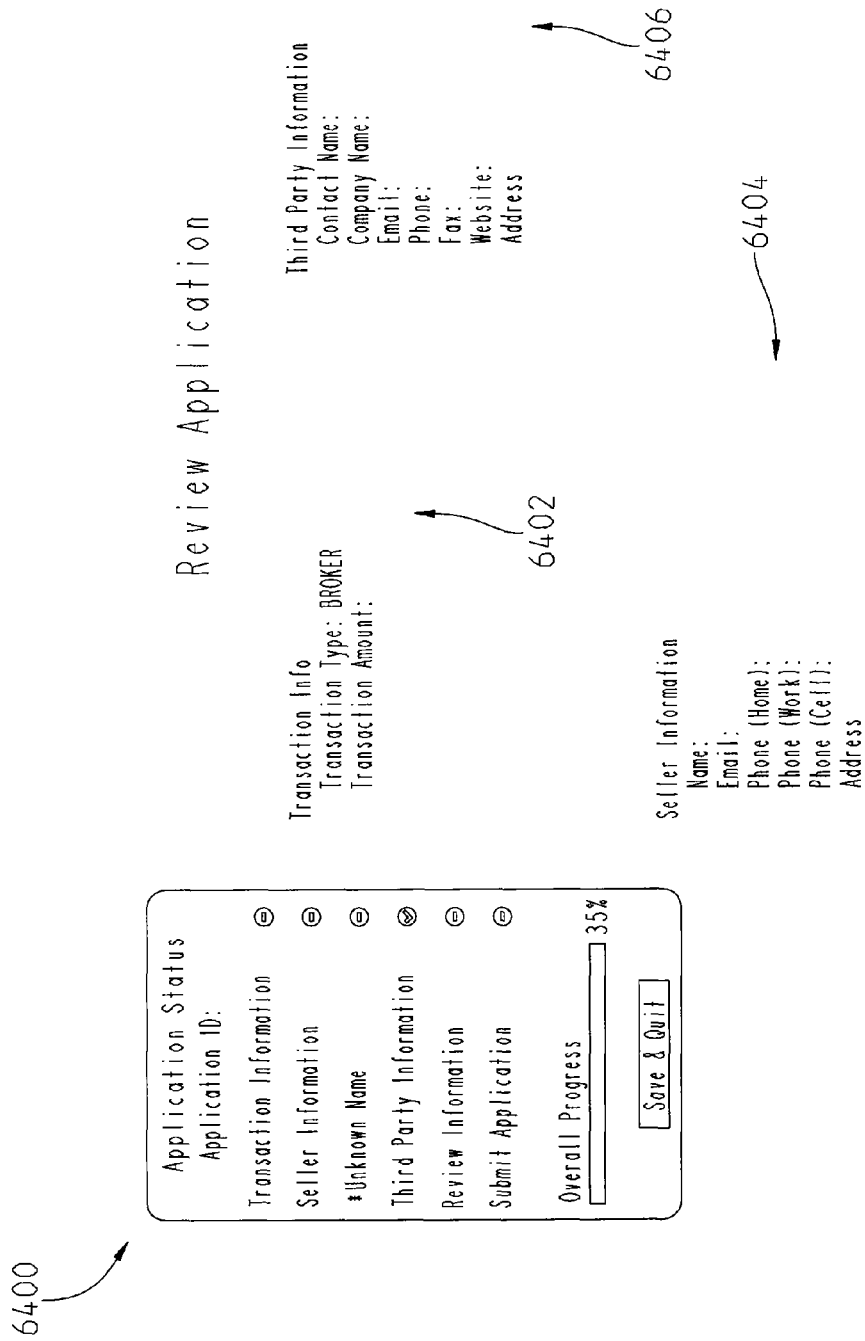
FIG. 64A is a first portion of a schematic of one block of the process of FIG. 54 for providing a review broker application template with information received during the process.
Figure 64B:
FIG. 64B is a second portion of the schematic of FIG. 64A.

In each block, information received from the user may be linked or merged with an identifier similar to that described above with respect to processes 2500, 5200, and 5300. In this manner, many of the screens can directly link an input with an identifier, and this can be saved to the application file and/or to the web-based program, server or database. Each input is linked with its corresponding identifier in block 5408, and as such a review template can be pulled from a template library stored on the server or database. Each input can be linked or displayed in the review template, and the template can then be displayed to the user in a screen 6400 similar to that shown in FIGS. 64A and 64B. The screen 6400 can include a plurality of features and therefore the screen 6400 is shown partially in FIGS. 64A and 64B to better illustrate these features. The review screen 6400 can identify the transaction information 6402 received from the user in block 5404, seller information 6404 received in block 5406, and third party information 6406 received in block 5406. Moreover, payment information, e.g., the escrow fee, can be displayed in a payment window 6408 and a verification block 6410 can be provided for the user to select a check box or link to verify the completeness and accuracy of the information shown in the review screen 6400. Once the user affirms this information and submits the application, the process 5400 can advance to an application processing block 5410. The application can be stored in the database or otherwise on the server during the execution of block 5410.

Depending on the type of transaction being executed in process 5100, documents can be generated in a document generation module similar to that of FIG. 44. A first example of this is shown in FIG. 78 where a Resale Transfer Agreement can be produced from a template 7800 stored on the server. In the template 7800, an escrow file number can be created by the web-based program or server and linked with a corresponding identifier 7802. Input data related to a broker title company can be linked with identifiers in a first section 7804 of the template, where the identifiers correspond to a broker company name, address, phone number, fax number, email address, and website URL. Input data related to a seller can be linked with identifiers in a second section 7806 of the template 7800, where the identifiers correspond to seller name, address, phone number, fax number, and address. Input data can also be received for an escrow agent and linked with identifiers (not shown) in a third section 7808. Moreover, a timeshare resale transfer price can be merged into the template and linked with an identifier 7810 corresponding to a timeshare resale transfer (e.g., <<salesPrice>>).

The template 7800 of FIG. 78 can be stored on the server or in a database on the server. It may also be stored in another memory device or other location that is in communication with the server. Other information can be merged into the template 7800 such as an escrow agent fees for services provided by the escrow agent. Other documents can therefore be produced in the document generation module based on the type of transaction being executed.

A second example of a template 7900 used to generate a document in the process 6500 is shown in FIG. 79. The template 7900 can be used to produce a sale and escrow agreement. Here, input data corresponding to seller or owner information and buyer or renter information can be linked with predefined identifiers and thereby merged into the appropriate locations in the template 7900. For example, a seller or owner name can be linked with an identifier 7902, <<sellerName1>> and <<sellerName2>>. Similarly, a buyer or renter name can be linked with an identifier 7904, <<buyerName1>> and <<buyerName2>>. Moreover, buyer or renter information can be linked with identifiers in a first information section 7906 and seller or owner information can be linked with identifiers in a second information section 7908. Other information can be linked with corresponding identifiers and merged into the template 7900 to produce the desired document. For example, an escrow amount due (<<salesPrice>>), purchase and sale of Property (e.g., <<transferPurposeSaleX>>), rental of property (e.g., <<transferPurposeRentalX>>), resort name (e.g., <<resortNameText>>), unit number (e.g., <<unitNumberText>>), week number (e.g., <<weekNumberText>>), and escrow fee (<<billableCostCurrent>>).

As documents are produced in the document generation module, the documents can be transferred to each party for review and execution. A letter formed from a letter template stored on the server can be produced as well, which can provide instructions to each respective party about the transaction and the document produced. Once documents are executed by each party and returned to the server, instructions may be stored on the server to further complete blocks 5210, 5310, or 5410 by submitting executed documents to a government authority or other third party for purposes of completing the transaction process.

In a different embodiment of the present disclosure, a process is provided for handling a real estate transaction between one or more parties. In this embodiment, a real estate sales professional, for example, can use standard customizable, standard real estate documents as templates to prepare high quality, professional real estate sales contracts. Similar to the other processes described in this disclosure, the process can be accessed over the network through a web-based application or program. In one example, an independently distinct URL or website may be available for completing the process. One such example may be found at http://www.jiffydocs.com. Alternatively, the web-based program may be stored on a web server, database, computing device or via downloadable software. Information can also be stored on the internet, on the server, or in the database.

Figure 65:
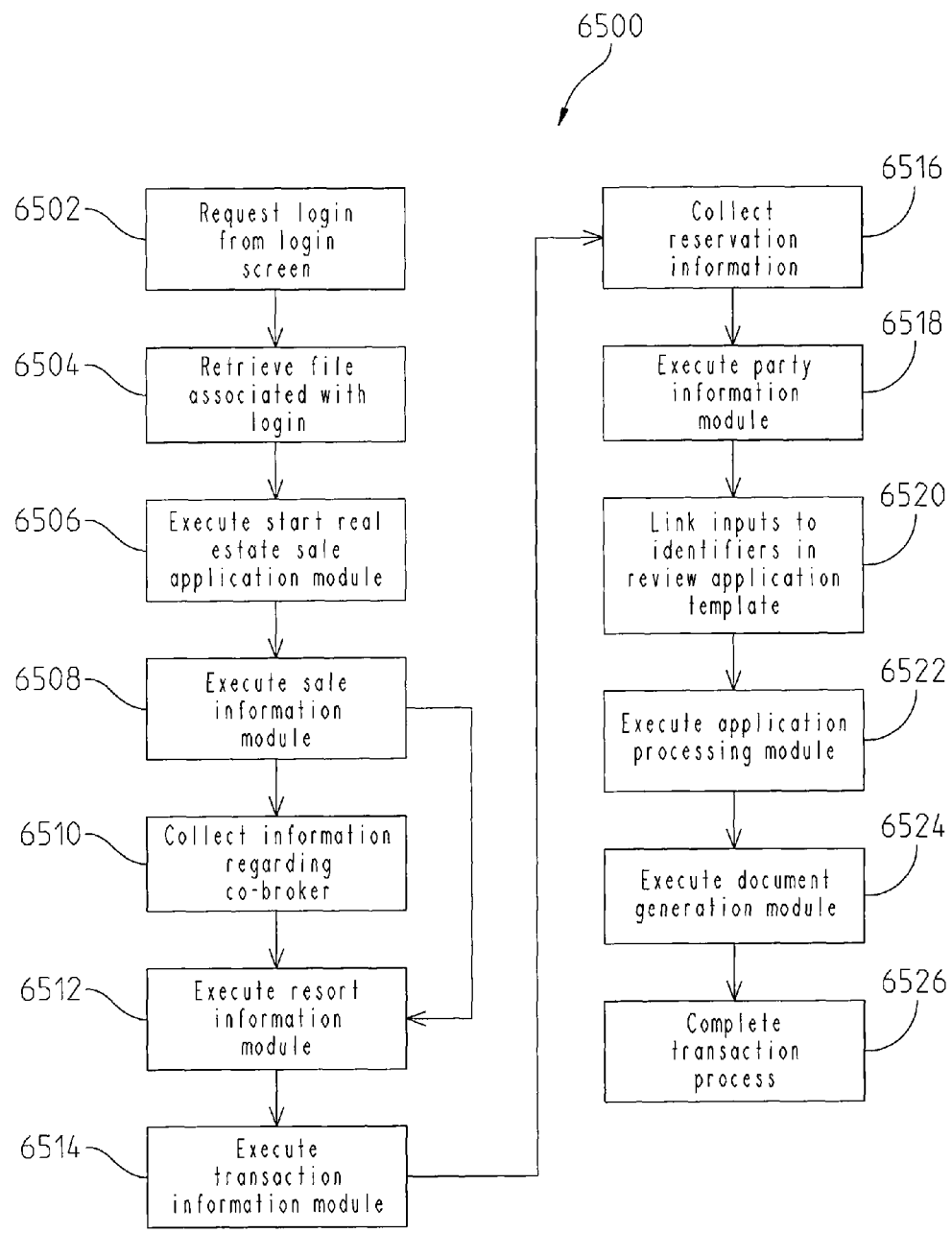
FIG. 65 is a process for executing a real estate transaction and generating the necessary transaction documents.

An example of one process 6500 is shown in FIG. 65. The process 6500 can include a plurality of blocks or steps for executing to complete an application process and transfer a transaction. During the process 6500, templates and other control modules can be stored on a server or in a database and communicated to the web-based program which can be controlled by a web server. For purposes of this disclosure, the server and web server can be considered the same. The server or database can also store templates and other documents or files in a template library. In some instances, each template can be unique to a registered user and stored in the template library for use during execution of the process 6500 by the user. In other instances, predefined templates or forms can be stored in a memory device, a second database, or in another location that is in electrical communication with the server and web-based program. Information, calculations, and other communications can occur between the database, server, and web-based program over the network for execution of the process 6500. This can be similar to the other processes described herein.

In FIG. 65, the process 6500 can execute a first block 6502 by requesting a login from a user via a login screen. As previously described in other embodiments, a user may be a buyer, seller, third party, etc. that first accesses the process 6500 via the internet. A website address or web portal for executing this process 6500 can provide a plurality of options. In any event, a user that desires to start a new application, complete an existing application, or check a status of a previously completed application may be required to first login to the web portal similar to that in FIG. 4. If a first-time user accesses the web portal, instructions may be provided by the process 6500 in block 6502 for registering an account. A new account template may be uploaded from the server or database and request the user to provide information related to the account. This may include an email address, user name, name, address, date of birth, company name, password, etc. Once an account is created, the account number or file can be stored on the server or database.

Figure 66:
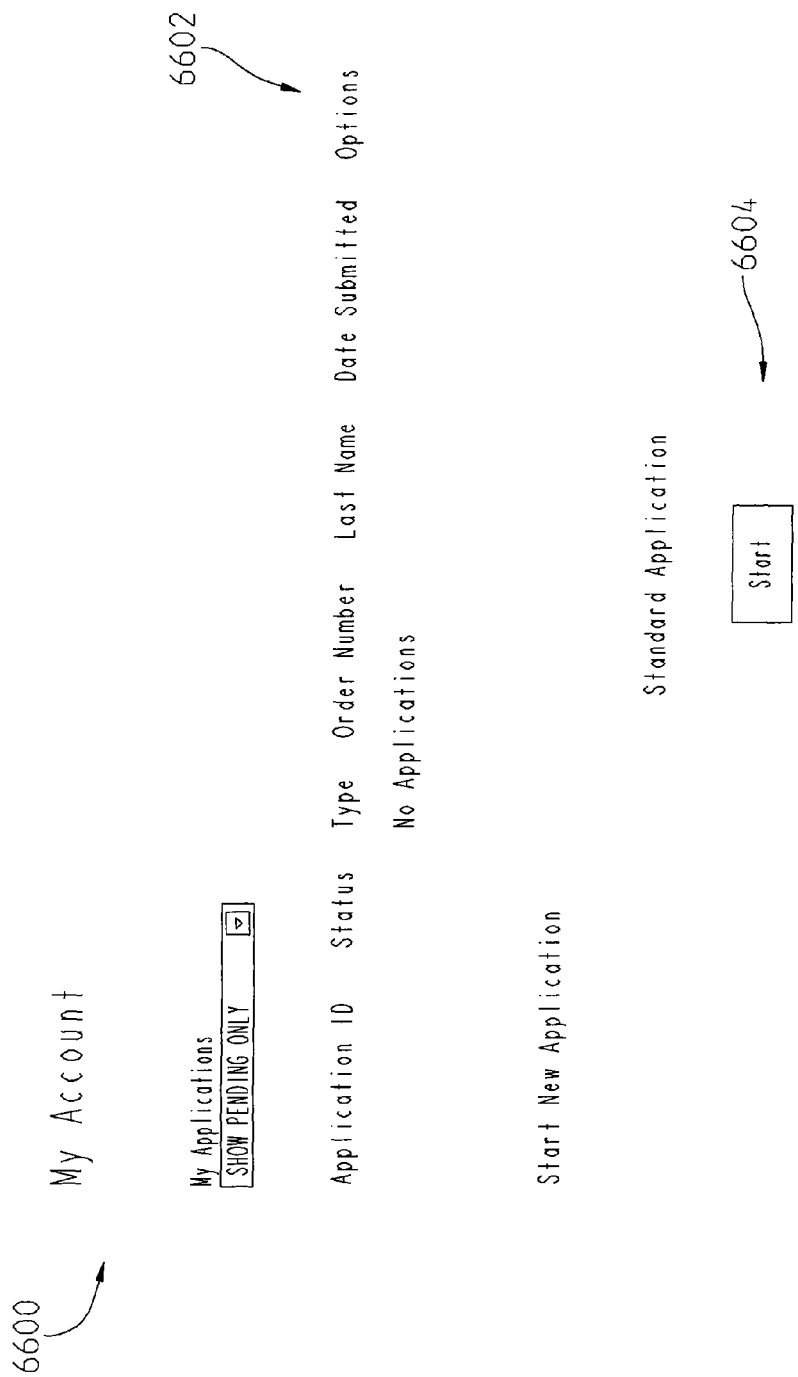
FIG. 66 is a schematic of one screen of the process of FIG. 65 for displaying applications associated with a registered login.

A returning user may simply be required to login to advance the process 6500. Once a user submits login information to the system, the login information can be sent to the server to locate the registered user account information in block 6504. The login information may be stored on the server or in a database electrically coupled to the server. Once account information is located, the process 6500 can display a screen 6600 similar to that in FIG. 66. In screen 6600, the account information can be displayed in the web-based program related to the located file. As shown, the screen 6600 can display information for one or more applications stored for the registered user in an application block 6602. This information can include application number or identification, application status, application type, order number, last name of party, date application submitted (if applicable), and any option or options available to the user. In the event a user wants to start a new application, a new application link or button 6604 is provided on the screen 6600 for the user to select.

Upon logging into the web portal and selecting the new application link or button 6604, a signal can be received by the web-based program to advance the process 6500 to block 6506 to execute a start real estate sale application module. Since the web-based program can be stored on the server, the signal can also be or alternatively be received by the server. In this block, the web-based program, can retrieve any templates stored for the given user based on login information and account identification. These templates may have been previously downloaded by the user to the server and stored in a template library, or the templates may have been downloaded or transferred to a database on the server or in communication with the server. In any event, the process 6500 can locate and retrieve all templates associated with the login information received in block 6502.

Upon locating any templates associated with the login information, the process 6500 can advance to block 6508 to execute a sale information module. An example of this is further shown in FIG. 67. Here, the web-based program can execute block 6508 by displaying a sale information template or screen 6700. In the screen 6700, a plurality of information or text boxes are provided for receiving input from the user. For instance, a first plurality of information or text boxes 6704 requests information from the user including an advertising number, a contract date, a seller acceptance date, an estimated closing date, an estimated closing fee, and an administrative fee. In a second plurality of information or text boxes 6708, the sales information module requests inputs such as purchase price, deposit amount, and total commission amount. In a third plurality of information or text boxes 6714, information is requested from the user including sales agent and sales agent email address. In a fourth information or text box 6718, the sale information module requests information about the closing company. The information requested from each text box is only provided as one example, however, and other sale information modules may request addition or different information. For instance, the sale information module may exist as a template provided by the user and stored on the server such that the user can customize the template to request any type or form of information necessary in this block.

Figure 67:
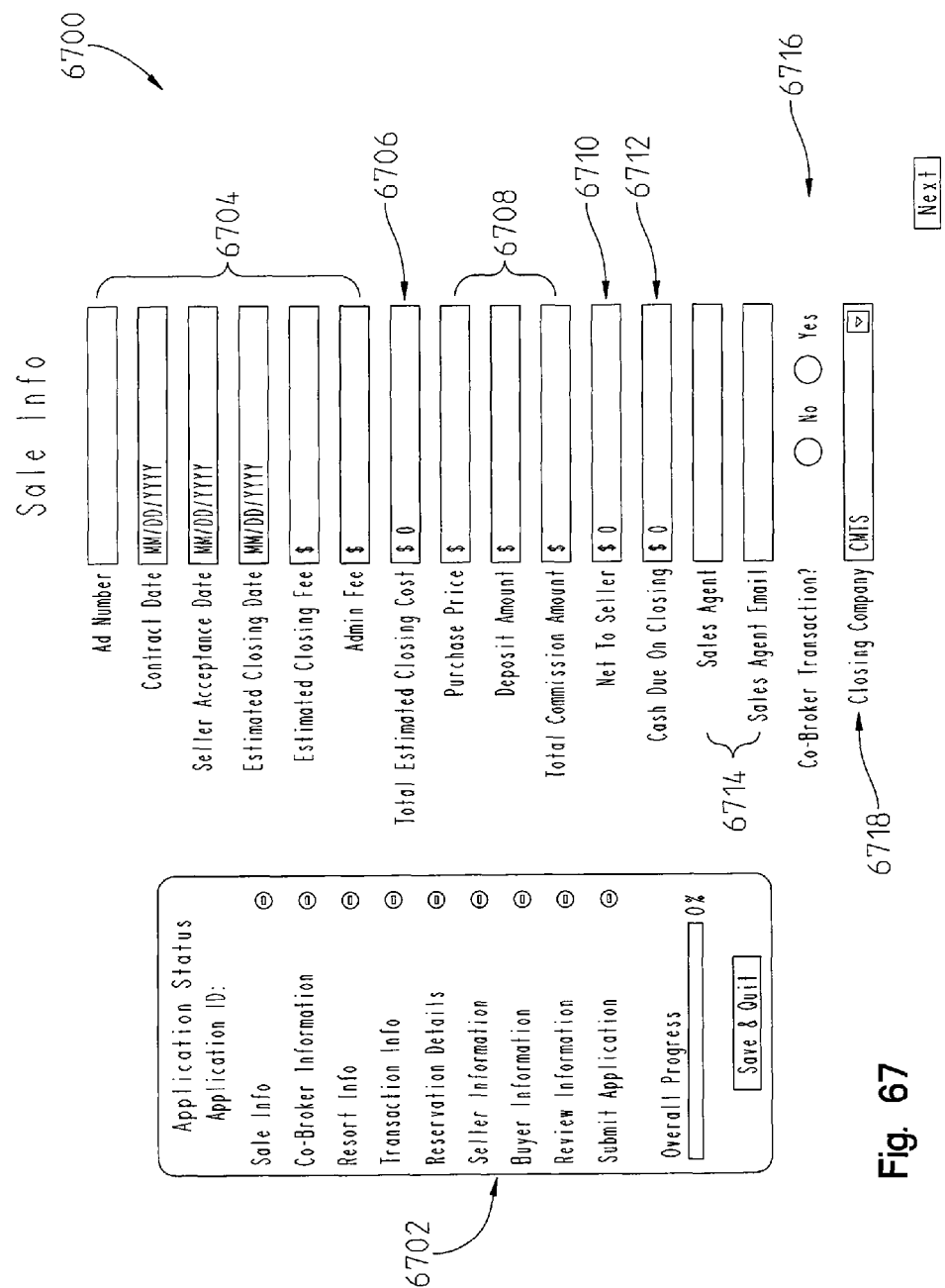
FIG. 67 is a schematic of one screen of the process of FIG. 65 for executing a sale information module.

In FIG. 67, the sale information module also includes calculation modules for calculating different fees. For example, a first calculation module 6706 is shown in FIG. 67 for determining a total estimated closing cost. The first calculation module 6706 may be structured to compute the total estimated closing cost based upon the inputs received in the first plurality of information or text boxes 6704. In one non-limiting example, the total estimated closing cost may be a summation of the estimated closing fee and the administrative fee. In other examples, this calculation may differ based on the type of information received in the first plurality of information or text boxes.

A second calculation module 6710 can also be provided in the sale information module for determining a net fee due to the seller. The net fee due to seller may be computed by the second calculation module 6710 based upon the inputs received in the second plurality of information or text boxes. In one non-limiting example, the net fee due to seller may be computed as the difference between the purchase price and total commission amount. In other examples, however, other inputs can be taken into consideration to determine the net fee due to seller.

A third calculation module 6712 can be provided in the screen 6700 to determine a cash amount due on closing. In this module 6712, the cash amount due on closing may be determined based on the inputs received from one of the first or second plurality of information or text boxes. In one non-limiting example, the cash amount due on closing may be computed by calculating the difference between the purchase price and deposit amount. In other examples, the cash amount due on closing may differ based on the type of inputs received in the sale information module. Each of the aforementioned calculation modules can be stored on the server or in a database in communication with the server.

As will be described with reference to block 6520, each input received in the sale information module can be linked or associated with an identifier. For example, a purchase price may be linked with an identifier such as ${PurchasePrice}. This identifier may therefore be used to merge the purchase price input received in the second plurality of information or text boxes 6708 from the user to any location in one or more templates, calculation modules, or documents as part of a document generation module in block 6524 (which will be explained in greater detail below). Thus, to generate or produce a sales contract or other document, any template that includes the identifier ${PurchasePrice} will be linked or merged with the input received from the user during execution of block 6508. This same process may be used in the other blocks of the process 6500 as well.

As also shown in the screen 6700 of FIG. 67, a status bar or window 6702 may be displayed to show the user visually where in the process 6500 the user currently is. It may also show completed steps or blocks and uncompleted steps or blocks. The server can continuously update the status bar or window 6702 by communicating with the web-based program as the process 6500 is executed. This is similar to the previously-described status windows or blocks.

Figure 68:
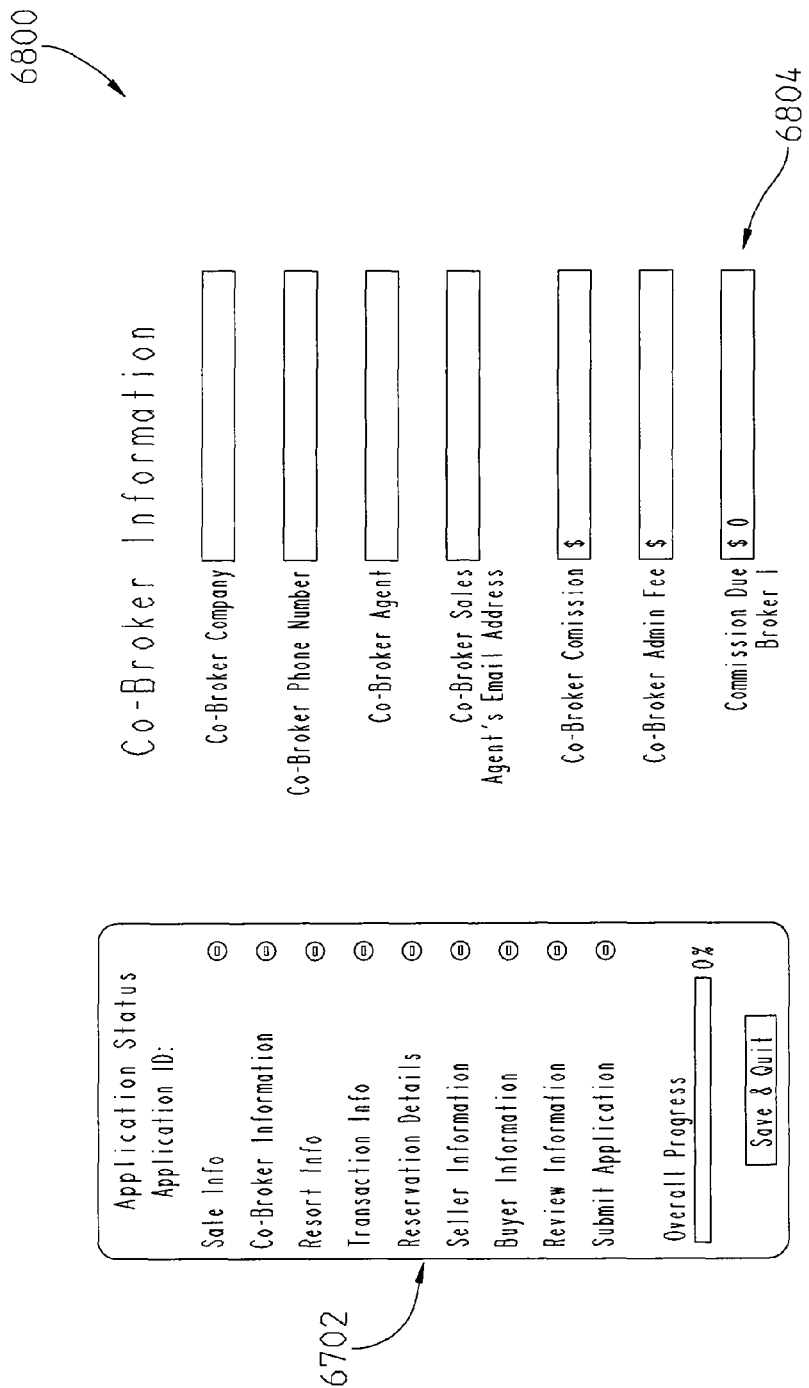
FIG. 68 is a schematic of one screen of the process of FIG. 65 for requesting co-broker information.

In addition, the sale information module can request information about whether the transaction is a co-broker transaction. This is shown in the co-broker transaction input box 6716 in FIG. 67. Here, the user can select or instruct the web-based program about whether a co-broker is involved in the transaction. In the event a co-broker transaction is selected affirmatively by the user, a signal is submitted to the web-based program and the server can advance the process 6500 to block 6510. In block 6510, the process 6500 can execute a co-broker module by collecting or requesting information about a co-broker. An example of this is shown in a screen 6800 in FIG. 68. In the co-broker module, the screen displays an input section 6802 where the user is asked to provide information including co-broker company name, co-broker phone number, co-broker agent, co-broker sales agent's email address, co-brokers commission, and co-broker administrative fee. Other information may be requested from the co-broker module of the user, and as such FIG. 68 is only one example. The module may also include a calculation module 6804 for computing a commission due to a broker. This calculation may be based upon the inputs received in the input section 6802 of screen 6800. Alternatively, the calculation may be based upon inputs received in blocks 6508 and 6510. Once this information is received and the calculation is completed in the calculation module 6804, the process 6500 may advance to block 6512.

If, however, this transaction does not involve a co-broker, the process 6500 can skip block 6510 and advance to block 6512. In any event, once either block 6508 or block 6510 is executed, the process 6500 can advance to block 6512 to execute a resort information module. In the resort information module, a screen 6900 such as the one shown in FIG. 69 can be displayed to the user for requesting information about a resort involved in the transaction. In this screen 6900, the resort information module can request resort name, resort state, building number(s), unit number(s), lockout information, unit week(s), week type, size of property (number of bedrooms, bathrooms, square footage, amenities, etc.), unit season, unit occupancy, unit view, available options, resort transfer fee, and exchange company (if applicable). This is only one example, however, and other resort information modules may request different or additional information. Once inputs are received from the resort information module in block 6512, the process 6500 can advance to block 6514. The resort information module can be stored on the server or in a database in communication with the server.

Figure 70:
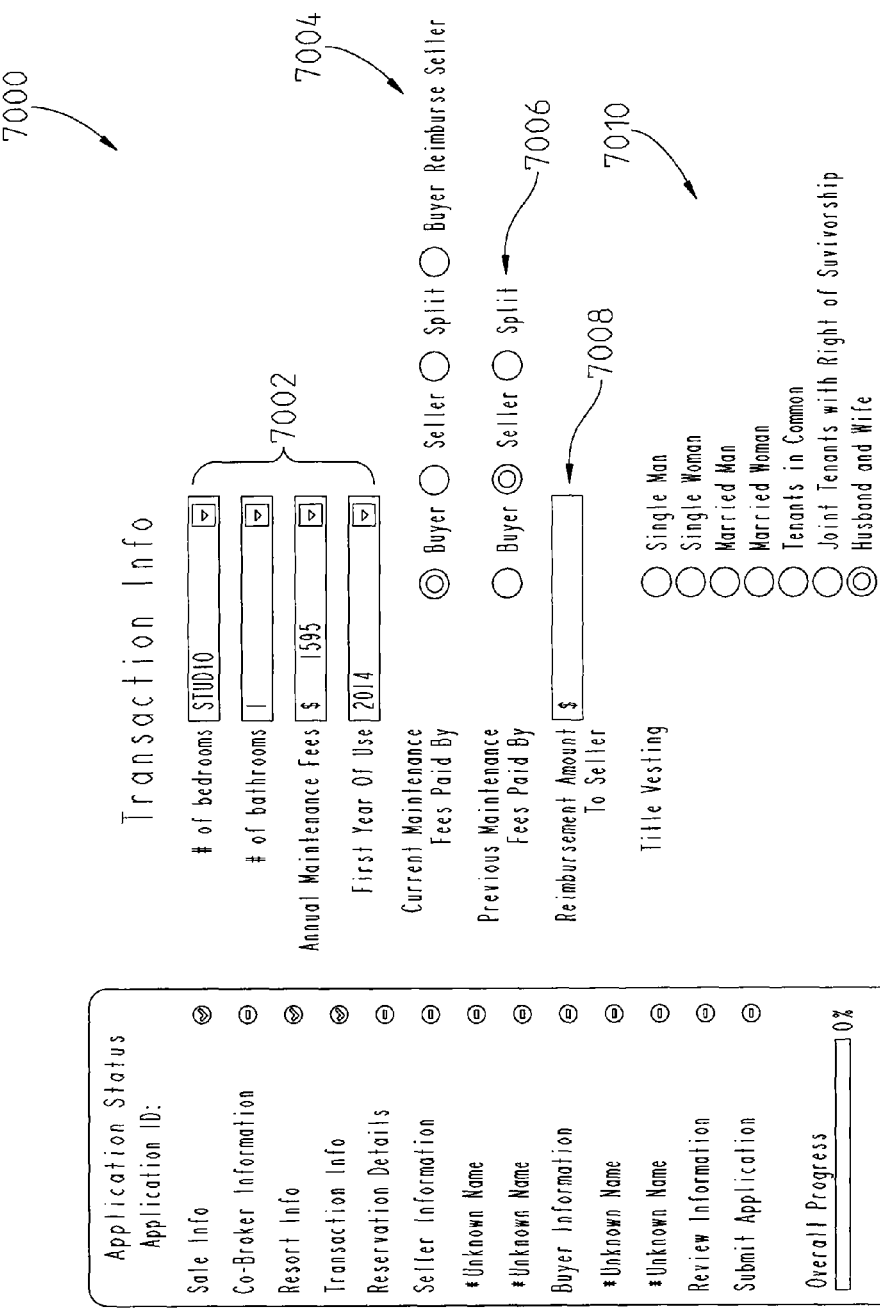
FIG. 70 is a schematic of one screen of the process of FIG. 65 for executing a transaction information module.

In block 6514, a transaction information module is executed. The transaction module can be stored on the server or in a database and executed by requesting information about the transaction from the user. An example of this is shown in FIG. 70. Here, a transaction information screen 7000 provides a plurality of information boxes for receiving inputs from the user. In a first input section 7002, information such as number of bedrooms, number of bathrooms, annual maintenance fees, and first year of use can be collected. Additional or different information may be collected in this first input section 7002.

In a second input section 7004, the module can request which party will pay current maintenance fees. The module can provide options including buyer, seller, split between buyer and seller, or buyer reimburse seller. This is similar to a third input section 7006 in which the module requests which party will pay previous maintenance fees. Other options may exist, including none if there are no current or previous maintenance fees due.

In a fourth input section 7008, the module can request information regarding a reimbursement amount due to seller. In a fifth input section 7010, the module can request information about how title will be vested after the transaction is completed. The fifth input section 7010 can include options such as a single man or woman, a married man or woman, tenants in common, joint tenants with right of survivorship, and married couple (e.g., husband and wife, domestic partners, etc.). Once this information is received from the user, the process 6500 may advance to block 6516.

Figure 71:
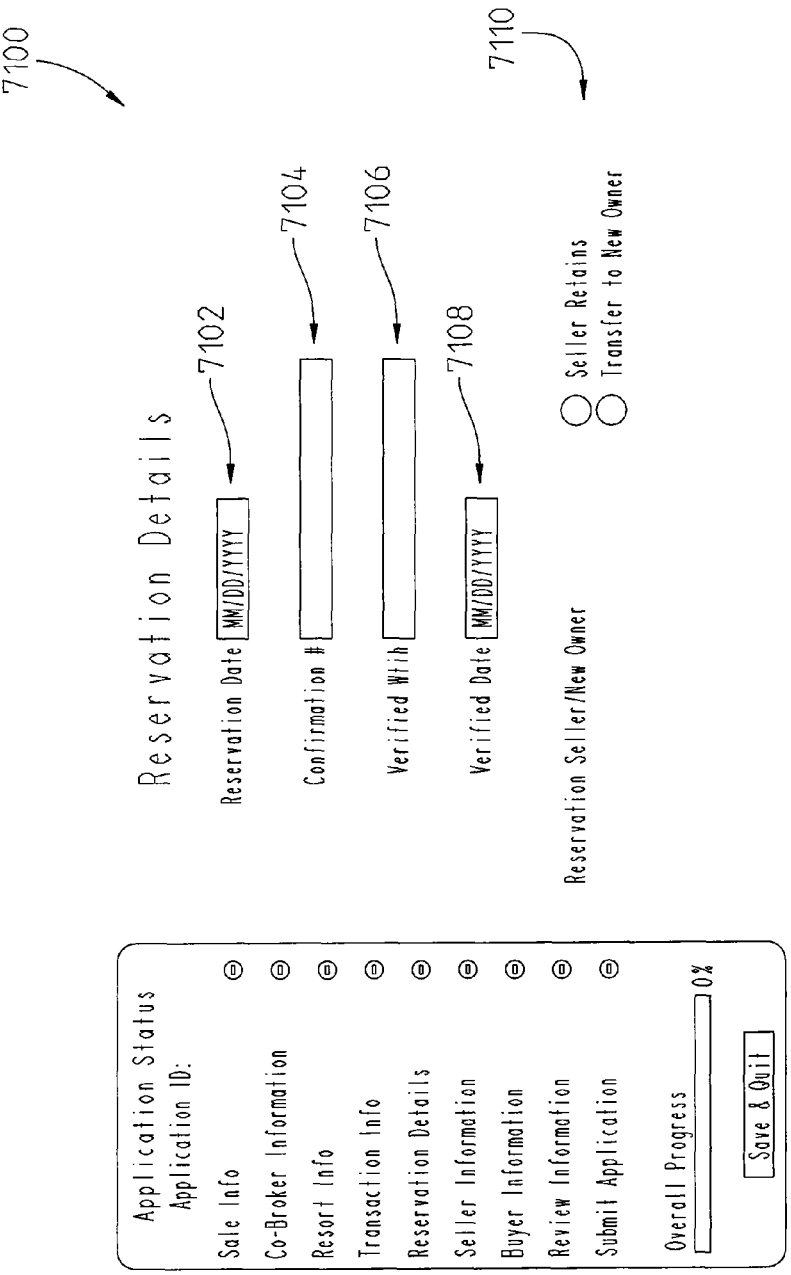
FIG. 71 is a schematic of one screen of the process of FIG. 65 for requesting reservation information.

In block 6516, the web-based program can collect reservation information for the transaction. An example of this is shown in FIG. 71. Here, the web-based program can collect reservation information from a reservation screen 7100 that requests information such as reservation date 7102, confirmation number 7104, verified with information 7106, and verified date 7108. This screen or a variant thereof may be stored on the server. In this block, a transaction may be consummated when the seller or current owner has a previously-arranged reservation for a given period of time. The parties to the transaction may agree as to which party is able to hold the reservation, and this may be designated in FIG. 71 in a reservation box 7110. Once the reservation inputs are received in block 6516, the process may advance to block 6518.

Figure 72:
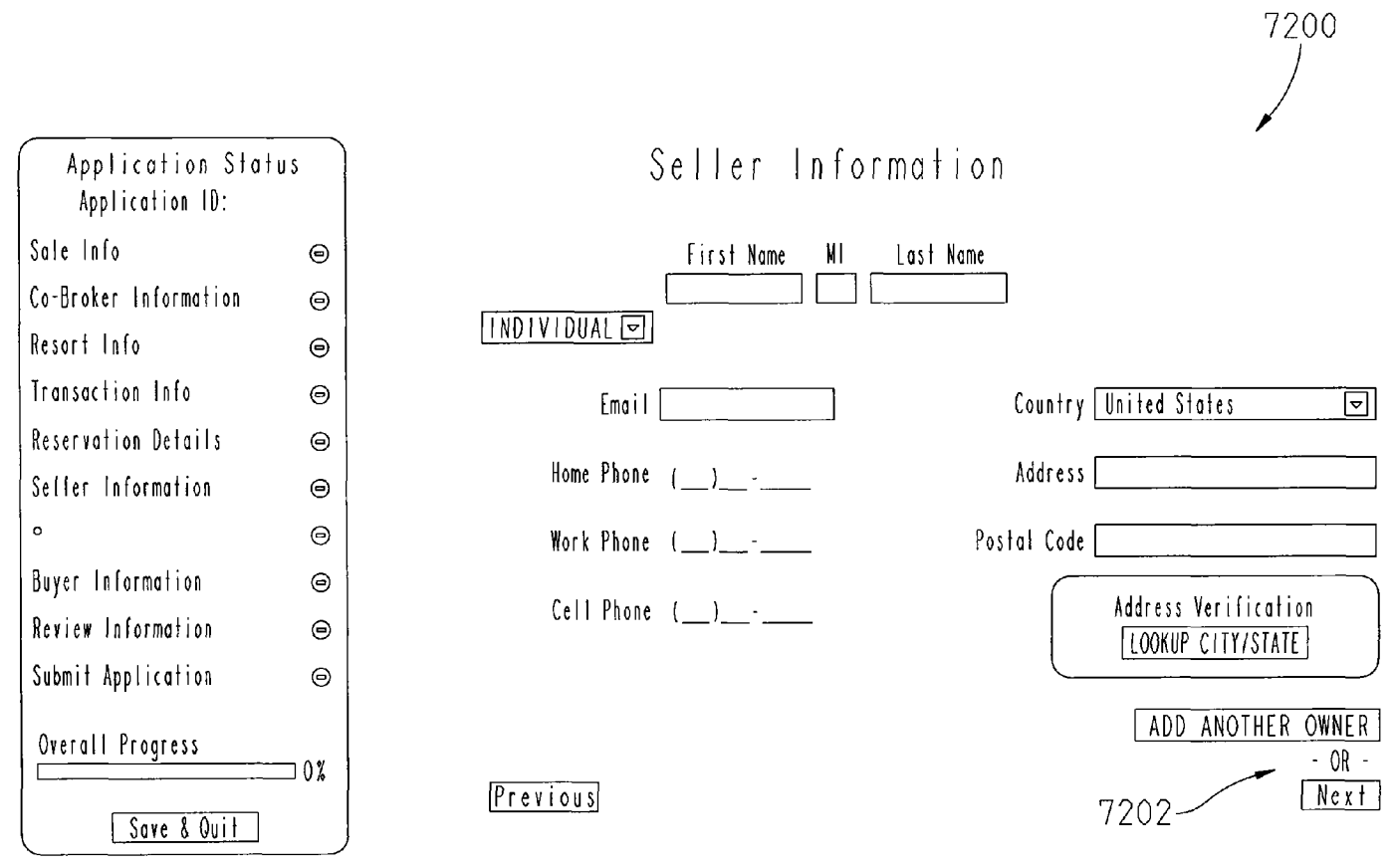

In block 6518, the process 6500 can execute a party information module. Here, the party information module can collect information from the user about the seller(s) and buyer(s). In FIG. 72, for example, a screen 7200 is provided for requesting information about a seller in the transaction. The screen 7200 may be formed as a template stored on the server and displayed to the user on an electronic computing device. This information can include name, address, email address, home phone number, work phone number, cell phone number, employer, employer address, employer website, etc. Similar to the previous embodiments of this disclosure, the address of the seller can be verified by confirming with the U.S. Postal Office records. If the address is unfound or not confirmed as valid, the process 6500 (like the previously described processes) cannot advance until a valid address is provided. Moreover, if the transaction includes two or more sellers, the screen 7200 can provide an option 7202 for adding another seller. If a second or additional seller is added, a screen similar to that of FIG. 72 may be displayed to request information about the second or additional seller.

Similar to FIG. 72, the block 5406 can also request buyer information. An example of this is shown in FIG. 73. Here, a buyer information screen 7300 can be displayed to request information about the buyer. This information can include name, address, email address, home phone number, work phone number, cell phone number, employer, employer address, employer website, etc. Similar to above, the address of the buyer can be verified by confirming with the U.S. Postal Office records. If the address is unfound or not confirmed as valid, the process 6500 (like the previously described processes) cannot advance until a valid address is provided. Moreover, if the transaction includes two or more buyers, the screen 7300 can provide an option 7302 for adding another buyer. If a second or additional buyer is added, a screen similar to that of FIG. 73 may be displayed to request information about the second or additional buyer.

Once the party information module is completed and information requested of the seller and buyer is received in block 6518, the process 6500 can advance to block 6520 to link or merge inputs with identifiers in a review application template. The review application template can be a customizable template that is provided and used exclusively by the user, or it may be a general template stored on the server or a database in a template library. Any template uploaded or otherwise provided by the user may be stored on the server or in a database in a template library along with other templates. A folder of templates may be stored in the template library whereby the folder is associated with the login information received in block 6502. As such, the server can retrieve one or more templates from the folder of templates based on the type of inputs received by the server during execution of the process 6500. In any event, each input received in the process 6500 can be linked with a unique, predefined identifier in a manner similarly described in the previous embodiments. For instance, a seller name input received from the user may be linked with unique identifier ${SellerName} in the review application template in block 6520.

Figure 74:
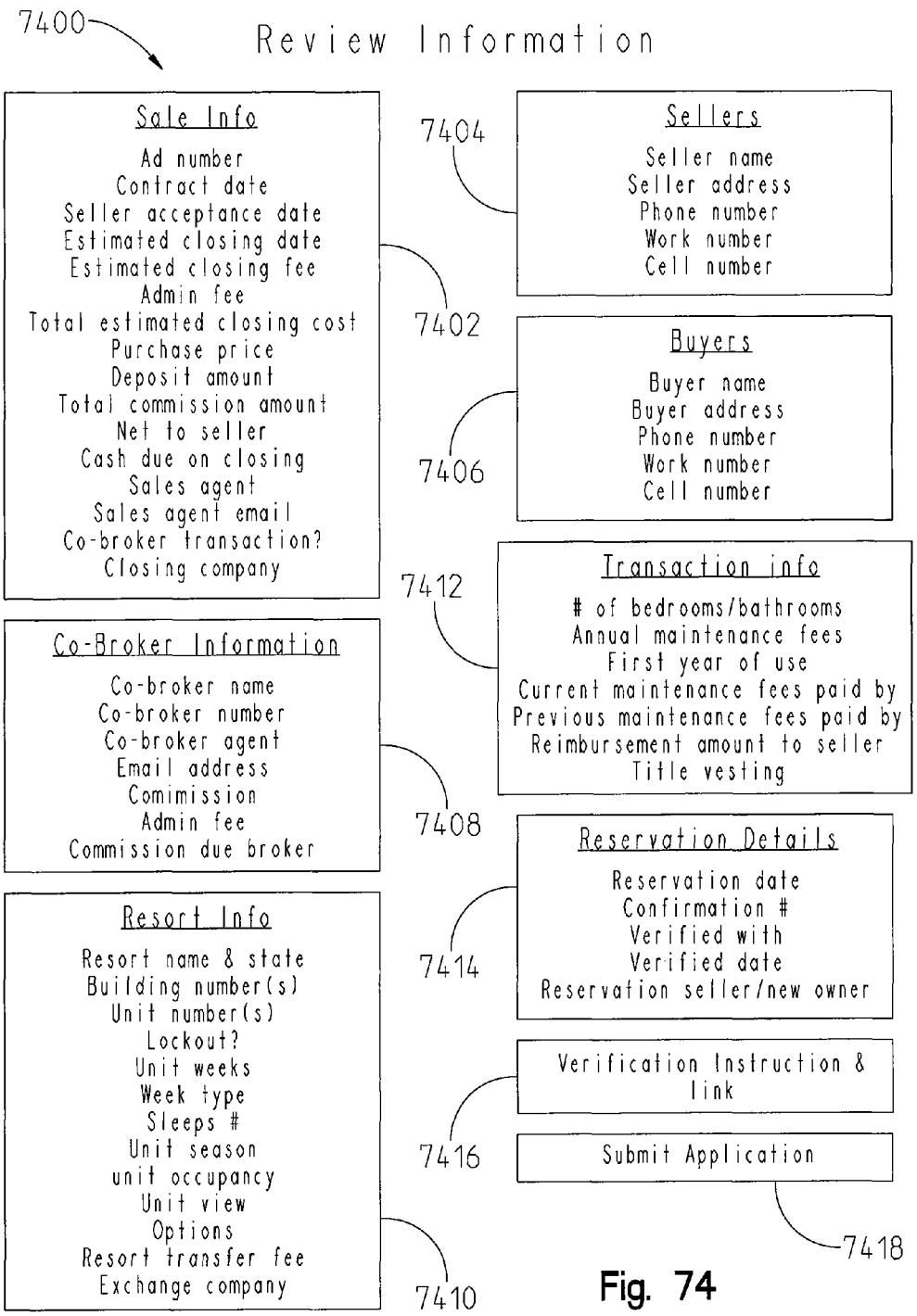
FIG. 74 is a schematic of one screen of the process of FIG. 65 for displaying a review application template.

Once each input is linked to or merged with its identifier in block 6520, the review application template can be displayed to the user for review. An example of a review application template 7400 is shown in FIG. 74. In the template, a plurality of information boxes or areas are provided to summarize the information received during the process 6500. For example, a sale information box 7402 can structurally display the inputs received in block 6508. In addition, a seller information box 7404 and buyer information box 7406 can structurally arrange the information received in block 6518 as shown in FIG. 74. Moreover, a co-broker information box 7408 can display information as received in block 6510, a resort information block 7410 can display information received in block 6512, and a reservation information box 7414 can display information as received in block 6516. In each box, the displayed information can be a result of receiving an input from the user during the application process 6500 and linking the input with an independent, unique identifier. The input can then be placed or arranged in the review application template 7400 in a position similar to that shown in the screen 7400 of FIG. 74. This provides an organized, structured review screen 7400 for the user to review all information previously input to the web-based program.

The review application template screen 7400 can also provide a link or button 7416 along with an instruction for the user to return to a previous block in the process 6500 in the event an input is incorrect or needs to be revised. Since each information box includes information linked to a certain block in the process 6500, the web-based program can return to the user to the desired block to make the desired change in the application.

The review application template screen 7400 can further provide a verification link or button 7418 whereby the user can select this link or button to complete the application process. A check box or similar action mechanism may be displayed for the user to click or otherwise acknowledge that the information displayed in the review application template screen 7400 is accurate and complete. Upon actuating this link 7418, the process 6500 can advance to block 6522 to execute the application processing module.

The application processing module in block 6522 can display a screen 7500 similar to that in FIG. 75. The screen 7500 can be an instruction screen stored as a template on the server or database in the template library. In any event, the screen 7500 can provide instructions, follow up steps, or general expectations now that the application has been submitted for processing. At the same time or after a user acknowledges the instruction screen 7500 in FIG. 75, the process 6500 can advance to block 6524 to execute a document generation module.

Figure 76A:
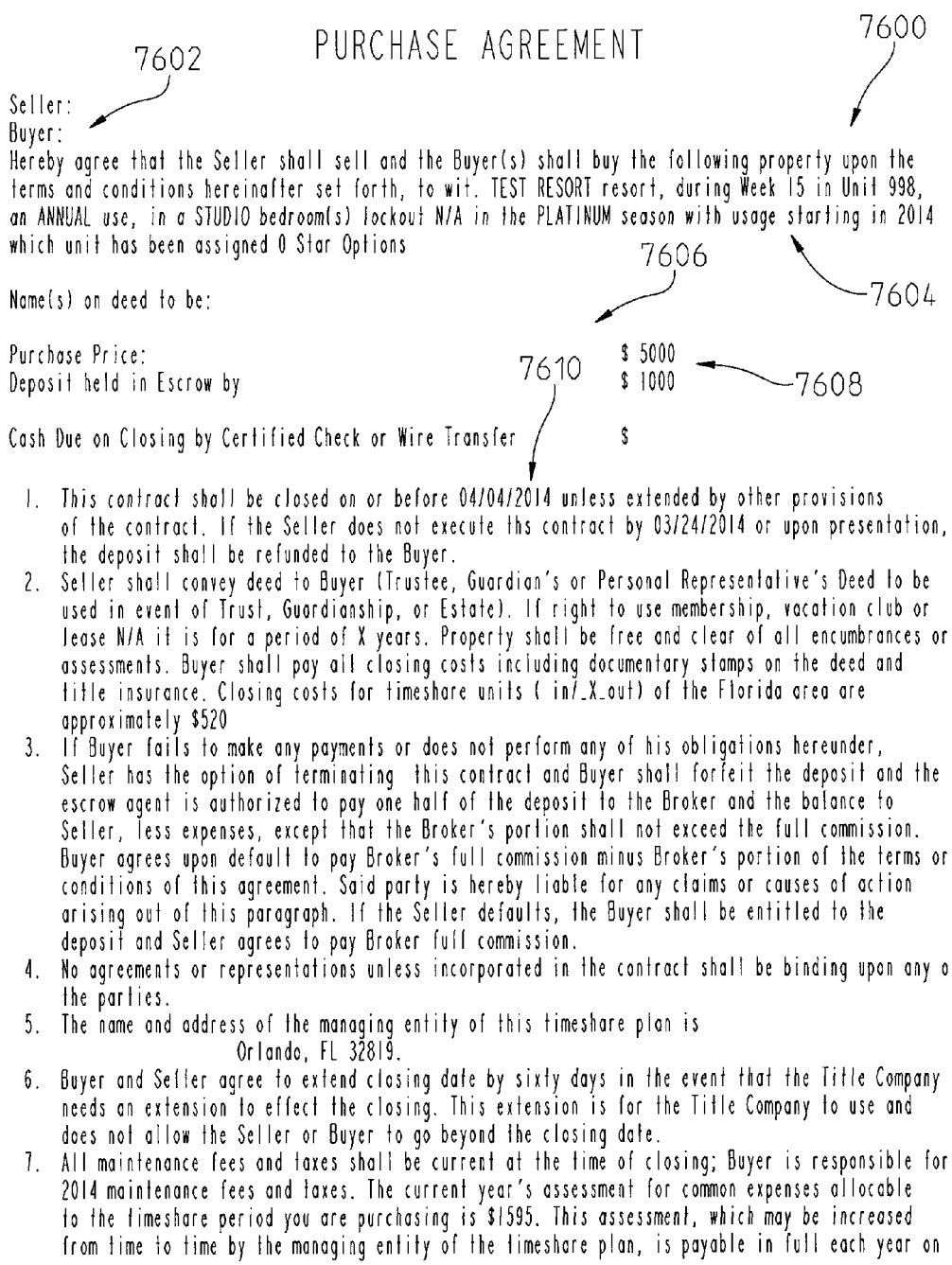
FIG. 76A is a first portion of a schematic of one example of a net listing agreement generated via execution of a document generation module of the process of FIG. 65.

The document generation module is similar to that described in the process 2500 above. For example, a purchase agreement, a net listing agreement, and an authorization to release information to a title company may be produced in block 6524. An example of a purchase agreement template 7600 is shown in FIG. 76. In the template 7600, a plurality of inputs received in the process 6500 can be linked into specific locations in the purchase agreement template. For instance, a first input (or group of inputs) 7602 corresponds with a buyer and seller names, which are requested in the party information module of block 6518. A second input (or group of inputs) 7602 corresponds with a description of the property, which is requested in the resort information module of block 6512 and the transaction information module of block 6514. A third input (or group of inputs) 7606 is related to the party name to be disposed on the deed. This information is requested in the transaction information module of block 6514 of the process 6500, and the party information module of block 6518.

The template 7600 can also include a fourth input (or group of inputs) 7608 that corresponds to purchase price, deposit held in escrow, and cash due on closing. Each of these inputs can be requested in the sale information module in block 6508. A fifth input (or group of inputs) 7610 corresponds to a closing date, which is also requested in the sale information module of block 6508. A sixth input (or group of inputs) 7612 in the template 7600 can relate to which party is responsible for paying current year maintenance fees and taxes. This information is collected in the transaction information module of block 6514 and each input can be linked to or merged with a corresponding identifier in the template 7600 as shown. Here, the buyer is responsible for paying current year maintenance fees and taxes. Another input 7614 is shown in the template 7600 corresponding to the date the contract is entered into by the parties. This input is requested in the sale information module of block 6508.

The purchase agreement template 7600 can include other inputs which are linked or merged in the template to form the purchase agreement. Once each input is linked to or merged into its respective location in the template, the purchase agreement document can be generated in block 6524. To execute the transaction process in block 6526, the purchase agreement document can be sent to each party with instructions for each party to sign in the signature block area 7616 of the document. Here, each seller and buyer is requested to sign, and once the purchase agreement is executed by each party and returned the document can be further processed (e.g., submitted to the appropriate government office for recording). Depending on the type of document, each party may be able to electronically sign and verify the accuracy and completeness of information contained on a respective document without having to handle a physical document or form. Thus, communication between the web-based program and each party may be handled electronically such that the server can electronically transfer and receive documents to and from each party.

Other documents, depending on the type of transaction and type of templates a user may require for a given transaction, may be generated in block 6524 similar to the purchase agreement. As described, once the necessary documents are generated in block 6524, the process 6500 can advance to block 6526 to complete the transaction process. In other words, the generated documents can be sent to the party or parties of the transaction for execution. As previously noted, this can occur via email, facsimile, mail or through other known means. Once executed documents are received, the server can control the web-based program to further facilitate the necessary filing and recording with government offices or other actions necessary to complete the transaction.

Each of the aforementioned processes in this disclosure are described individually and, in most instances, described as being independent. However, as shown in FIG. 43, each process can be integrated into a larger process where two or more of these processes are executed to complete a desired transaction. Thus, this disclosure provides a plurality of different processes and document generation modules that can be tailored for the timeshare industry or real estate industry for the production and execution of documents and forms necessary for a property transfer.

Moreover, the embodiments of the present disclosure are described and illustrated as a web-based program that can be executed by a server. Documents, templates, modules, etc. can be stored on the server or in a database that is in communication with the server. The database, for example, can be stored on the server. In any event, this disclosure is not intended to be limiting in the sense that one or more of the embodiments described herein may be executed via a means other than a web-based program and server. In at least one instance, a program or software can be stored on a disk, memory device, or other electronic means. The program or software can execute each embodiment in a manner similar to that described in this disclosure.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A computer-executable method for producing a title transfer document for transferring a timeshare property, comprising:

providing a program that includes a set of instructions stored on a first server, a plurality of templates stored in a database that is in electrical communication with the first server, and an electronic computing device disposed in communication with the first server over a network, the set of instructions being executable by a processor of the electronic computing device, where each of the plurality of templates corresponds to a specific document for transferring the timeshare property;

executing by the processor a resort property module of the program, the resort property module being executable to display a resort property screen on a screen of the computing device, where the resort property screen displays a first set of questions to a user of the computing device to request information about the resort property including the type of transaction being executed, resort name associated with the timeshare property, owner number associated with the timeshare property, a unit number or calendar week associated with the timeshare property, and an estimate of transfer fees due based on the resort property, wherein the first set of questions are displayed on the resort property screen with a limited number of selectable responses for responding to each question to ensure accurate and complete information is received about the resort property;

executing by the processor a party information module stored in the program, the party information module being executable to display a party information screen on the screen of the computing device, where the party information screen displays a second set of questions to a user of the computing device to request information about each party associated with the transfer and how title will vest upon completion of the transfer, wherein the party information module requires a submission by the user of at least one address associated with each party;

communicating the at least one address associated with each party from the first server to a second server associated with a postal service to verify that the at least one address associated with each party corresponds to a valid address according to postal service records;

discontinuing the execution of the transfer process until the second server verifies the validity of the at least one address associated with each party;

executing by the processor a documentation module stored in the program, the documentation module being executable to display a documentation screen on the screen of the computing device, where the documentation screen displays one or more selectable options to the user of the computing device to submit any document related to the transfer from the computing device to the first server;

executing by the processor a payment module stored in the program, the payment module being executable to display a payment screen on the screen of the computing device, where the payment screen displays information about a purchase price, a title transfer price, a recording fee and any outstanding fees due associated with maintenance fees of the timeshare property and further displays a first option to execute a payment or a second option to skip payment, wherein upon a selection to execute a payment the first server communicates payment information received from the payment screen to a third server associated with handling payments;

receiving input data from each of the modules and locating a document template including at least one identifier, the first server communicating with the database to identify the correct document template based on the input data;

upon receiving the correct document template from the database, linking the input data with the at least one identifier in the document template to complete the document template with the input data; and producing a title transfer document from the at least one document template for transferring the title of the timeshare property.

2. The method of claim 1, further comprising storing the input data received from each of the modules as a transaction file on the first server or in the database.

3. The method of claim 1, further comprising displaying an application status bar on the screen of the electronic computing device during the execution of each module, wherein the application status bar displays an application identification number generated by the program, an icon for each module or step being executed in accordance with the set of instructions, and a graphical bar displaying a user's progress during execution of each module or step.

4. The method of claim 1, further comprising:
receiving an electronic instruction from a computing device to execute the set of instructions stored on the first server;
executing by the processor a login script stored on the first server by displaying a login screen on the screen of the computing device and requesting user identification and acknowledgement of a set of conditions for starting an application process before the executing the resort property module.

5. The method of claim 4, further comprising:
receiving an electronic instruction at the first server from the electronic computing device indicative of the user identification;
communicating with the database to search for a file associated with the user identification; and
displaying contents of the file on the screen of the electronic computing device, wherein the contents include an application identification number of at least one unfinished or finished application.

6. The method of claim 1, wherein the executing a resort property module comprises displaying on the resort property screen an icon or question requesting whether a power of attorney document will be used by at least one party of the title transfer.

7. The method of claim 1, wherein the executing a party information module comprises displaying on the party information screen an icon or question requesting if a party includes more than one person or company.

8. The method of claim 1, wherein the communicating step comprises executing an address verification module during or after the execution of the party information module, the address verification module being executable to verify an address of at least one party associated with the title transfer with the postal service to ensure the address provided in the party information module is a valid address.

9. The method of claim 1, wherein:
the locating step comprises sending an instruction to the database to locate a review application template from a template library stored on the database, where the template library includes the plurality of templates and the review application template including a plurality of identifiers positioned within the review application template;

identifying each of the plurality of identifiers in the review application template with the input data received from each of the modules;
merging the input data at each location within the review application template that corresponds with each of the plurality of identifiers;
producing a review application file with the merged input data from the review application template; and
displaying the review application file on the screen of the electronic computing device so that the user can review the review application file and ensure its accuracy and completeness.

10. A computer-executable method for executing an electronic program stored on a first server for producing a title transfer document for transferring a timeshare property from one party to another party, comprising:
providing a set of instructions that form the program stored on the first server, a plurality of templates used for generating the title transfer document and stored in a database that is in electrical communication with the first server;
receiving an electrical command from a computing device to the first server to execute the program, the computing device configured to include a processor for executing the set of instructions received from the server and a screen for displaying one or more screens associated with the set of instructions;
executing by the processor a login script stored on the first server by displaying a login screen on the screen of the computing device and requesting a user identification from the user of the computing device to enable the program for executing the set of instructions stored on the first server, wherein the login script only enables the program if the first server is able to confirm that the user identification corresponds with a user account stored on the first server or the database;
executing by the processor a resort property module of the program, the resort property module being executable to display a resort property screen on the screen of the computing device, where the resort screen displays a first set of questions to a user of the computing device about the resort property including a type of transaction to be executed, wherein the type of transaction includes at least a removal of a current owner from the title or changing ownership to a new party;
executing by the processor a party information module stored in the program, the party information module being executable to display a party information screen on the screen of the computing device, where the party information screen displays a second set of questions to a user of the computing device to request information about each party associated with the transfer and how title will vest upon completion of the transfer, wherein the party information module requires a submission by the user of at least one address associated with each party;
communicating the at least one address associated with each party from the first server to a second server associated with a postal service to verify that the at least one address associated with each party corresponds to a valid address according to postal service records;
discontinuing the execution of the transfer process until the second server verifies the validity of the at least one address associated with each party;
executing by the processor a documentation module stored in the program, the documentation module being executable to display a documentation screen on the screen of the computing device, where the documentation screen displays one or more selectable options to the user of the computing device to submit any document related to the transfer from the computing device to the first server;

executing by the processor a payment module stored in the program, the payment module being executable to display a payment screen on the screen of the computing device, where the payment screen displays information about a purchase price, a title transfer price, a recording fee and any outstanding fees due associated with maintenance fees of the timeshare property and further displays a first option to execute a payment or a second option to skip payment, wherein upon a selection to execute a payment the first server communicates payment information received from the payment screen to a third server associated with handling payments;

receiving input data from each of the modules and locating a document template including at least one identifier, the first server communicating with the database to identify the correct document template based on the input data;

upon receiving the document template from the database, merging the input data with at least one identifier in the document template to complete the document template with the input data; and producing the title transfer document upon completion of the merging step.

11. The method of claim 10, further comprising:

executing by the processor a start application module of the program, the start application module being stored on the first server and executable to display a start new application screen on the screen of the computing device, where the start new application screen displays a first selectable button to identify the user, a second selectable button to acknowledge a plurality of required conditions to enable the executing a resort property module step, a third selectable button to request identification of a developer of the timeshare property, and a fourth selectable button to start a new application for transferring a timeshare property; and executing by the processor a title type module of the program, the title type module being stored on the first server and executable to display a title type screen on the screen of the computing device, where the title type screen displays a plurality of selectable buttons or text boxes for requesting information about how many points of a timeshare property are being transferred, whether a party wants to include title insurance, a unit number associated with the timeshare property, and week number associated with the timeshare property.

12. The method of claim 10, further comprising storing the input data received from each of the modules in a transaction file on the first server or database.

13. The method of claim 10, further comprising displaying an application status bar on the screen of the electronic device during the execution of each module, wherein the application status bar displays an application identification number generated by the program, an icon for each module or step being executed in accordance with the set of instructions, and a graphical bar displaying a user's progress during execution of each module or step.

14. The method of claim 10, wherein the executing a resort property module comprises displaying on the resort property screen an icon or question requesting whether a power of attorney document will be used by at least one party of the title transfer.

15. The method of claim 10, wherein the executing a party information module comprises displaying on the party information screen an icon or question requesting if a party includes more than one person or company.

16. The method of claim 10, wherein the communicating step comprises executing by the processor an address verification module during or after the execution of the party information module, the address verification module being executable to verify an address of at least one party associated with the title transfer with the postal service to ensure the address provided in the party information module is a valid address.

17. The method of claim 10, further comprising:

sending an electronic instruction from the first server to the database to locate a review application template from a template library stored on the database, where the template library includes the plurality of templates and the review application template including a plurality of identifiers positioned within the review application template;

identifying each of the plurality of identifiers in the review application template with the input data received from each of the modules;

merging the input data at each location within the review application template that corresponds with each of the plurality of identifiers;

producing a review application file with the merged input data from the review application template; and displaying the review application file on the screen of the electronic computing device so that the user can review the review application file and ensure its accuracy and completeness.

* * * * *